United States Patent
Garwood

(10) Patent No.: US 9,462,824 B2
(45) Date of Patent: Oct. 11, 2016

(54) METHODS FOR SEPARATING LEAN BEEF AND FAT AND PRODUCING A PRODUCT HAVING A PREDETERMINED FAT CONTENT

(75) Inventor: Anthony J. M. Garwood, Mercer Island, WA (US)

(73) Assignee: SAFEFRESH TECHNOLOGIES, LLC, Mercer Island, WA (US)

( * ) Notice: Subject to any disclaimer, the term of this patent is extended or adjusted under 35 U.S.C. 154(b) by 528 days.

(21) Appl. No.: 13/490,222

(22) Filed: Jun. 6, 2012

(65) Prior Publication Data

US 2013/0115349 A1 May 9, 2013

Related U.S. Application Data

(63) Continuation-in-part of application No. 13/024,178, filed on Feb. 9, 2011.

(60) Provisional application No. 61/493,876, filed on Jun. 6, 2011, provisional application No. 61/302,802, filed on Feb. 9, 2010.

(51) Int. Cl.
*A23L 1/31* (2006.01)
*A23L 1/317* (2006.01)
(Continued)

(52) U.S. Cl.
CPC .............. *A23L 1/31* (2013.01); *A22C 17/00* (2013.01); *A22C 17/04* (2013.01); *A22C 17/08* (2013.01);
(Continued)

(58) Field of Classification Search
CPC ....... A23L 1/31; A23L 1/317; A23L 1/3177; A22C 17/08; A22C 17/04; A22C 17/00; A23D 9/02; A23D 9/00; A23D 9/11; A23B 4/06; A23B 4/08; A23B 4/09

USPC ....... 426/641, 480, 128, 139, 238, 293, 335, 426/418, 442, 506, 524, 417, 665
See application file for complete search history.

(56) References Cited

U.S. PATENT DOCUMENTS 2,534,357 A * 12/1950 Lang .............................. 452/142
3,780,191 A * 12/1973 Langer et al. ................. 426/231
(Continued)

FOREIGN PATENT DOCUMENTS

DE 26 28 858 A1 12/1977
EP 0 356 165 B1 2/1990
(Continued)

OTHER PUBLICATIONS

CO2 Phase Diagram, <http://wayback.archive.org/web/20070601000000*/http://www.teamonslaught.fsnet.co.uk/co2_info.htm> [retrieved Oct. 26, 2012], May 4, 2007, 2 pages.
(Continued)

*Primary Examiner* — Anthony Weier
(74) *Attorney, Agent, or Firm* — Christensen O'Connor Johnson Kindness PLLC

(57) ABSTRACT

A method for the separation of fat from meat. The method includes transferring a mixture through a conduit, wherein the mixture comprises lean particles with frozen water, fat particles, and a fluid, allowing the frozen water in the lean particles to thaw as the mixture travels through the conduit, and increases a density of the lean particles, accumulating the lean particles with non-frozen water at a first elevation in the conduit, and accumulating fat particles at a second elevation in the conduit, wherein the first elevation is lower than the second elevation.

21 Claims, 17 Drawing Sheets

(51) Int. Cl.

| | | |
|---|---|---|
| *A23B 4/08* | (2006.01) | |
| *A23B 4/06* | (2006.01) | |
| *A23D 9/00* | (2006.01) | |
| *A23D 9/02* | (2006.01) | |
| *A22C 17/00* | (2006.01) | |
| *A22C 17/04* | (2006.01) | |
| *A22C 17/08* | (2006.01) | |
| *A23B 4/09* | (2006.01) | |

(52) U.S. Cl.
CPC . *A23B 4/06* (2013.01); *A23B 4/08* (2013.01); *A23B 4/09* (2013.01); *A23D 9/00* (2013.01); *A23D 9/02* (2013.01); *A23L 1/317* (2013.01); *A23L 1/3177* (2013.01)

(56) References Cited

U.S. PATENT DOCUMENTS

| | | | |
|---|---|---|---|
| 5,147,672 | A | 9/1992 | McLachlan |
| 5,378,418 | A | 1/1995 | Berger |
| 5,393,547 | A | 2/1995 | Balaban |
| 5,435,443 | A | 7/1995 | Hohenester |
| 5,458,901 | A | 10/1995 | Engler |
| 5,552,171 | A | 9/1996 | Gibney |
| 5,552,173 | A | 9/1996 | Singh |
| 5,965,184 | A | 10/1999 | Schaefer |
| 6,036,630 | A | 3/2000 | Robey |
| 6,123,945 | A | 9/2000 | Nakatsu |
| 6,172,246 | B1 | 1/2001 | Franke |
| 6,224,930 | B1 | 5/2001 | Inglis |
| 6,265,006 | B1 | 7/2001 | Inglis |
| 7,666,456 | B2 | 2/2010 | Garwood |
| 2001/0007690 | A1 | 7/2001 | Girsh |
| 2002/0134317 | A1 | 9/2002 | Shane |
| 2005/0042346 | A1* | 2/2005 | Garwood ............ 426/478 |
| 2005/0142250 | A1* | 6/2005 | Garwood ............ 426/35 |
| 2005/0260311 | A1 | 11/2005 | Garwood |
| 2009/0214730 | A1 | 8/2009 | Garwood |
| 2009/0214733 | A1 | 8/2009 | Garwood |
| 2010/0112168 | A1 | 5/2010 | Garwood |
| 2011/0008505 | A1 | 1/2011 | Garwood |
| 2012/0231131 | A1 | 9/2012 | Garwood |
| 2012/0231148 | A1 | 9/2012 | Garwood |
| 2012/0282382 | A1 | 11/2012 | Garwood |
| 2013/0115349 | A1 | 5/2013 | Garwood |
| 2013/0142928 | A1 | 6/2013 | Garwood |
| 2013/0177685 | A1 | 7/2013 | Garwood |
| 2013/0323374 | A1 | 12/2013 | Garwood |
| 2013/0323384 | A1 | 12/2013 | Garwood |
| 2013/0337130 | A1 | 12/2013 | Garwood |
| 2014/0037806 | A1 | 2/2014 | Garwood |

FOREIGN PATENT DOCUMENTS

| | | | | |
|---|---|---|---|---|
| EP | 1967082 | A1 * | 9/2008 | ........... A23L 1/317 |
| EP | 1 967 082 | A1 | 10/2008 | |
| GB | 357207 | A | 9/1931 | |
| JP | 58-212740 | A | 12/1983 | |
| WO | 91/05502 | A1 | 5/1991 | |
| WO | 03/101210 | A1 | 12/2003 | |

OTHER PUBLICATIONS

International Search Report and Written Opinion mailed Dec. 27, 2012, issued in corresponding International Application No. PCT/US2012/041018, filed Jun. 6, 2012, 12 pages.

Spilimbergo, S., and A. Bertucco, "Non-Thermal Bacterial Inactivation With Dense $CO_2$," Biotechnology and Bioengineering 84(6):627-638, Dec. 2003.

* cited by examiner

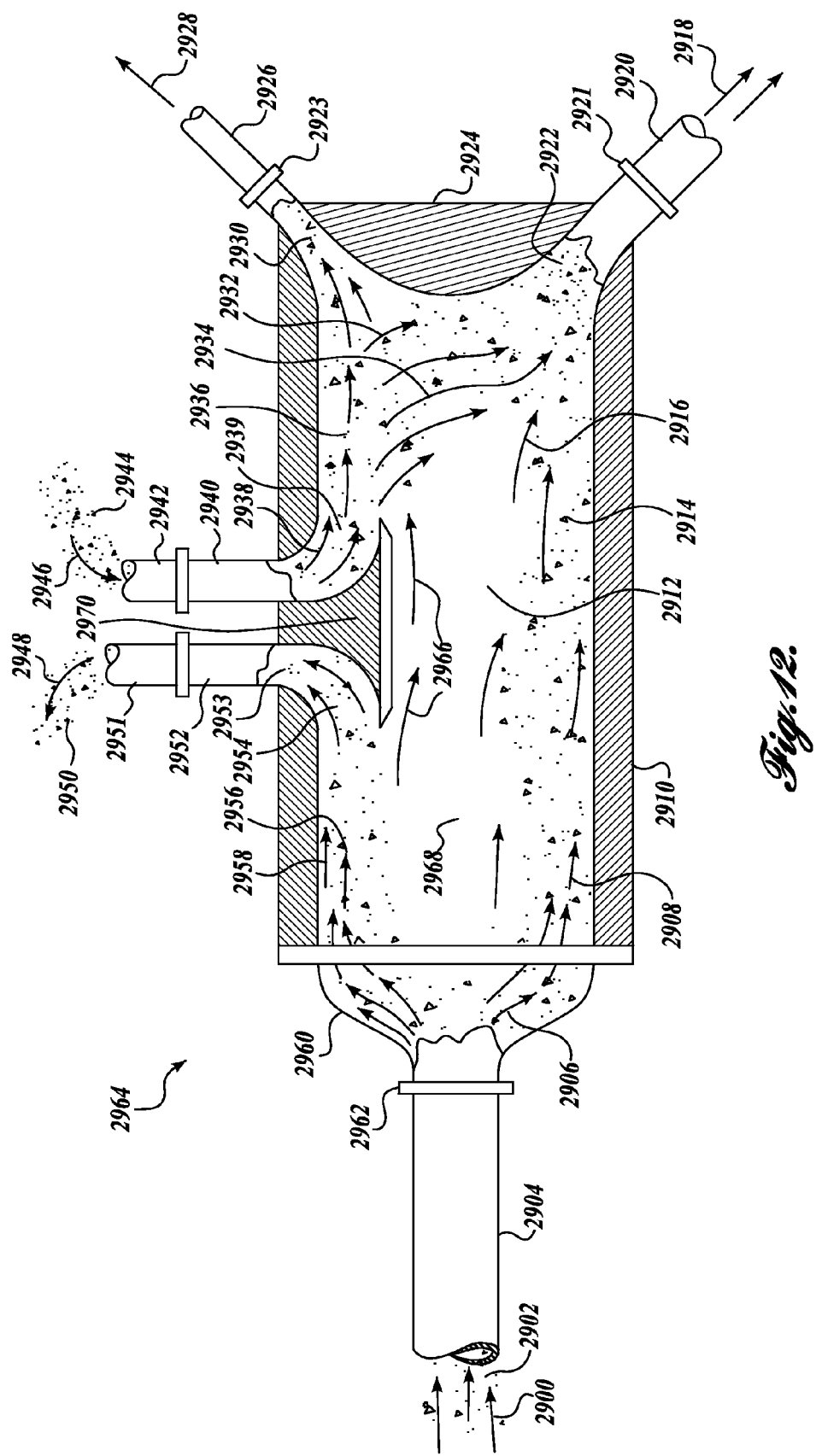

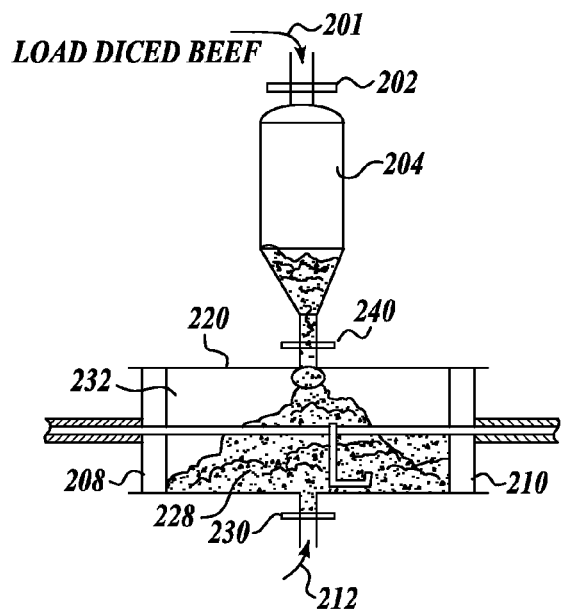
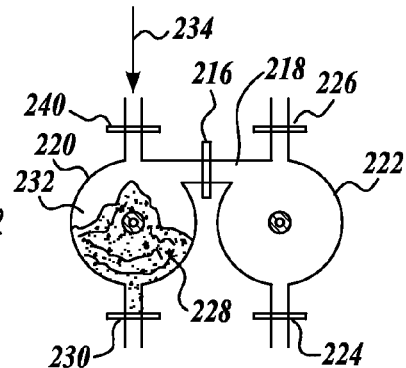
Fig. 17A.        Fig. 17B.
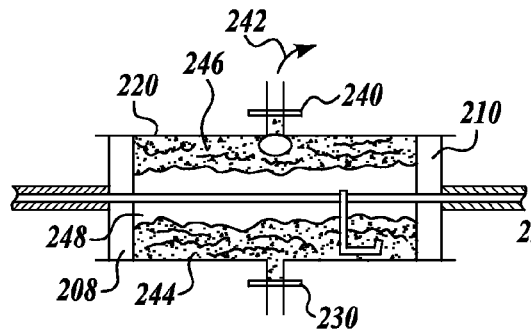
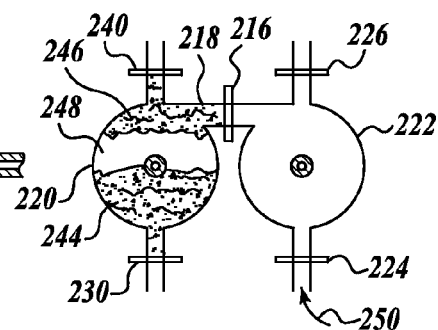
Fig. 18A.        Fig. 18B.
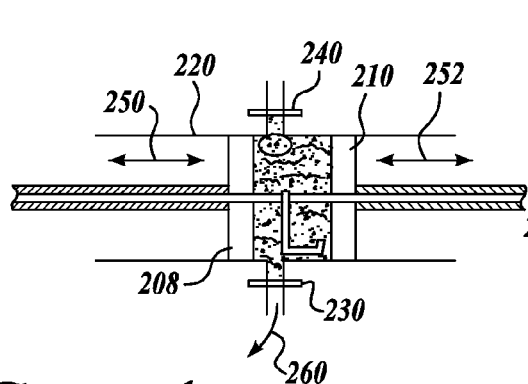
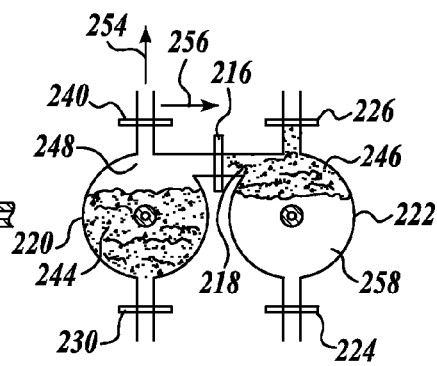
Fig. 19A.        Fig. 19B.

METHODS FOR SEPARATING LEAN BEEF AND FAT AND PRODUCING A PRODUCT HAVING A PREDETERMINED FAT CONTENT

CROSS-REFERENCE TO RELATED APPLICATION

This application claims the benefit of U.S. Provisional Application No. 61/493,876, filed Jun. 6, 2011, and this application is a continuation-in-part of U.S. application Ser. No. 13/024,178, filed Feb. 9, 2011, which claims the benefit of U.S. Provisional Application No. 61/302,802, filed Feb. 9, 2010. All applications are fully incorporated herein expressly by reference.

BACKGROUND

During the process of boning a carcass, and particularly a beef carcass such as a steer or cow, the tallow and fat often referred to as "trim" is removed. Other "trim" is cut from primal beef portions during the slicing and disassembly process of carcasses that is required during preparation of small cuts for human consumption. During these processes, a significant amount of lean beef can be cut from the carcass and carried away with the fat and/or tallow. Lean beef comprises predominantly muscle protein, although some amounts of fat and tallow are present, while fat and tallow comprise predominantly glycerides of fatty acids with connective tissue and collagen and are the predominant constituents of plant and animal fat. The lean beef content in trim may be as high as 45% to 50% by weight or higher. Presently, trim has little use except for sausage production, or alternatively the fat may be rendered.

A need therefore exists to more efficiently separate the lower value tallow with fat from the higher value lean beef contained in trim and to more effectively kill, reduce, or completely remove the microbial pathogenic population and to eliminate sources of cross contamination and recontamination, while also producing a ground beef product of specific fat content.

SUMMARY

Disclosed are methods relating to the reduction in the tallow content and/or the separation of tallow and/or fat from materials, particularly in foods for human consumption, including fresh, uncooked meats and in particular beef. Tallow comprises natural proportions of fat, collagen, and connective tissue. Disclosed herein is a method and apparatus for separating lean matter from fat contained within the lean without destruction of the muscle striations.

In one embodiment, the method includes reducing the temperature of at least the fat component of the beef to a temperature causing solidification of the fat and to a brittle condition so that when a crushing action is applied to the temperature-reduced pieces of beef, the crushing force is sufficient to cause fracturing and the substantial disintegration or fragmentation of the fat matter into small fat particles or fragments that readily fall away from the lean, but without significantly damaging the lean matter. The temperature-reduced and crushed stream of fat and lean particles can then be transferred to a vibratory separator, which can separate a portion of the fat particles while agitating and shaking the larger lean pieces so as to cause even more fat particles to separate from the larger lean pieces. Then, the separated fat particles and larger lean pieces can be combined with a fluid that comprises carbon dioxide and/or water to form carbonic acid. The fat and lean matter with fluid are transferred into to a vessel. The beef and the fluid are agitated in the vessel to allow temperature equilibration above the freezing point of water. The beef comprises relative lower amounts of less dense (fat) and higher amounts of more dense (lean) matter, which includes a greater quantity of frozen water. The heavy matter that is predominantly lean beef when at least water partially unfreezes, such that its density increases to a value above 62.4 lbs per cubic foot and can then settle to the bottom of the fluid, and the light matter that is predominantly tallow and fat can rise toward the surface of the fluid. The separated matter comprising predominantly lean beef can be removed from the fluid as a reduced tallow and fat content beef product. The method can be practiced with any material containing fat, not just beef, including plants and animals.

The fluid can include carbon dioxide and water. When pressurized, the fluid can have a pH of about 3 or higher, or even lower, such that when the beef is blended in the fluid for a period of time, any bacteria that is present at the beef surfaces is either killed or injured. Furthermore, the processing of the beef in a substantially all carbon dioxide environment around the beef extends the shelf life of the beef by at least displacing oxygen from contacting the beef surfaces.

A first embodiment is related to a method for dividing a quantity of food such as beef into components of fat and lean; and may also separate bone fragments from the beef. The method includes slicing, dicing, flaking and/or chipping beef into smaller beef pieces and freezing the beef pieces, with or without bone fragments, by reducing the temperature to below 29.5° F. In one embodiment, the temperature is low enough to freeze or partially freeze the water in the beef, and in any event, the temperature is low enough to cause the density of the beef to decrease due to the expansion of water when chilled to a certain temperature. The beef may be combined with fluid having a temperature above 32° F., in a vessel, allowing bone fragments to sink to the bottom of the fluid before the temperature of the beef increases to above the freezing point of water. In any event, the bone fragments may be separated while the density of the beef is less or nearly equal to the density of the fluid, such that bone is capable of sinking in the fluid, but, not the beef. After the bone has been separated, the temperature of the beef is allowed to increase, and, with a temperature increase, the density of the beef also increases due to the volume contraction, mainly by thawing of water contained in the beef. At this point, the density of the beef increases greater than the density of the fluid, such that the denser lean particles sink to a lower region but above the bone, while fat particles can rise to the upper region of the fluid. Thereafter, once lean (beef) particles sink and fat particles rise in the fluid, the respective particles are collected, resulting in a beef product high in lean, a fat product that can be rendered into tallow, and lean beef solids, through emulsification, heating, pasteurization, and centrifugation.

A second embodiment is related to a method for separating fat from lean in beef (meat) by fracturing frozen, size reduced, beef pieces that comprise a fat component and a lean component. The method includes providing a quantity of boneless beef and then slicing, dicing, flaking and/or chipping the boneless beef pieces into smaller beef pieces; chilling the beef pieces, by reducing the temperature to below 29° F.; transferring the size reduced frozen beef pieces to a apparatus and applying a crushing force across the frozen beef pieces so as to fracture the fat component thereby enabling the fractured fat to detach from the lean component of each piece of beef, to which the fat was previously attached, to provide small pieces of separated fractured fat and larger pieces of lean wherein all finished pieces of fat and lean are smaller than the frozen pieces of beef prior to applying the crushing pressure to the beef pieces.

A third embodiment relates to an apparatus for separation of fat particles, lean particles, and, optionally, bone fragments produced by the method of the third embodiment. The apparatus includes a first, second, third, fourth, and fifth vessel, wherein the first vessel is connected to the second and third vessel, wherein the bottoms of the second and third vessels are at an elevation higher than the bottom of the first vessel and means are provided to seal the second and third vessels from the first vessel; the fourth vessel is connected to the first vessel so that the bottom of the fourth vessel is lower in elevation than the bottom of the first vessel and means are provided to seal the fourth vessel from the first vessel; the fifth vessel is connected to the fourth vessel so that the bottom of the fifth vessel is lower in elevation than the bottom of the fourth vessel and means are provided to seal the fifth vessel from the fourth vessel; and means to seal the bottom of the fifth vessel.

In the apparatus of the third embodiment, the bottom of the third vessel is higher in elevation than the bottom of the second vessel. In the apparatus of the fourth embodiment, fat or tallow is collected in the second vessel.

In the apparatus of the third embodiment, a mixture of carbon dioxide, fat, lean meat and bone are provided in the third vessel and then allowed to settle.

In the apparatus of the third embodiment, bones or bone fragments are collected in the fifth vessel.

In the apparatus of the third embodiment, lean meat is collected in the fourth vessel.

In the apparatus of the third embodiment, carbon dioxide is collected in the first vessel.

A fourth embodiment relates to a method for the separation of fat from meat. The method includes providing individual pieces of meat containing lean and fat; subjecting the individual pieces of meat to chilling for a time sufficient to produce a difference in temperature between the fat and lean, wherein the fat is chilled such that the fat is brittle, or friable and can crumble into finer particles when subjected to a pressure or crushing force and the lean is chilled to a higher temperature than the fat and, the lean is able to withstand a similar crushing force without substantially crumbling into smaller pieces. At the described temperatures, the beef pieces are subjected to pressure or crushing force to separate particles of fat from the individual pieces of beef.

In the method of the fourth embodiment, after subjecting the individual pieces of meat to chilling, the temperature at the surface of the fat is 5° F. to 10° F.

In the method of the fourth embodiment, after subjecting the individual pieces of beef to chilling, the temperature at the surface of the lean is 16° F. to about 34° F.

In the method of the fourth embodiment, the time of chilling the individual pieces of beef is approximately 2 minutes to 3 minutes.

In the method of the fourth embodiment, the method can further comprise transferring the individual pieces of beef and separated particles of fat to a vessel and filling the vessel with a fluid comprising, at least, water, and allowing the particles of fat to rise in the fluid and allowing the individual pieces of beef to sink in the fluid, followed by collecting the fat and the individual pieces of beef.

In the method of the fourth embodiment, the method may further comprise allowing bone to sink in the fluid to a lower elevation as compared to an elevation attained by the individual pieces of beef.

In the method of the fourth embodiment, the method may further comprise transferring the individual pieces of beef and separated particles of fat within a conduit filled with a fluid comprising, at least, carbon dioxide, and allowing the particles of fat to rise in the fluid and allowing the individual pieces of beef to sink in the fluid while the fluid travels in the conduit, followed by collecting the fat and the individual pieces of beef.

In the method of the fourth embodiment, the method may further comprise subjecting the individual pieces of beef to a crushing force produced by intermeshing teeth on rollers or a continuous conveyor belt to separate particles of fat from the individual pieces of beef.

In the method of the fourth embodiment, the method may further comprise, after separating the particles of fat from the individual pieces of beef, combining a measured portion of the fat particles with a measured portion of the individual pieces of beef to achieve a predetermined fat content for the beef.

In the method of the fourth embodiment, the method may further comprise cutting raw beef to a size not exceeding 2 inches in any dimension to produce the individual pieces of beef of step (a).

In the method of the fourth embodiment, after producing the individual pieces of beef, the pieces are chilled to minimize agglomeration of pieces into frozen masses comprising a plurality of pieces.

In the method of the fourth embodiment, the individual pieces of beef produced after separation of the fat will comprise predominantly lean beef.

In the method of the fourth embodiment, the method may further comprise contacting the separate particles of fat and individual pieces of beef with a flowing fluid comprising, at least, water, in a conduit, and allowing frozen water in the individual pieces of beef to thaw and increase in density which causes the individual pieces of beef to fall in the flowing fluid, while the fat particles are buoyant in the fluid, and collecting the individual pieces of beef in a lower conduit of a manifold and collecting the fat particles in an upper conduit of the manifold.

In the method of the fourth embodiment, the method may further comprise separating the fluid from the individual pieces of beef and fat particles, weighing the fat, and combining a portion of the fat with the individual pieces of beef to produce a beef product of predetermined fat content.

In the method of the fourth embodiment, the method may further comprise centrifuging the individual pieces of beef and fat particles to remove the liquid, weighing the individual pieces of beef in a first conveyor and, weighing the fat particles in a second conveyor.

A fifth embodiment is related to a method for deactivating pathogens in beef. The method includes transferring beef to a vessel, wherein the vessel includes an enclosed elongated space fitted with a first and a second piston within the interior of the space at each of two opposing ends, and the pistons include a front and back side; charging the vessel with carbon dioxide; moving the first and second piston in a direction toward each other so as to reduce the volume of the space and increase the pressure within the space to create super critical carbon dioxide phase (carbon dioxide above the critical pressure and the critical temperature) in the space containing the beef; holding the super critical pressure of carbon dioxide for a predetermined period of time; after holding the super critical pressure for the predetermined period of time, moving the first and the second pistons away from each other to reduce the pressure in the space to a subcritical pressure of carbon dioxide; holding the subcritical pressure of carbon dioxide for a predetermined period of time; and after holding the subcritical pressure of carbon dioxide, moving the first and second pistons in a direction toward each other so as to reduce the volume of the space while expelling the carbon dioxide from the space in front of the pistons to spaces created at the back of the pistons.

In the method of the fifth embodiment, the front side of the first and the second piston is fitted with an impeller that rotates as the first and second pistons move toward each other.

In the method of the fifth embodiment, the vessel includes a central longitudinal axis, and the vessel is rotated back and forth on the axis while the first and second pistons move toward each other.

In the method of the fifth embodiment, the method may comprise performing a plurality of super critical carbon dioxide phases alternating with subcritical carbon dioxide phases before expelling the carbon dioxide.

In the method of the fifth embodiment, the super critical pressure produced is 1,500 psi or greater.

In the method of the fifth embodiment, the subcritical pressure produced is 900 psi or less.

A sixth embodiment is related to a method for separating lean from fat. The method includes: (a) transferring a mixture through a conduit, wherein the mixture comprises lean particles with frozen water, fat particles, and a fluid; (b) allowing the frozen water in the lean particles to thaw as the mixture travels through the conduit, and increases a density of the lean particles; (c) accumulating the lean particles with non-frozen water at a first elevation in the conduit, and accumulating fat particles at a second elevation in the conduit, wherein the first elevation is lower than the second elevation.

In the method of the sixth embodiment, the method further comprises transferring the accumulated lean particles through a conduit branch connected to the conduit, wherein the accumulated lean particles transferred in the conduit branch comprise a majority of the lean particles in the mixture.

In the method of the sixth embodiment, the method further comprises transferring the accumulated fat particles through a conduit branch connected to the conduit, wherein the accumulated fat particles transferred in the second conduit branch comprise a majority of the fat particles in the mixture.

In the method of the sixth embodiment, the method further comprises transferring a portion of the mixture through a conduit branch connected to the conduit, wherein the mixture in the conduit branch comprises a greater percent by weight of fluid than fat and lean.

In the method of the sixth embodiment, the lean particles and the fat particles in the mixture in the conduit prior to thawing of the frozen water have a substantially similar density that prevents the lean particles and the fat particles from accumulating at different elevations.

In the method of the sixth embodiment, the method further comprises adding carbonic acid solution to the mixture before step (a).

In the method of the sixth embodiment, the fluid has a temperature higher than the freezing point of water.

In the method of the sixth embodiment, the mixture may further comprise bones, and allowing the bones to separate from the mixture before the thawing of water.

In the method of the sixth embodiment, the conduit comprises a vertical section and a horizontal section, and the bones are separated at a bend from the vertical section to the horizontal section.

In the method of the sixth embodiment, the method further comprises, before step (a), applying pressure to pieces of beef comprising both fat matter and lean matter to produce the lean particles and the fat particles in the mixture.

In the method of the sixth embodiment, the method further comprises, before applying pressure, chilling the pieces of beef to a temperature at which the fat matter becomes brittle and can crumble and separate from the lean matter upon the application of pressure.

In the method of the sixth embodiment, the method further comprises emulsifying the accumulated fat particles.

In the method of the sixth embodiment, the method further comprises collecting the accumulated lean particles and centrifuging the lean particles to separate fluid.

In the method of the sixth embodiment, the conduit can have an aspect ratio defined as the cross-sectional width divided by the cross-sectional height, and the aspect ratio decreases along the length of the conduit from a proximal side to a distal side.

A seventh embodiment is related to a method for separating fat from beef pieces, including: (a) chilling beef pieces comprising fat matter and lean matter for a time and at a temperature that results in uneven chilling of surfaces of the fat matter and lean matter, wherein the lean matter is chilled to a temperature to cause freezing of water in the lean matter, and the surface temperature of the fat matter is lower than the surface temperature of the lean matter; and (b) applying pressure to the beef pieces to break the fat matter from the beef pieces while leaving the lean matter intact.

In the method of the seventh embodiment, the method may further include, wherein in step (b) the surface temperature of the fat matter is lower than the surface temperature of the lean matter by at least 5° F.

In the method of the seventh embodiment, the method may further include, wherein in step (b), the surface temperature of the lean matter is 26° F. or less, and the surface temperature of the fat matter is 5° F. or greater, and the surface temperature of the fat matter is lower than the surface temperature of the lean matter.

In the method of the seventh embodiment, the method may further include passing the beef pieces between a pair of parallel, adjacent, non contacting, driven rollers, each roller having alternating recesses and protrusions around the perimeter, wherein the rollers are arranged to position a recess of one roller opposite to a protrusion of the second roller, without the rollers being in contact.

An eighth embodiment is related to a method of separating a high vapor pressure fluid from beef, including: (a) in an apparatus comprising a vessel, and a piston disposed within the vessel, wherein a space is provided adjacent to the piston, adding a high vapor pressure fluid with beef in the space; and (b) moving the piston to compress the space to separate the fluid from the beef, wherein the fluid is compressed at a pressure to prevent evaporation and freezing of the beef.

In the method of the eighth embodiment, the apparatus may comprise a second piston, wherein the pistons are disposed opposite to each other, and the pistons are moved together to compress the space to separate the fluid from the beef.

In the method of the eighth embodiment, the high vapor pressure fluid does not exist as a liquid at 1 atmosphere and 20° C.

In the method of the eighth embodiment, the fluid can be carbon dioxide.

In the method of the eighth embodiment, the apparatus may further comprise a space behind the piston, wherein the space adjacent to and behind the piston are in communication, and the fluid is transferred behind the piston during compression.

A ninth embodiment is related to a method for producing a beef product having a predetermined fat content. The method includes: (a) transferring a mixture through a conduit, wherein the mixture comprises lean particles, fat particles, and a fluid; (b) transferring a first portion of the mixture having accumulated lean particles through a first conduit branch connected to the conduit, wherein the portion of the mixture transferred in the first conduit branch has a majority of the lean particles in the mixture; (c) transferring a second portion of the mixture having accumulated fat particles through a second conduit branch connected to the conduit, wherein the portion of the mixture transferred in the second conduit branch has a majority of the fat particles in the mixture; (d) measuring the first portion of the mixture having the accumulated lean particles in the first conduit branch and determining a content of fat in the first portion; (e) comparing the content of fat in the first portion with a target fat content; and further performing (f1) or (f2); (f1) increasing the massflow of the second portion of the mixture through the second conduit branch to decrease the fat content of the first portion of the mixture in the first conduit branch; or (f2) decreasing the massflow of the second portion of mixture through the second conduit branch to increase the fat content of the first portion of the mixture in the first conduit branch.

In the method of the ninth embodiment, the method may further comprise measuring the massflow of the first portion of the mixture and determining a density, and correlating the density to the fat content of the first portion of the mixture.

In the method of the ninth embodiment, the method may further comprise, reducing the mass flow of the second portion of the mixture flowing through the second conduit branch and maintaining a constant mass-flow until the fat content of the first portion of the mixture reaches a high target value, and then increasing the mass-flow of the second portion of the mixture through the second conduit branch and maintaining a constant massflow until the fat content of the first portion of the mixture reaches a low target value, wherein the high target value and the low target value are not the same.

A tenth embodiment is related to a method for inactivating pathogens present on pieces of beef. The method includes: (a) introducing into an apparatus, pieces of beef, and a fluid comprising water and carbon dioxide; (b) raising a pressure within the apparatus above a critical pressure of carbon dioxide without elevating a temperature within the apparatus above a temperature to damage the beef; and holding the pressure and temperature for a selected period of time; (c) reducing the pressure within the apparatus, and increasing a density of the fluid to suspend and separate the pieces of beef in a suspension to enable surfaces of the beef to be in contact with low pH fluid to result in death of pathogenic microorganisms on the surfaces of the beef.

In the method of the tenth embodiment, the method may further comprise adjusting the density of the fluid where the beef becomes buoyant to allow spacing apart of beef.

DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 12 is a diagrammatical illustration of apparatus for the homogenization and/or emulsification of fat;

FIGS. 17A and B are diagrammatical illustrations of apparatus for the separation of fat from lean and for the separation of fluid from lean and fat;

FIGS. 18A and B are diagrammatical illustrations of apparatus for the separation of fat from lean and for the separation of fluid from lean and fat; and FIGS. 19A and B are diagrammatical illustrations of apparatus for the separation of fat from lean and for the separation of fluid from lean and fat.

DETAILED DESCRIPTION

The term "fat" as used herein can mean fat and tallow when used in reference to animal matter. Throughout the description "beef" may be used as a representative material that can be used in the disclosed methods. However, it is to be appreciated that the disclosed methods can be practiced not only on beef, but on any meat, such as from poultry, pork, and seafood.

Figure 1:
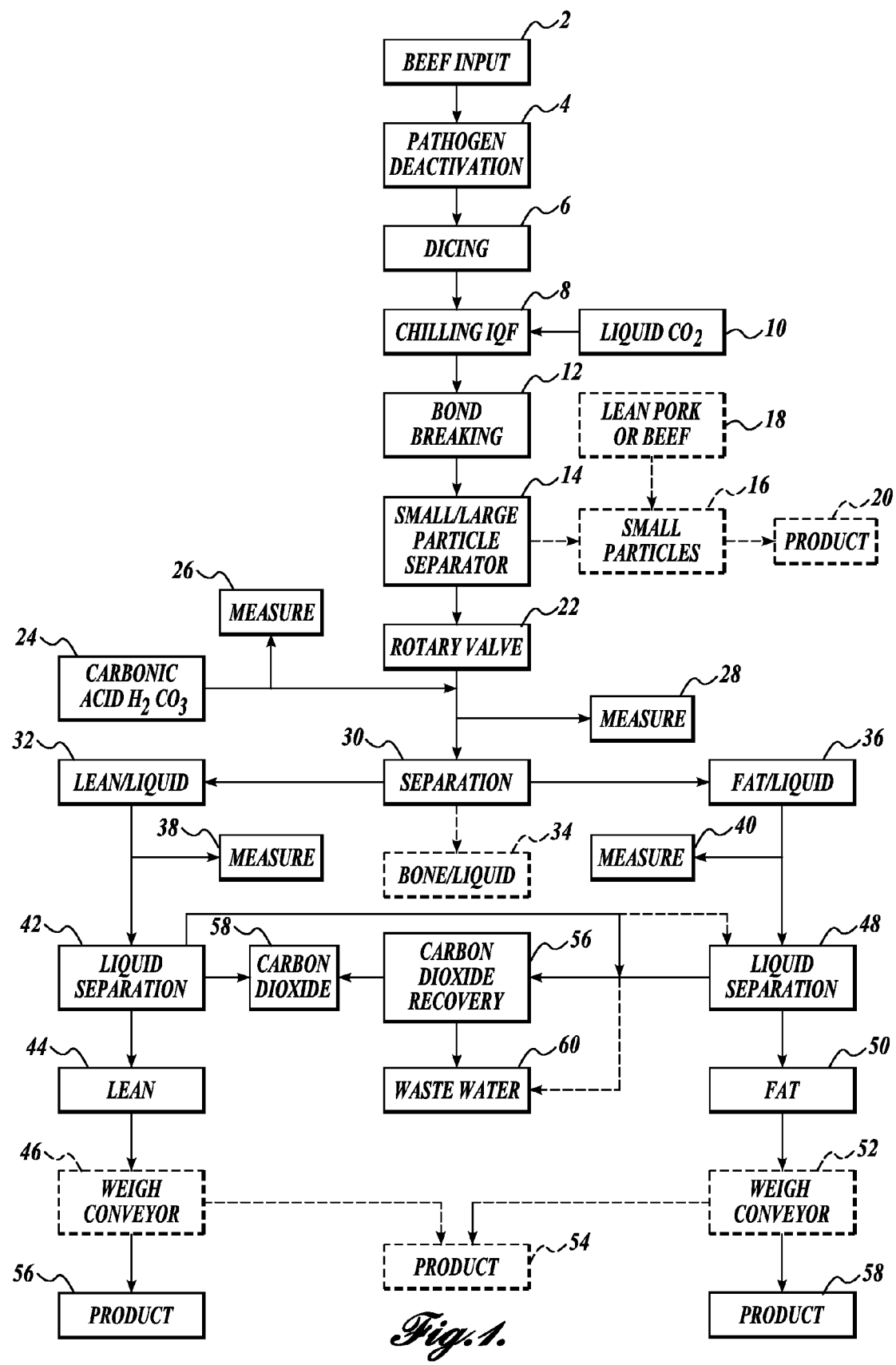
FIG. 1 is a flow diagram illustrating a process for the separation of fat from lean.

FIG. 1 illustrates a flow diagram for the processing of animal matter that is a combination of fat and lean matter. A representative animal matter may be high fat trim byproduct from beef slaughterhouses. In one embodiment, the source materials can comprise a combination of what is commonly known as 50's and 65's boneless beef, or any other suitable boneless beef. However, in other embodiments, the beef may combine bone and cartilage.

The method begins with block 2. In block 2, any animal matter may be used. In one embodiment, the animal matter will be beef, such as high fat content beef trimmings and other low value beef products. From block 2, the method enters block 4.

In block 4, pathogen deactivation is performed on the animal matter. A number of different pathogen deactivation technologies may be employed in block 4. For example, in some embodiments, any of the pathogen deactivation technologies well known in the art may be used. In other embodiments, the pathogen deactivation process disclosed herein in association with FIG. 15 may be used in block 4. From pathogen deactivation block 4, the method enters block 6.

Block 6 is for dicing and/or cutting the generally larger sections of animal matter into smaller pieces. Dicing and/or cutting may be done manually and/or alternatively, with dicing machines. From block 6, the method enters block 8.

Block 8 is for chilling the diced animal matter or beef pieces from block 6. In one embodiment, liquid carbon dioxide, block 10, may be used for chilling in block 8. The chilled animal matter has both fat and lean matter. The chilling method of block 8 results in differences in temperature between the fat and the lean matter, such that the fat is at a temperature that can be separated from the lean by the application of pressure and can break free of the lean matter, and the lean is at a temperature that is pliable and does not result in the lean matter breaking free through the same application of pressure. However, the lean matter is chilled to a temperature at which water within the lean matter can freeze and expand, thus, reducing the density of such lean matter particles. For example, in one embodiment, the temperature of the beef pieces should be not more than 29° F. and preferably not less than 0° F. but most preferably about 15° F. to about 24° F. From block 8, the method enters block 12.

Block 12 is for breaking the fat matter free from the lean matter. The product of block 12 comprises particles essentially being all fat and particles comprising a majority of lean matter, but, fat may still be present in a minority quantity.

From block 12, the method may optionally enter block 14. If performed, block 14 is for separation of the small and large particles of fat. After separation, the small particles, block 16, may be combined with any other lean meat, such as pork or beef, block 18. The combination of lean pork or beef with the small particles of fat can be used to produce a product having a desired percentage of fat in block 20. The larger particles of fat are retained with the lean particles in block 14.

If block 14 is not performed, then, from block 12, the method enters block 22. Block 22 is for introducing a selected amount of a combination of both lean particles and fat particles. In one embodiment, a rotary valve may be placed at the bottom of a hopper as further described below.

From block 22, the method enters block 30. Before entering block 30, the contents from block 22 are combined with carbonic acid from block 24. A separate carbonic acid generation unit may be provided in block 24. The amount of carbonic acid is measured using a measuring instrument in block 26. In one embodiment, the temperature of the carbonic acid fluid (suspension or buoyancy medium) should be not less than about 40° F. and not greater than about 60° F., but most preferably at about 50° F., before being mixed with the lean particles and fat particles. Carbonic acid is mixed with the combination of lean particles and fat particles and the mixture is measured in block 28. The mixture of carbonic acid, beef particles, and fat particles is pumped or may otherwise be transferred under gravity flow to a separation apparatus, block 30.

Block 30 separates, at least, a portion of the mixture that comprises the majority of the lean particles and a portion of the mixture that comprises the majority of the fat particles. Various embodiments of apparatus may be used for separation and are described below in further detail. Any one embodiment of a separator disclosed herein may be used in block 30. In one embodiment, separation block 30 may also separate a portion of the mixture comprising bone with some of the liquid in block 34. The liquid may be separated from the bone, and further processed. For example, any liquid containing carbonic acid may undergo processing to recover carbon dioxide.

Separation block 30 results in at least two streams. First, a mixture of lean particles and liquid, block 32, and, second, a mixture of fat particles and liquid, block 36. It is to be appreciated that small quantities of fat matter is still present in the lean particles. The fat matter may be attached to the lean particles, or some of the fat particles may have been entrained with the lean particles. The fat particles may also include a small quantity of lean matter, either as lean matter directly attached to fat or as separate lean particles. The liquid containing lean particles is measured in block 38. The liquid containing fat particles is measured in block 40. Such measurements can include flow rate and density from which fat content as a weight percent of the total flow may be calculated.

From block 32, the liquid containing lean particles is sent to the liquid separation apparatus, block 42. In block 42, liquid/solid separation can be carried out via a centrifuge or a sedimentation vessel. However, in another embodiment, a separation vessel with one or two opposed pistons is described below in association with FIG. 15. The liquid containing fat particles, block 36, is sent to liquid separation, block 48. In block 48, liquid is separated, in one embodiment, via a centrifuge, and, in another embodiment, via a sedimentation tank, and, in still another embodiment, with the liquid separation vessel of FIG. 15.

If a sedimentation vessel is used as the liquid separator in block 48, then, the liquid from liquid separation, block 42, may be sent to the sedimentation vessel used in block 48. Furthermore, liquid separated from bone in block 34 may also be sent to the sedimentation vessel of block 48. From block 48, in one embodiment, the liquid is sent to a carbon dioxide recovery apparatus, block 56. The carbon dioxide recovery apparatus results in carbon dioxide gas, block 58, and waste water, block 60. The carbon dioxide, block 58, can be sent to a storage vessel (not shown) and recirculated to use throughout the various processes, such as in block 22, or used to create carbonic acid in block 24. The waste water, block 60, can be discarded or treated. In another embodiment, liquid from liquid separation block 48 and liquid separation block 42 may be sent directly to waste water block 60.

The essentially liquid free lean particles, block 44, and the essentially liquid free fat particles, block 60, are produced having a controlled amount of fat, and may be used as such for any purpose. The essentially liquid free lean particles, block 44, and the essentially liquid free fat particles, block 60, are considered herein to be the first and second portions, respectively, separated from the mixture of fluid, lean particles, and fat particles entering the separation, block 30. In one embodiment, after separation of the liquid from the lean and fat, the lean is not produced having a controlled amount of fat. In that case, the lean and the fat, blocks 44 and 50 respectively, are weighed on weigh conveyors, 46 and 52, and proportioned according to weight to achieve a combined lean/fat product of desired fat conduct in block 54. For example, each respective conveyor can move at a speed that results in a specified proportion of lean to fat. However, in other embodiments, using the measuring instruments, blocks 26, 28, 38, and 40, the amount of liquid with fat that is sent to block 36 can be increased or decreased, which causes a corresponding decrease or increase of the fat that is carried with the lean particles to block 32. Thus, the weigh conveyors 46 and 52 are optional.

The ability to measure the fat content of beef matter within a fluid is based on the realization that the density of a fluid with solid matter correlates to a fat percentage. The fat content of any beef matter, regardless whether the beef is predominantly lean matter or fat matter, can be determined by knowing the density of the combined fluid and solid matter. In one embodiment, a correlation table can be created that correlates density with fat percent. The table may be created empirically after conducting numerous trials. The table may be stored in a storage device, such as computer memory, or databank. In one embodiment, the instruments that measure density are known as coriolis instruments. Coriolis measuring instruments, as used herein, are capable of measuring massflow, density and temperature. Instead of using a single measurement of massflow, an average may be taken of a plurality of measurements over a time period. Density is determined from massflow by dividing the massflow by a known volume in the instrument. Accordingly, since massflow includes the mass of the fluid and of any solids, the density is not the density of the fluid or solids, but the density of the mixture of fluid with solids. Once the density is known, the fat content can be ascertained through a correlation table. It is to be appreciated that the fluid has no fat content; thus, the fat content that is ascertained refers to the fat content of the solid matter within the fluid. Accordingly, once the fluid is separated, the fat content remains the same.

In FIG. 1, between the rotary valve block 22 and the separation block 30, the temperature of the beef matter, including fat and lean particles, will initially be low enough such that the lean and fat particles will float (but not the bone matter) in the fluid; however, the temperature and volume of the fluid from block 24 is such that the frozen water content of the lean will unfreeze and the density will increase accordingly. Separation of the lean/liquid stream, block 32, from the fat/liquid stream, block 36, in this way results in a lean content of the lean stream of about 92% and a lean content of the fat stream of about 20%. By dividing the fat stream further into two streams of almost pure (fatty adipose tissue) and a stream of higher lean content fat, the almost pure fat stream will comprise at least 12% lean and the higher fat content stream could be about 30% lean.

The massflow of fluid, e.g. carbonic acid, is measured in block 26. The fluid can be carbonic acid or any other acid or high pH value alkali liquid, such as ammonium hydroxide. The combined massflow of fluid with beef matter is also measured in block 28. Therefore, the massflow of beef solids, including fat and lean particles, can be known by subtraction of the measurement of block 26 from the measurement of block 28. The massflow of lean/liquid leaving the separation block 30 is measured in block 38. Therefore, density of the lean/liquid is known and a correlation table is used to ascertain the fat content. The massflow of fat/liquid leaving the separation block 30 is measured in block 40. Therefore, density of the fat/liquid is known and a correlation table is used to ascertain the fat content.

The massflow of the fat/liquid stream, block 36, is controlled by a pump that is controlled with a variable frequency drive electric motor that can operate in the following manner. The lean/liquid stream, block 32, is measured to determine a fat content (which may be 8%); then, if the target is to produce 85% lean, the fat/liquid stream massflow is restricted so that more of the fat/liquid stream must flow into the lean/liquid stream to add, say an additional 8% fat, and when this lower target value (84% lean) is measured by measuring instrument block 38 (based on the density/fat correlation table), the pump is opened to allow more fat to be transferred away from the lean/liquid stream. When a higher target value, say 86% lean, is measured by the measuring instrument block 38, the pump is opened so as to add just 6% additional fat. In this way, a harmonic motion or cycle can be created wherein the upper limit fat content is 16% and the lower limit fat content is 14% and this cycle can be continuously repeated.

The process blocks of FIG. 1 are not limited to being performed in any particular sequence. For example, pathogen deactivation may occur after blocks 42 and 48 or any time before then. Some steps may be omitted and substituted for one or more steps, or that perform the similar function, or are arranged in a different sequence to perform the similar function. Some steps may be omitted that are merely ancillary, or embraced as a subsystem of the illustrated steps.

The blocks discussed above will now be described in more detail with reference to specific figures.

1. Blocks 2, 4, 6, 8, 12, and 14

Figure 2:
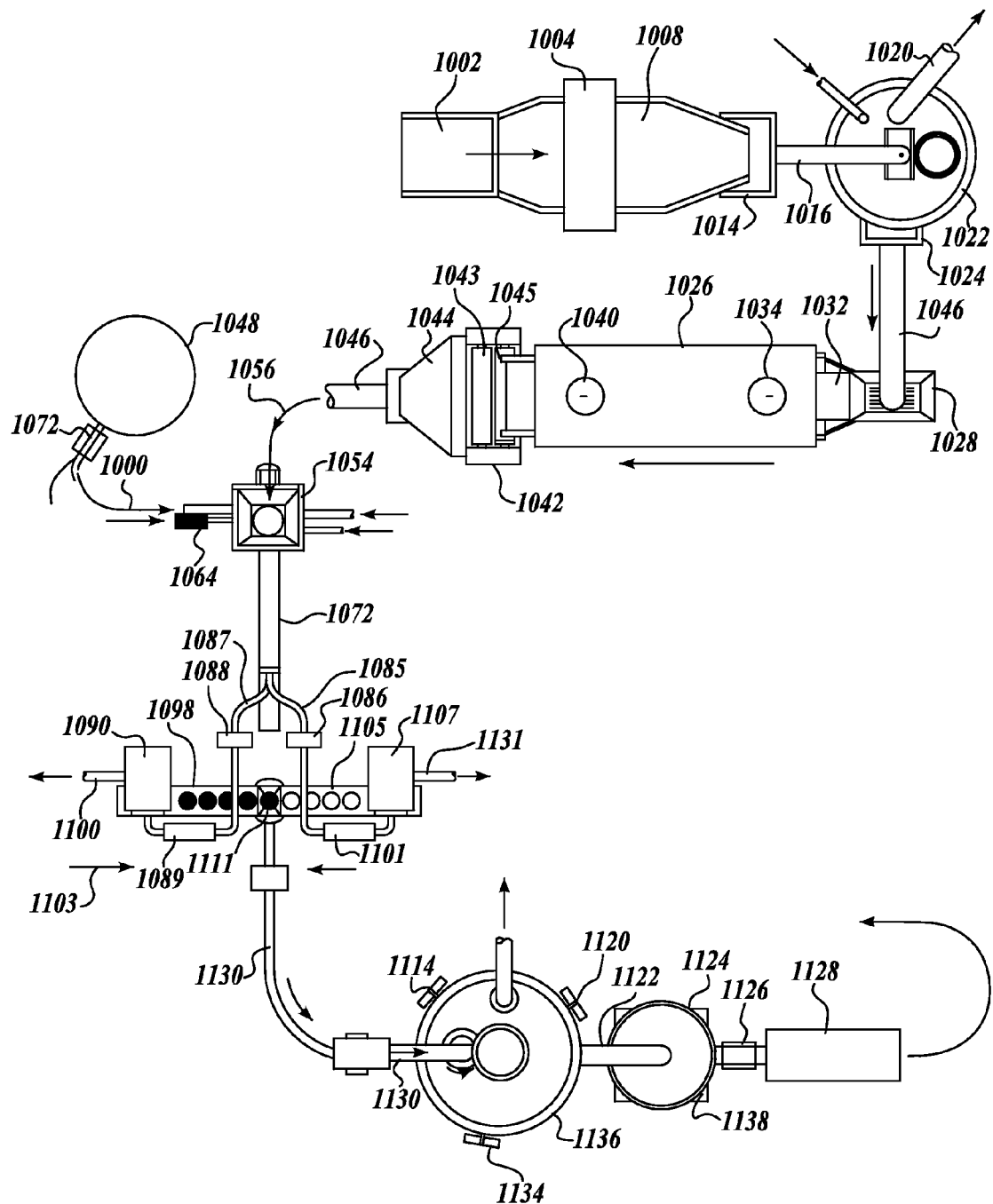
FIG. 2 is a diagrammatical illustration of apparatus for the separation of fat from lean.

Equipment for performing the process blocks 2 (beef input), 4 (pathogen deactivation), 6 (dicing), 8 (chilling), 10 (liquid carbon dioxide), 12 (bond breaking), and 14 (particle separator) of FIG. 1 are more specifically shown in FIG. 2.

Referring now to FIG. 2, the section shown between item number 1002 through item number 1046 represents the beef pathogen deactivation and particle preparation systems. The pathogen deactivation apparatus identified as 1022 can be substituted with the high pressure super critical carbon dioxide pathogen deactivation process described in association with FIG. 15.

Equipment 1002 represents a vat dumper which may unload any quantity of animal matter containing fat and lean, such as for example, the unloading of containers of approximately 2,000 lb of beef onto an inspection section followed by size reduction equipment 1004. Combo dumpers can dump raw beef onto an inclined conveyor which delivers the beef to size reduction equipment and optionally a cutting table arranged to provide for manual cutting and reduction in size of beef pieces that are too large to be processed by the size reduction equipment 1004. Beef may be boneless or may include bone and cartilage matter as well. Size reduction equipment 1004 may reduce the beef to pieces of approximately not bigger than 12" in any dimension. The inspected, size reduced beef is them transferred to accumulation hopper 1014 via conveyor 1008. From hopper 1014, the beef may be transferred via the application of vacuum through conduit 1016 to the pathogen deactivation system 1022. One particular embodiment of a pathogen deactivation system is described in association with FIG. 15, which uses carbon dioxide that is then drawn out from pathogen deactivation system 1022 via conduit 1020. In another embodiment, an autoclave is used as the pathogen deactivation system.

After treatment to reduce pathogens, the beef is transferred from the pathogen deactivation system 1022 via conduit. 1026 to dicing equipment 1028. Transfer of beef at this stage may be via pump 1024. Pump 1024 is designed to transfer a continuous substantially void free stream of pressurized beef within the conduit 1026, which may include a measuring instrument, such as a mass flow meter or coriolis meter. Coriolis meters can measure density, mass flow, and temperature of the material transferred therethrough. For example, the proportion of water contained in the beef transferred therethrough can be determined and recorded for comparison with similarly measured beef after processing. The moisture content of the beef is recorded, and moisture content throughout processing of the beef can be achieved by measuring the water content prior to processing, during the process to check on any variation, and after processing to confirm the "natural" water content of the beef is not exceeded. The data collected by coriolis measuring instruments is recorded automatically on computer disc or memory as the beef advances throughout the process.

From dicing equipment 1028, beef pieces are transferred on conveyor 1032 through a tunnel freezer 1036. Tunnel freezer 1036 may use carbon dioxide as the chilling medium. Carbon dioxide is admitted and extracted through either of conduits 1034 or 1040 depending on whether the chilling operation is conducted concurrent or countercurrent with the flow of beef. The dicing equipment 1028 is designed to slice and dice the beef and reduce beef to a particle size preferably about 1 inch in cross section by 2 inches or less. While not limiting, the particles are size reduced to approximately not more than about 1 inch wide and 2 inches long strips or 2 inch cubes. The individual particles of diced beef may still contain an amount of fat and an amount of lean. The input temperature of the beef particles to the tunnel 1036 (block 8 of FIG. 1) may be about 32° F. to 40° F., but preferably about 32° F. The temperature of the beef before the tunnel freezer 1036 may be controlled, in general, by adjusting the temperature of the room in which the beef is being diced. Owing to the differences of heat transfer between fat and lean in each beef piece, and respective amounts of water in lean versus fat matter, the chilling tunnel 1036 results in different temperatures of fat and lean within each beef particle.

It has been realized that the temperature of the individual particles that exit the chilling tunnel 1036 is not uniform throughout the particles. Because of the different heat transfer rates of fat and lean as well as the different percentages of water within lean and fat, the temperature of the lean will be higher than the temperature of the fat, even of the same particle. The temperature reduction is carried out to result in lean matter that remains flexible due to the cohesive properties of muscle tissue, while the fat is cooler at the surface and is in a brittle and friable condition due to the lower temperature. However, because the lean contains greater amounts of water than fat, the water is frozen or partially frozen.

In one embodiment, flooding the tunnel 1046 enclosure with 100% carbon dioxide gas displacing what would otherwise be air is advantageous. In this way, carbon dioxide gas can be recycled through the evaporators. Another purpose in the use of carbon dioxide is to displace air (and therefore atmospheric oxygen), thereby inhibiting the formation of oxymyoglobin from the deoxymyoglobin exposed at the cut lean surfaces of each dice or beef particle when diced or sliced.

The temperature of the quickly frozen beef particles when exiting the tunnel 1036 is controlled such that lean matter comprising substantially muscle striations, will freeze the water and all naturally fluids. Water represents about 70% of lean matter and thus the freezing and expansion of water when frozen contributes a significant increase in volume with a corresponding decrease in density of the lean matter. The beef particles are in a solid phase but in such a way that the physical characteristics and properties of the lean matter is pliable and "rubbery" in texture, while the fat matter is friable such that it fractures when subjected to compressive and twisting actions and will crumble readily into small particles and be freed from the lean matter. The temperature to which the beef particles are reduced needs to alter the physical condition of the beef particles so as to facilitate the flexing of the muscle striations of the lean matter without causing it to fracture and break into smaller pieces, while simultaneously rendering the fat matter friable such that it will fracture, crumble, and break into smaller separate particles. In this way, the friable fat having broken away from the lean when it is flexed, crushed, bent, or twisted, thereby reduces the fat matter into small separated particles. Hence, these are referred to herein as fat particles. The part of the beef pieces remaining are relatively larger comprising mostly lean matter (because they are generally not broken into small particles). Hence, these are referred to herein as lean particles. The change in physical breakdown of the beef particles into two types of particles is caused by lowering the temperature thereof followed by physical disruption of the bond, which fixes the fat and lean matter together in an attached state, and results in a size difference between the larger lean particles compared to smaller fat particles.

It has been found that by reducing the temperature of the beef particles with fat to a range of between less than 29° F. and above 26° F., the process described above will facilitate separation by providing friable fat fractures permitting the fat to crumble into small particles, leaving the lean as larger particles.

The tunnel freezer 1036 may be a cryogenic freezer using nitrogen or carbon dioxide as the refrigerant, such that upon transfer out of the freezing tunnel 1036 (or other style of freezer) the temperature of the fat (at its surface) is lower than the temperature of the lean in each particle or separate piece of beef. In one embodiment, the beef particles are temperature reduced by transfer through tunnel freezer 1036 such that the surface temperature of the fat matter is lower (approximately 5° F.) than the surface temperature of the lean matter, which is shown to be about 29° F., immediately following discharge from the freezer. The temperature at the surface of fat may be at about 5° F. or less and up to 10° F. or more such that it can be friable and crumble upon application of pressure, while the temperature of the lean may be 16° F. to about 34° F., or alternatively below 29° F., which makes the lean flexible and not frozen into a "rockhard" condition immediately after removal from the freezing process.

The above description of creating friable fat prone to crumble is attributed to the respective differences in the heat transfer ability of fat compared to lean. Table 2 shows representative temperatures of fat and lean exiting a tunnel freezer. Referring to TABLE 2, the temperature of the lean and fat matter is separately plotted against elapsed time. As can be seen, the temperature of the lean matter is above the temperature of the fat matter for about 5 minutes subsequent to discharge from the freezer and at about 6 minutes (after discharge from the freezer) the lean temperature is lower than the fat temperature.

In one embodiment, immediately after leaving the tunnel freezer, the fat can be at a temperature of 5.2 F. (at the surface), while the lean is at a temperature of 29 F. This difference in temperature is attributed to the respective heat conductive properties of fat versus lean. The individual pieces of beef containing both fat and lean are exposed to the freezer on the order of minutes, generally, between 2 and 3 minutes to create friable fat matter prone to crumble under a crushing force, whereas the lean remains pliable, flexible and not prone to crumble under a similar crushing force. The temperatures will then begin to converge to equilibrium; therefore, it is useful to process the particles of beef in the bond breaking compression device 1042 before the fat is no longer friable and easy to crumble.

TABLE 2

Temperature Difference of Fat and Lean

|   | Date | Time | delta T' | delta T | Temperature Fat | Lean |
|---|------|------|----------|---------|-----|------|
| 1 | Aug. 3, 2010 | 3:31:00 PM | 0:00 | 0:00 | 5.2 | 29.0 |
| 2 |  | 3:37:00 PM | 0:06 | 0:06 | 27.9 | 26.6 |
| 3 |  | 3:43:00 PM | 0:06 | 0:12 | 29.5 | 26.9 |
| 4 |  | 3:50:00 PM | 0:07 | 0:19 | 30.9 | 27.8 |
| 5 |  | 3:58:00 PM | 0:08 | 0:27 | 29.7 | 28.6 |
| 6 |  | 4:03:00 PM | 0:05 | 0:32 | 30.6 | 28.9 |
| 7 |  | 4:14:00 PM | 0:11 | 0:43 | 31.0 | 29.5 |
| 8 |  | 4:22:00 PM | 0:08 | 0:51 | 32.8 | 29.8 |
| 9 |  | 4:31:00 PM | 0:09 | 1:00 | 33.3 | 30.0 |
| 10 |  | 4:36:00 PM | 0:05 | 1:05 | 35.3 | 30.0 |

The stream of temperature reduced beef particles can then be immediately, without storing in containers or otherwise that could allow temperature equilibration of the fat and the lean matter, or on an extended conveyor, be transferred through a bond breaking process during which the beef particles are "flexed" or bent by distortion and partially crushed as they are transferred between, for example, a pair (two) of parallel rollers manufactured from any suitable stainless steel such SS316 or SS304 grades, but wherein the beef particles are not completely flattened as would occur if placed on a hard surface and rolled upon with a very heavy roller (steam/road roller for example). This bond breaking compression process is intended to cause breakage of the friable fat matter into smaller pieces of, in the majority of instances, approximately 100% fatty adipose tissue (fat) and smaller than the fat matter was before transfer through the bond breaking process and much more so than the lean matter which remains in most cases intact but without any more than about 10% fat, or less, remaining attached to the majority of lean matter after transfer through the bond breaking process. In other words, the fat in the beef particles will "crumble", fracture, and break into small pieces and separate from the lean in a continuous stream of what becomes small (smaller than before transfer through the crushing process) fat particles and lean particles that still comprise some fat, but are approximately more than 90% lean beef.

Following temperature reduction in tunnel 1036, and while the fat and lean maintain different temperatures, as discussed above, the beef particles still containing fat and lean are transferred to a bond breaking compression device 1042 that clamps and flexes the particles so as to cause the friable fat to crumble and break away from the flexible lean component of the beef. Device 1042 may comprise at least one or more pairs of horizontally disposed and opposed specially manufactured rollers, such as rollers 1043 and 1045, arranged so that one pair is above the other, such that the stream of beef particles spread out across the full width of the tunnel conveyer are dropped in a waterfall effect between the upper pair of rollers which clamp the particles and flex so as they are transferred between the clamping rolls without crushing and in this way cause the friable fat matter attached to any flexible lean matter to break away in small particles. One embodiment of a profile of a pair of rollers is described in association with FIGS. 13a and 13b. After processing between the upper pair of rollers, the stream of beef particles drops between the second pair of similarly arranged rollers driven by a suitable electric motor to ensure processing of all particles which are then transferred to accumulation hopper 1044 and by vacuum transfer are conveyed via conduit 1046 into hopper 1054 mounted above the inlet to the separation manifold 1072. From the description above, embodiments for separating lean from fat are possible by chilling, followed by the application of pressure or a crushing.

In one embodiment, a method for the separation of fat from meat includes: (a) providing individual pieces of meat containing lean and fat; (b) subjecting the individual pieces of meat to chilling for a time sufficient to render the fat into a brittle condition; and (c) with a machine, and with the fat in the brittle condition, subjecting the individual pieces of meat to a crushing force to separate particles of fat from the individual pieces of meat.

The method may further include rendering the fat particles into beef tallow. The method may further include exposing the individual pieces of meat after crushing to carbon dioxide at or above the critical temperature and critical pressure. The method may further include centrifuging the fat particles after being separated from the individual pieces of meat. The method may further include emulsifying the fat particles after being separated from the individual pieces of meat. The method may further include extracting lean from the fat particles. The method may further include separating fat from lean in a centrifuge. In the method, the lean matter can be chilled to a temperature to cause freezing of water in the lean, and the temperature of the fat is lower than the temperature of the lean. In the method, during step (c), the lean can be left intact. In the method, in step (b), the surface temperature of the fat can be lower than the surface temperature of the lean by at least 5° F. In the method, in step (b), the surface temperature of the lean can be 26° F. or less, and the surface temperature of the fat can be 5° F. or greater, and the surface temperature of the fat can be lower than the surface temperature of the lean. The method may further include passing the pieces of meat between a pair of parallel, adjacent, non-contacting, driven rollers, each roller having alternating recesses and protrusions around the perimeter, wherein the rollers are arranged to position a recess of one roller opposite to a protrusion of the second roller, without the rollers being in contact. In the method, the meat can be beef.

A method for the separation of fat from meat can include: (a) providing individual pieces of meat containing lean and fat; (b) subjecting the individual pieces of meat to chilling for a time sufficient to produce a difference in temperature between the fat and lean, wherein the fat is chilled such that the fat is friable and crumbles into finer particles when subjected to a crushing force and the lean is cooled to a higher temperature than the fat and the lean is able to withstand a similar crushing force without substantially crumbling into smaller particles; and (c) with the fat and lean at the temperatures produced in step (b), subjecting the individual pieces of meat to a crushing force to separate particles of fat from the individual pieces of meat.

In the method, after subjecting the individual pieces of meat to chilling, the temperature at the surface of the fat can be 5° F. to 25° F. In the method, after subjecting the individual pieces of meat to chilling, the temperature at the surface of the lean can be 16° F. to about 34° F. In the method, the chilling time of the individual pieces of meat can be approximately 2 minutes to 3 minutes. The method may further include transferring the individual pieces of meat and separated particles of fat to a vessel and filling the vessel with a fluid comprising, at least, water, and allowing the particles of fat to rise in the fluid and allowing the individual pieces of meat to sink in the fluid, followed by collecting the fat and the individual pieces of meat. The method may further include allowing bone to sink in the fluid to a lower elevation as compared to an elevation attained by the individual pieces of meat. The method may further include transferring the individual pieces of meat and separated particles of fat within a conduit filled with a fluid comprising, at least, water, and allowing the particles of fat to rise in the fluid and allowing the individual pieces of meat to sink in the fluid while the fluid travels in the conduit, followed by collecting the fat and the individual pieces of meat. The method may further include subjecting the individual pieces of meat to a crushing force produced by intermeshing teeth to separate particles of fat from the individual pieces of meat. The method may further include, after separating the particles of fat from the individual pieces of meat, combining a measured portion of the fat particles with a measured portion of the individual pieces of meat to achieve a predetermined fat content for the meat. The method may further include cutting raw meat to a size not exceeding 2 inches in any dimension to produce the individual pieces of meat of step (a). In the method, after producing the individual pieces of meat, the pieces can be chilled to minimize agglomeration of the pieces into frozen masses. In the method, after crushing, the individual pieces of meat in step (c) can comprise predominantly lean meat. The method may further include contacting the separate particles of fat and individual pieces of meat of step (c) with a flowing fluid comprising, at least, water, in a conduit, and allowing frozen water in the individual pieces of meat to thaw and increase in density, which causes the individual pieces of meat to fall in the flowing fluid, while the fat particles are buoyant in the fluid, and collecting the individual pieces of meat in a lower conduit of a manifold and collecting the fat particles in an upper conduit of the manifold. The method may further include separating the fluid from the individual pieces of meat and fat particles, weighing the fat, and combining a portion of the fat with the individual pieces of meat to produce a meat product of predetermined fat content. The method may further include centrifuging the individual pieces of meat to remove the fluid after separating the fat particles.

Following the bond breaking compression device 1042, the beef particles, once a combination of lean and fat matter, are now smaller particles of predominantly all fat and predominantly all lean owing to the breaking of the fat. The lean particles and the fat particles are next separated. Separation may be done in cycles. The lean particles and the fat particles are accumulated in hopper 1054 until a sufficient amount has been collected to provide for the next separation cycle in the separation equipment. A vacuum source draws the stream of crushed particles into hopper 1054. Carbon dioxide gas can be fed into the bond breaking compression device 1042 to displace air and provide the gas by which the vacuum source enables transfer through an enclosed conduit 1024 to hopper 1054.

A rotary valve at the bottom of hopper 1054 discussed in association with FIG. 1 is used to provide a selected quantity of lean and fat particles to separation equipment.

Referring to FIG. 1, it is optional to include a small particle separation in block 14. The small particle separator if used would be placed directly following the bond breaking compression device 1042 and hopper 1044. In one embodiment, a particle separator system comprises a large particle separator and a small particle separation. The large particle separator applies pressure to the large particles of beef by way of a horizontally disposed assembly of parallel stainless steel bars mounted to a drive means at one end via a stainless steel disc end plate and to a bearing at the opposite end also via a stainless steel disc; the horizontally disposed assembly of bars can rotate in the lower section of a horizontal trough having a lower profile that follows the underside profile of the rotating bars. The trough material is stainless steel and is perforated with holes of a selected size such that when the rotating assembly of bars is positioned so as to have little clearance between it and the lower section of the perforated trough, any particles of greater size than the perforations will be size reduced by crushing until the reduction in size allows the particles to fall through the perforations. The size reduced particles are then returned to the large particle separator and added to the beef particles and then transferred to a second particle size reduction and from there via screw conveyor or vacuum transfer conduit to transfer to hopper 1054 before separation equipment.

2. Blocks 22, 24, 26, 28, 30, 32, 34, 36, 38, 40

Blocks 22, 24, 26, 28, 30, 32, 34, 36, 38, 40 of FIG. 1 will now be described with reference to FIGS. 2, 3, 4, 5, 6, 7, 8, 9, 10, 11, and 12.

The section shown in FIG. 2 between hopper 1054 and hopper 1111 is arranged to separate the lean particles from the fat particles produced in the bond breaking compression device 1042.

In general, separation of the fat particles from the lean (having some fat) particles is done by way of buoyancy separation in a fluid that has a density lower than that of the lean particles, when the water in the lean particles is not frozen. Separation may also be conducted with a fluid that has a density greater than that of the fat particles. Separation may also be conducted with a fluid that has a density in the range between the fat particles and the lean particles. The fluid can include water, or water with carbon dioxide, which results in the production of carbonic acid. At the temperatures required for bond breaking discussed above, when fluid is first mixed with the lean and fat particles, the particles will float including the lean particles, and be suspended at the uppermost space available in the fluid and just below a surface of the fluid or suspended within the fluid. As the temperature of the fluid and fat and lean particles begins to equilibrate, which involves the initial lower temperature of the lean particles increasing, corresponding with the decreasing temperature of the fluid, the buoyancy of the lean particles will start to "fail" until the lean particles sink toward the base of the fluid leaving the fat particles floating at the fluid surface or uppermost available space in the fluid. An increase in the density of the lean particles is seen as the lean and water thaw, which reduces the volume of lean particles and correspondingly increase in density. Fat having a lower content of water does not experience as great an increase in density due to water thawing.

Before and during the lean particles and fat particles have reached equilibrium with the fluid, any bone chips that may be present will sink when mixed together with the fluid, thereby providing a convenient means of separating bone chips first, which will most preferably be arranged to occur immediately after blending the lean and fat particles with the fluid and before temperature equilibration of the particles or when the lean particle temperature has increased so as to thaw the lean/water content of the lean matter upon which shrinkage of the lean will occur causing it to sink in the fluid. The fat particles, frozen or not, will remain floating at the fluid surface. By lowering the fluid temperature relative to the temperature of the lean particles, complete thawing and temperature equilibration will be delayed and, accordingly, the lean particles will remain suspended for a longer period and this can assist with UVc pathogen deactivation as described below.

The lean and fat particles suspended in an anti-microbial fluid of carbon dioxide and water (at a suitable ratio of fluid to particles in the range of 1:1 to 5:1, or 10:1 to 1:10 by weight) can be treated by exposure to UVc light, which is lethal to pathogens when the exposure is sufficient. The suspension of frozen lean and fat particles in sufficient anti-microbial carbonic acid fluid (or water) can be transferred at a steady rate of transfer through an enclosed/sealed internally polished (preferably stainless steel) tube within which an elongated, tubular profiled, UVc light source is mounted, in parallel with the enclosing SS tube. As the temperature of the mixture steadily equilibrates, the outer surface of the lean and fat particles thaw, if pathogens are present, the single celled organisms will be at the surface of the beef particles or suspended in the fluid but, in any event, at locations readily accessible to the direct "line of sight" of the UVc light source given that the particles revolve while suspended in the fluid. UVc is lethal to such pathogens as *E. Coli* 0157:H7 and Salmonellas and such pathogen contamination can be deactivated by adequate exposure to UVc. The particles suspended in the fluid revolve randomly as the mixture is transferred through the UVc apparatus. Pathogens are quickly deactivated when exposed to the UVc light source.

In one embodiment, the process of separating fat from lean is achieved within enclosed conduits. After separation of predominantly lean particles from predominantly fat particles simultaneously in two streams including a first high percentage lean content stream (comprising for example 93%+/−<1.0% lean with the balance being fat) and a second initial fat stream of high fat content (comprising about 85% fat with the balance being lean). The two streams are transferred within first and second enclosed conduits, in such a way that the separated lean and fat travel along the respective first and second conduits at approximately the same velocity (up to about 10 feet per second) to each other. The conduits in which the respective streams of fat particles and lean particles travel can be measured by flow measuring instruments, such as coriolis instruments. The separated second stream of fat, although separate from the first stream of lean, is in relative close proximity to the lean stream from which it was separated. In this way, the fat stream can be divided, yet again, into third and fourth stream divisions wherein at least one of the fat stream divisions can be a measured third stream division of the initial second stream of fat. The mass of the measured third stream division can be adjusted by varying the quantity transferred in the third stream and continuously measured and/or weighed on a continuous weighing, variable speed conveyor belt.

The measured third stream of fat, or any other stream, can then be recombined with the entire first stream of lean such that the relative proportions of fat and lean after recombining provide a single recombined stream with fat and lean content proportions according to a selected ratio. In other words, for example, by accurately measuring the fat stream division, the resultant lean content of the recombined stream can be any value less than the lean content (93%+/−<1.0% lean) of the first lean stream. A recombined stream lean content of 81%, 85%, 90% or any other value can be produced in this way.

Referring to FIG. 2, the stream of still partially frozen particles (mostly/only fat and mostly/only lean) is drawn in to hopper 1054 through vacuum, or otherwise. The bottom of hopper 1054 is connected to a vertical column (seen best in FIGS. 6, 7, and 8). The vertical column then connects to the separation manifold 1072, of which there are several embodiments, any of which may be used and are interchangeable. Furthermore, the separation equipment need not be a manifold. As an alternative to a manifold, a separation vessel may be used, such as the one shown in FIG. 5. The stream traveling through the vertical column is combined with a pressurized stream of liquid carbonic acid (H2CO3) that is temperature and massflow controlled, at about 70 psia (but the pressure could be up to about 50 Bar (725 psia)). The liquid carbonic acid is measured, such as with a coriolis instrument. In other embodiments, liquid carbonic acid may be substituted with water, or other fluids. The liquid carbonic acid that is injected in the vertical column may be generated by combining recovered and stored carbon dioxide, as described below, with water. In FIG. 2, vessel 1048 is a storage vessel for carbonic acid fluid.

As described further below, the mixture comprising lean particles, fat particles, and liquid carbonic acid (or other fluid) are separated into components. The fat is separated and extracted from the fluid and processed, optionally, through a particle size reducing apparatus such as a bowl chopper or even an emulsifier used to break the cell walls but at this stage in the separation process, the fat particles in the fat stream will be size reduced, but not to the extent of breaking cell walls, but only so as to ensure all red and white colored lean still present with the fat is recovered.

Additionally, the lean particles are separated from the fluid and then optionally combined with the fat stream after the fat stream has been processed via a size reduction apparatus such as, but not limited to a bowl chopper.

In one embodiment, the combined lean and fat streams including a reduced quantity of carbonic acid (or carbon dioxide and water), altogether in a single stream is then transferred into a decanter style centrifuge. The decanter style centrifuge separates the lean, liquid water and carbonic acid, and fat in typical fashion into layers according to density with the heaviest (lean) forming a layer around the inner surface of the centrifuge barrel. The water, carbon dioxide and fat together are separated from the lean in two entirely separate streams.

The first of several embodiments of a separator following the bond breaking compression device, including the separation manifold will be described referring to the schematic illustration of FIG. 3, which includes equipment similar to FIG. 2. The temperature reduced stream of fat and lean particles from the tunnel freezer 1502 is transferred in the direction shown by arrow 1508 to hopper 1510 with rotary valve, which facilitates transfer of the particle stream from ambient pressure to the pressurized conditions within the separation manifold 1512. Simultaneously, a temperature and mass flow controlled, measured quantity of carbonic acid (H2CO3) is also transferred from pressure vessel 1526, through coriolis measuring instrument 1528, and along a conduit represented by arrow 1544 into manifold 1512.

The two mass flow and temperature controlled streams of particles and carbonic acid fluid are blended together in the vertical column connected to the bottom of hopper 1510 and the temperatures begin to equilibrate. Initially, however, the frozen condition of the lean and fat result in both lean and fat solids, floating. Any heavy, bone fragments, which are unaffected by the water freezing temperatures, of the fat and lean solids sink immediately to the lowermost location in the manifold it can fall to, which, in one embodiment, is arranged to be located at the base of the vertical column located directly beneath the hopper 1510 and rotary valve. From the vertical column, the conduit may be diverted horizontally. In one embodiment, for example, the bone matter may be collected at a bend from the vertical column to the horizontal conduit.

As the mixture of solids and liquid carbonic acid are transferred along the horizontal conduit ("manifold"), temperature equilibration between the solids and liquid increases the density of the high-water-content lean matter as the formerly frozen water thaws and shrinks. The lean and fat solids quickly separate as temperature equilibration occurs, causing the density of lean to increase causing the fat and lean solids to diverge as they are carried with the flow of low pH carbonic acid. The fat matter remains buoyant, carried by the fluid at a higher elevation than the lean matter and the lean particles fall to the lowermost section of the conduit through which they are still propelled along the horizontal conduit by the flow of liquid. The separation manifold is constructed so that following temperature equilibration of the particles, a conduit connected directly to the underside of the horizontal separation manifold and extending downward, allows the lean particles to be separated from the main fluid stream. An opposing conduit, attached directly to the upper side of the horizontal conduit, allows the fat particles to diverge upwardly and in this way, the fat and lean particles are divided into two streams, wherein the lean particles ("matter") follow a conduit that becomes 1531 and the fat particles ("matter") follow a path that connects directly to conduit 1514.

Enclosed conduit 1531 includes a coriolis measuring instrument 1530 through which the entire stream of liquids and solids carried by the conduit 1531 is transferred. Conduit 1531 connects directly to a positive displacement pump 1524, which controls mass flow therethrough. The fat stream carried via conduit 1514 is transferred via coriolis measuring instrument 1513 and to positive displacement pump 1515.

Two decanter style centrifuges 1532 and 1519 are conveniently located so as to allow direct connection of 1531, which is carrying the stream containing lean matter, to centrifuge 1532 and conduit 1514, which is carrying the stream containing fat matter connects to centrifuge 1519. Centrifuge 1532 is positioned to allow discharge of the lean matter, after separation from the liquid portion of the stream, directly onto a continuous conveyor 1534, which also includes a weighing station. Similarly, centrifuge 1519 is positioned to allow discharge of the fat matter after separation from the liquid portion of the stream, directly onto a continuous conveyor 1521, which also includes a weighing station. The de-liquefied lean matter is carried in the direction shown by arrow 1536 and continuously weighed as it is carried toward the collection conveyor 1550, and the de-liquefied fat matter 1520 carried by weighing conveyor 1521 is weighed as it is carried toward the collection conveyor 1550. A coriolis measuring device 1538 is arranged to measure the quantity of liquid separated from the lean matter carried by conduit 1531 and transferred through discharge pipe 1522 by centrifuge 1532, and the liquid separated from the fat matter carried by conduit 1514 and separated by centrifuge 1519 is then transferred via conduit 1516 and measured by coriolis measuring instrument 1517. Coriolis measuring device 1528 is arranged to measure the quantity of water with the carbonic acid added to the combined stream transferred via separation manifold 1512, and, in this way, the quantity of water remaining with the lean matter discharged from centrifuge 1532 can be determined by subtraction after measuring the content of the fat matter carried by conduit 1514 with coriolis measuring instrument 1513 and the quantity of separated liquid discharged via 1516 and through coriolis measuring instrument 1517, thereby enabling determination of the lean content of the lean matter deposited by centrifuge 1532 onto conveyor 1534.

Coriolis measuring instrument 1530 continuously measures temperature, mass flow and water content of the stream carried by conduit 1531 and coriolis measuring instrument 1513 continuously measures temperature, mass flow, and water content of the stream carried by conduit 1514.

The quantity of fat deposited onto conveyor 1521 is already known by subtracting the quantity of liquids measured by coriolis 1517 from the mass flow of matter measured by coriolis measuring instrument 1513. In this way, a measured quantity of fat can be returned to the lean matter carried by conveyor 1534 by restricting the quantity of fat (tallow) carried on conveyor 1521 with the balance of fat matter discharged in the direction shown by 1518. In this way, the recombined lean and fat streams can be measured so as to produce a product of selected fat content boneless beef carried along conveyor 1550.

Figure 3:
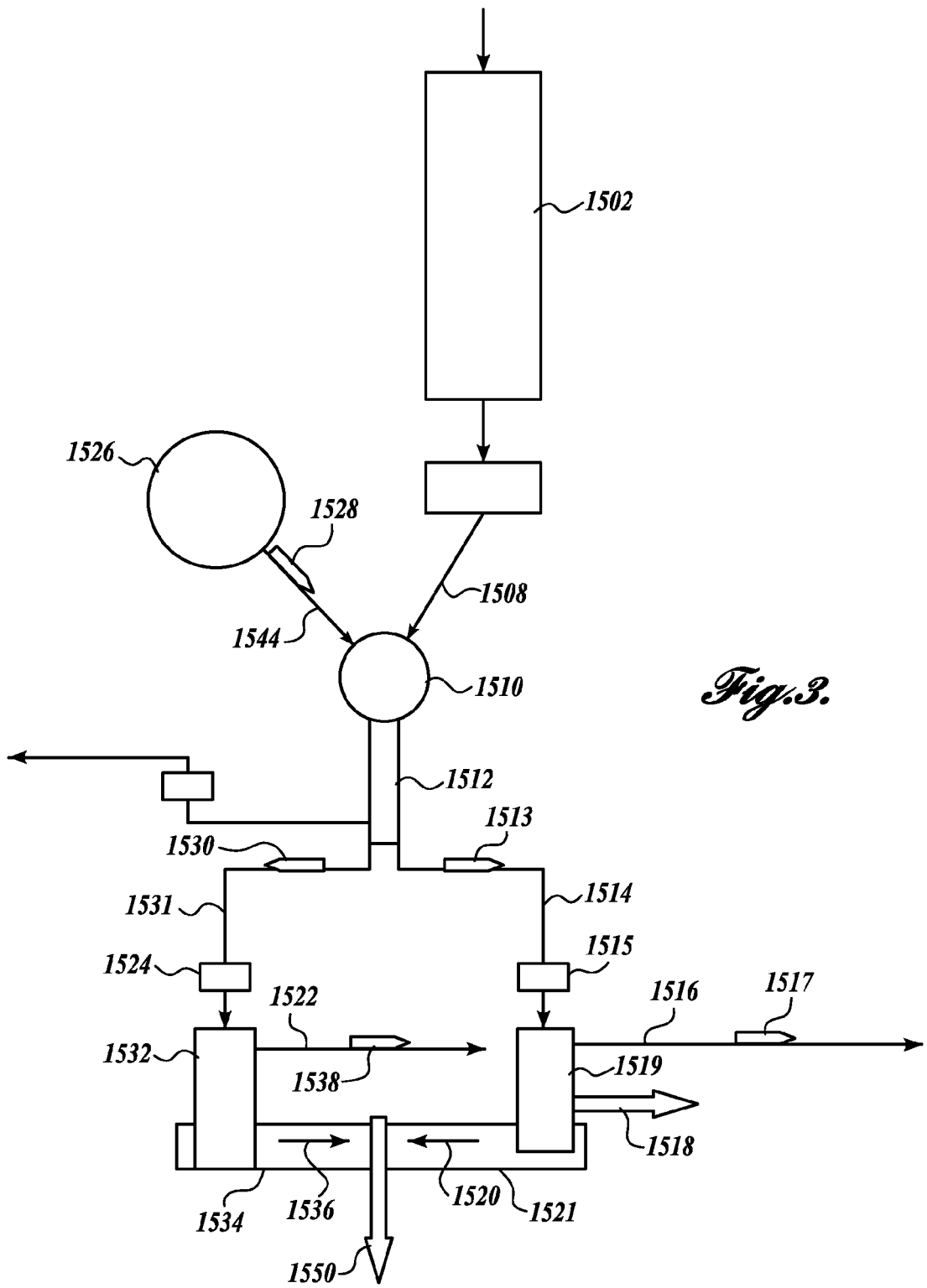
FIG. 3 is a diagrammatical illustration of apparatus for the separation of fat from lean.

Referring back to FIG. 2, the apparatus of FIG. 2 is similar to the apparatus of FIG. 3.

As the mixture of solids and liquid carbonic acid are transferred along the horizontal conduit 1072 ("manifold"), temperature equilibration between the solids and liquid increases the density of the high-water-content lean matter as the formerly frozen water thaws and shrinks. The lean and fat solids quickly separate as temperature equilibration occurs, causing the density of lean to increase causing the fat and lean solids to diverge as they are carried with the flow of low pH carbonic acid. The fat matter remains buoyant, carried by the fluid at a higher elevation than the lean matter and the lean particles fall to the lowermost section of the conduit through which they are still propelled along the horizontal conduit by the flow of liquid. The separation manifold is constructed so that following temperature equilibration of the particles, a conduit connected directly to the underside of the horizontal separation manifold and extending downward, allows the lean particles to be separated from the main fluid stream. An opposing conduit, attached directly to the upper side of the horizontal conduit, allows the fat particles to diverge upwardly and in this way, the fat and lean particles are divided into two streams, wherein the lean particles ("matter") follow a conduit which becomes 1087 and the fat particles ("matter") follow a path that connects directly to conduit 1085.

Enclosed conduit 1087 includes a coriolis measuring instrument 1088 through which the entire stream of liquids and solids carried by the conduit 1088 is transferred. Conduit 1088 connects directly to a positive displacement pump 1089, which controls mass flow there through. The fat stream carried via conduit 1085 is transferred via coriolis measuring instrument 1086 and to positive displacement pump 1101.

Two decanter style centrifuges 1090 and 1107 are conveniently located so as to allow direct connection of conduit 1087, which is carrying the stream containing lean matter, to centrifuge 1090 and conduit 1085, which is carrying the stream containing fat matter connects to centrifuge 1107. Centrifuge 1090 is positioned to allow discharge of the lean matter, after separation from the liquid portion of the stream, directly onto a continuous conveyor 1098, which also includes a weighing station. Similarly, centrifuge 1107 is positioned to allow discharge of the fat matter after separation from the liquid portion of the stream, directly onto a continuous conveyor 1105, which also includes a weighing station. The de-liquefied lean matter is carried in the direction shown by arrow 1103 and continuously weighed as it is carried toward the collection conveyor 1110, and the de-liquefied fat matter carried by weighing conveyor 1105 is weighed as it is carried toward the collection conveyor 1110. A coriolis measuring device is arranged to measure the quantity of liquid separated from the lean matter carried by conduit 1087 and transferred through discharge pipe 1100 by centrifuge 1090, and the liquid separated from the fat matter carried by conduit 1085 and separated by centrifuge 1107 is then transferred via conduit 1131 and measured by coriolis measuring instrument. Coriolis measuring device 1064 is arranged to measure the quantity of water with the carbonic acid added to the combined stream transferred via separation manifold 1072, and, in this way, the quantity of water remaining with the lean matter discharged from centrifuge 1090 can be determined by subtraction after measuring the content of the water of the fat matter carried by conduit 1085 with coriolis measuring instrument 1086 and the quantity of separated liquid discharged via 1131 and through coriolis measuring instrument, thereby enabling determination of the lean content of the lean matter deposited by centrifuge 1090 onto conveyor 1098.

Coriolis measuring instrument 1088 continuously measures temperature, mass flow and water content of the stream carried by conduit 1087 and coriolis measuring instrument 1086 continuously measures temperature, mass flow, and water content of the stream carried by conduit 1085.

The quantity of fat deposited onto conveyor 1105 is already known by subtracting the quantity of liquids measured by coriolis in line 1131 from the mass flow of matter measured by coriolis measuring instrument 1086. In this way, a measured quantity of fat can be returned to the lean matter carried by conveyor 1098 by restricting the quantity of fat (tallow) carried on conveyor 1105. In this way, the recombined lean and fat streams can be measured so as to produce a product of selected fat content boneless beef carried along conveyor 1111.

After the production of a selected fat content boneless beef through any one of the embodiments described herein there is downstream from member 1111, conduit 1130 arranged to transfer a stream of boneless beef having a selected fat content into a vacuum dehydration and storage vessel 1136. Vessel 1136 is mounted on three load cells 1134, 1114, and 1120 and is arranged to enable a moisture adjustment by way of vacuum dehydration. For example, moisture can be extracted under very low vacuum (below 4.7 torr) to ensure the moisture content of the finished beef corresponds with the input stream prior to separation. After moisture content correction, processed beef is transferred via conduit 1122 to an enclosed carbon dioxide flooded hopper 1124, such as by Handtmann, mounted directly above and to the vacuum stuffer 1138, such as by Handtmann.

An inline grinder 1126 can be used optionally as the beef is transferred to chub packing machine 1128 (Poly Clip FCA 160 chub packaging system).

Figure 4:
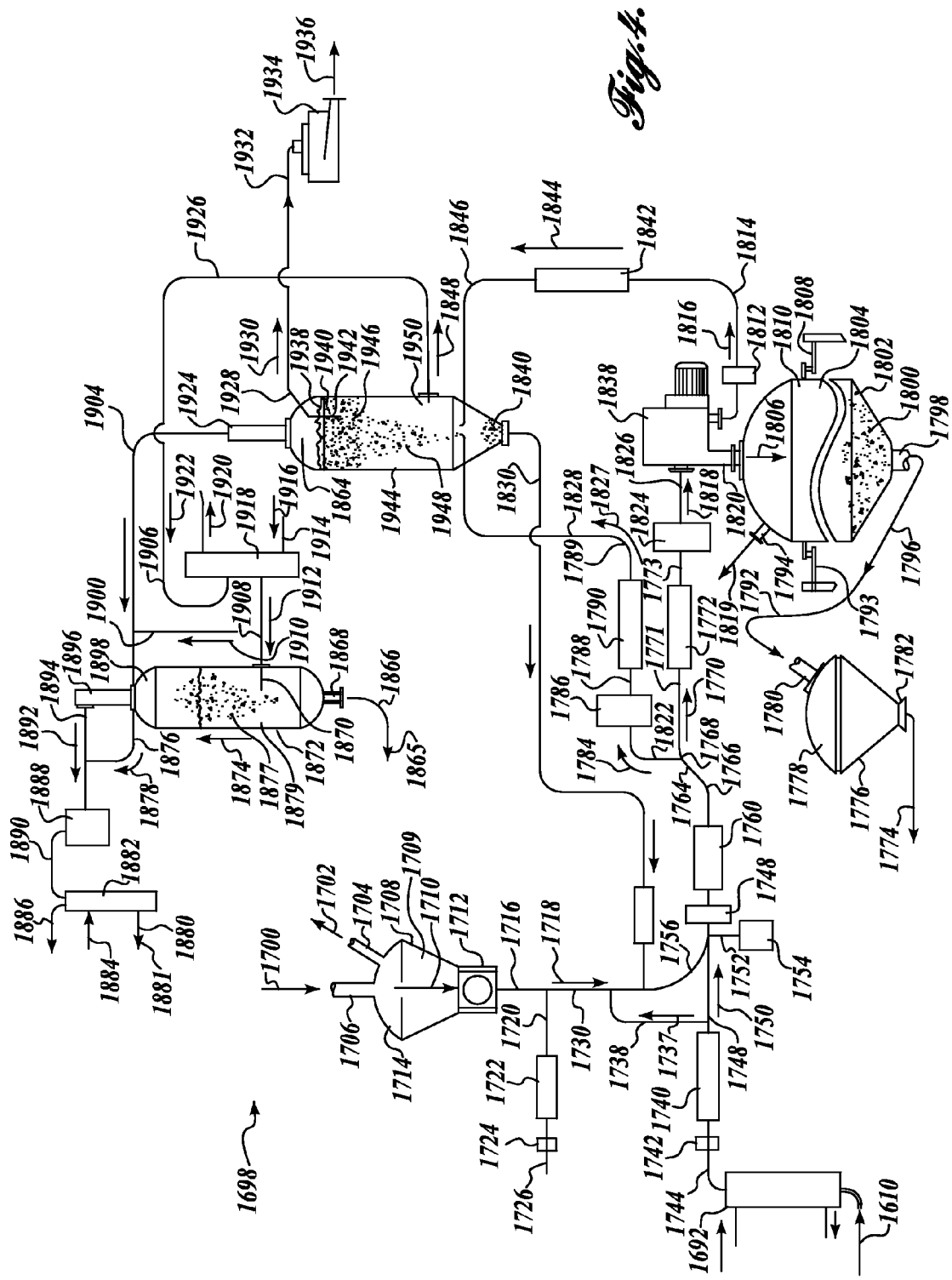
FIG. 4 is a diagrammatical illustration of apparatus for the separation of fat from lean.

Referring now to FIG. 4, a second embodiment of equipment for manufacturing boneless beef having a selected fat content and produced from any suitable grade of boneless beef, is illustrated. As with the embodiment illustrated in FIGS. 2 and 3, the embodiment of FIG. 4 is one of several embodiments of equipment that may follow the bond breaking compression device, block 12 of FIG. 1. Any of the embodiments described herein for equipment following the bond breaking process of block 12 of FIG. 1 is interchangeable with each other embodiment.

FIG. 4 also includes equipment to carry out the process of liquid separation from lean matter, block 42 of FIG. 1, liquid separation from fat matter, block 48 of FIG. 1, carbon dioxide recovery, block 56 of FIG. 1, carbon dioxide collection, block 58 of FIG. 1, and waste water treatment, block 60 of FIG. 1. The blocks just described are also adaptable to be used with other embodiments for separation of fat and lean, and are not limited to being used solely with the separation configuration of FIG. 4.

The manifold includes three "in-put" ports at 1706, 1726 and 1610 which connect via a series of manifolds and valves to a "main line" conduit 1766, which collectively provides a means to separate a mixture of carbonic acid and beef particles into the following: (1) a stream of high lean content boneless beef; (2) a stream of beef fat; (3) a stream of recovered, pressurized carbon dioxide; and, (4) a stream of waste water.

A stream of particle size and temperature reduced boneless beef including fat particles and lean particles, such as produced from the bond breaking compression device, is transferred from its place of production via vacuum conveyor 1706 in the direction shown by arrow 1700. A vacuum generator (such as a Gardner Denver 4512 blower) is connected directly to conduit 1704 so as to facilitate pressure reduction in space 1709 by evacuation. Suitably pressurized carbon dioxide gas is transferred into port and conduit section 1720, and through flow regulator 1724 and coriolis measuring instrument 1722, and then directly into column 1716 via 1720. The purpose of providing carbon dioxide into the sections of vertical column shown as 1716 and 1730 is to maintain a carbon dioxide gas atmosphere for that section of vertical column 1716 and 1730.

A third fluid stream of carbonic acid is provided under selected pressure of at least 70 psia via conduit 1610 in the direction shown by arrow through heat exchanger 1692 and into conduit section 1744 which communicates directly with coriolis measuring instrument 1740 via regulator 1742. The flow of carbonic acid transferred via heat exchanger 1692 is thereby temperature controlled to a selected temperature within a tight tolerance of not more than + or −5° F. The temperature controlled flow of carbonic acid can be directed via conduit 1738 in the direction shown by arrow 1737 or, alternatively, via conduit 1748 in the direction shown by arrow 1750 or a proportion of the flow of carbonic acid can be divided according to any selected proportions via both conduits 1738 and 1748 in the direction shown by arrows 1737 and 1750, respectively. In this way, a continuous stream of mass flow selected carbonic acid is transferred into conduit sections 1730 and 1756 with a carbon dioxide gas atmosphere filling section 1716 of the vertical column. The flow of carbonic acid is generally in the direction shown by arrow 1718, through segments 1730, 1756, and onto section 1766.

Particles of temperature controlled beef, including lean particles and fat particles, are transferred into vertical column 1716 via rotary valve 1712 wherein the particles are transferred from fully enclosed hopper 1708 and in particular from space 1709 and the direction shown by arrow 1710. The lean particles and fat particles are transferred into space 1709 in the direction shown by arrow 1700 by inducing a lower gas pressure within the free space of hopper 1708 enclosed and sealed by hopper cover 1714. Gas from within space 1709 is transferred via conduit 1704 in the direction shown by arrow 1702 by way of a suitable Rootes blower or similar gas evacuation pump that is attached to the extension (not shown) of conduit 1704. When a lower gas pressure has been induced within the free space 1709, frozen beef particles comprising the lean particles and fat particles from the place of production are transferred to the hopper 1708, via a conduit extended from 1706 to the source of the particles. Said temperature controlled particles are held within space 1709 for a relatively short period of time prior to being transferred via rotary valve 1712 and into the carbon dioxide gas filled column 1716. Accordingly, the temperature controlled particles which comprise substantially either all lean beef or all beef fat having been processed to break any bond that held the fat matter and lean matter together. Therefore, the temperature controlled particles transferred into vertical column 1716 will fall in the direction shown by arrow 1718 and combine with the liquid carbonic acid transferred into the lower part of vertical column section 1730 and, after mixing, will be carried by the rapidly flowing stream of carbonic acid through a 90 degree conduit section 1756 and toward the horizontal coriolis measuring instrument 1760 via variable frequency drive controlled Waukesha positive displacement pump 1758.

Prior to transfer through pump 1758, any very dense bone pieces or fragments, being more dense than the particles suspended in the stream of carbonic acid, will fall to the lower part of any containment such as the conduit 1756 through which the particles and any bone fragments contained therewith is traveling. A vertical section of conduit 1752 communicates directly between a liquid filled container with space 1754 and the underside of a horizontal section of conduit immediately following conduit bend 1756. In this way, the heavy bone particles or fragments will fall via conduit 1752 and into contained space 1754 within which liquid carbonic acid has been provided. Following separation of bone fragments by transfer through conduit 1752, the remaining particles which are suspended in the liquid carbonic acid, are carried into the inlet port of Waukesha positive displacement pump 1758 and the combined flow of carbonic acid with suspended particles is pumped via Waukesha pump 1758 and through coriolis measuring instrument 1760.

The temperature of carbonic acid is controlled prior to transfer into the separation manifold comprising conduit sections 1756, 1766 and toward the confluence 1764 of what becomes conduit branches 1822, and 1771. Positive displacement pump 1758 is controlled to the extent that the fluid with suspended solids carried therein ensures a suitable pressure required to minimize and substantially eliminate any bubbles or voids in the combined stream as it is transferred through coriolis measurement instrument 1760. After measurement by coriolis 1760, the combined stream is transferred into conduit section 1766 and toward confluence 1764. The temperature of beef particles and the temperature of the liquid carbonic acid within which the beef particles are suspended, are arranged such that rapid equilibration can occur around the outer surfaces of each particle. At any event, equilibration of the temperature of the lean particles occurs before the confluence 1764, such that the density of the lean particles is increased before the confluence and will fall to the lower section of the conduit 1766, so that the majority of lean particles will flow into conduit 1771. The beef particles and the liquid carbonic acid will ultimately be of the same temperature, however, time is required to enable the temperature equilibration and the disclosed method provides the conditions in which the fat particles will tend to float and the lean particles will tend to sink when suspended in the liquid carbonic acid. Furthermore, the method provides the conditions wherein the fat particles and the lean particles can be separated rapidly and within less than about 5 seconds after combining together.

The density of the lean particles is approximately 66 lbs/cubic foot when not frozen however when frozen, the density decreases by greater than 9 percent which is due to the expansion of water within the lean particles. Conversely, the fat particles, which contain a low percentage of water of about 11 percent, are not so much affected by temperature as are the lean particles. The density of the fat particles is approximately 61 lbs/cubic foot whereas the density of the carbonic acid is greater than 62.3 lbs/cubic foot. Accordingly, the fat particles will float whether frozen or not, but the lean particles will float only when frozen, and when not frozen, lean particles having a density of approximately 66 lbs/cubic foot cannot be suspended by the carbonic acid and will therefore sink. However at a point in the temperature equilibration process between the conditions of lean being either completely frozen or on the other hand completely above the frozen condition temperature of about 28.5° F., the average density of the lean particle will be greater than the density of the liquid within which it is suspended. In this condition, the center or core regions of each lean particle can be still frozen or a low temperature and the outer regions close to the surfaces of each particle will not be frozen. However, the average density will be greater than that of the liquid in which they are suspended and accordingly those lean particles will sink to a lower location within the carbonic acid. The disclosed methods provide the conditions to enable the separation of fat particles from the lean particles in a continuous stream but allow the separation of lean particles to occur when, at least, part of the particles remain in a frozen condition while the remaining part of the particle is an unfrozen condition and to then as quickly as can be achieved, separate the lean particles from the liquid carbonic acid which carries the lean particles along the low elevation conduit branch 1771 shown in FIG. 4.

After transfer through coriolis measuring instrument 1760, the combined stream of carbonic acid and particles is transferred through conduit section 1766 and, as the transfer occurs, fat particles and lean particles separate such that the fat particles occupy an upper region of any section of the conduit section 1766, whereas the lean particles occupy a lower region of the carbonic acid within which the particles are suspended and, to the extent that the combined stream of fat particles and lean particles suspended in the carbonic acid become arranged in such a manner that the fat particles occupy the upper section and the lean particles occupy the lower section of the conduit such that when the combined stream is transferred into the region 1768, the fat particles can be directed in the direction shown by arrow 1784 in branch conduit 1822, whereas the lean particles are suspended in a portion of the carbonic acid and transferred into branch conduit 1771 that is lower in elevation with respect to branch conduit 1822 in the direction shown by arrow 1770.

A variable frequency drive controlled Waukesha positive displacement pump 1786 controls the flow of fat particles and fluid into conduit 1822 before pump and conduit section 1788 after pump. Pump 1786 achieves flow control by increasing or decreasing the speed at which it operates which is controlled via a variable frequency drive according to the coriolis instrument measured fat content of the stream transferred via conduit 1788 and through 1790 to conduit section 1789 in the direction shown by arrow 1827. The measured fat content is compared with lean content of that portion of the combined lean and carbonic acid stream transferred via conduit section 1771 and through coriolis instrument 1772 into conduit section 1773 followed by Waukesha pump 1824, which is also controlled by a variable frequency drive speed control. In this way, the measurement data recorded of measurements by coriolis instruments 1740, 1760, 1790, and 1772 are compared continuously. The measurement of carbonic acid flow recorded after transfer via coriolis measuring instrument 1740 is compared with the recorded data for the same section of carbonic acid combined with the particles transferred and combined with the carbonic acid via rotary valve 1712. The mass flow, density, and temperature data recorded according to coriolis 1760 is compared with the mass flow, temperature, and density data recorded from measuring instrument 1740 and the difference between the two sets of data will show precisely the amount of particles that have been transferred and combined with carbonic acid stream through conduit 1610. Additionally, data recorded of mass flow, density, and temperature measurements measured by coriolis instruments 1790 and 1772 can also be compared and by doing so, the lean content within the stream transferred via conduit 1772 can be determined and the fat content of stream transferred via 1790 can also be determined and, if the lean content of the stream transferred via coriolis 1772 is insufficient, the speed of Waukesha pumps 1786 and 1824 can be adjusted to compensate for the lean content by reducing (or increasing) the mass flow of fluid via section 1822 and the mass flow of fluid via conduit section 1771 can be increased (or decreased) and the inadequate proportion of fat compensated by the addition of a greater quantity of suspended fat with the stream transferred via conduit 1771. Therefore, it can now be seen that the coriolis measuring instruments 1740, 1760, 1790, and 1772 can be used to measure and control Waukesha pumps 1758, 1786, and 1824 so as to direct a fat stream or a lean stream in such a manner as to enable the lean stream transferred via conduit 1826 in the direction shown by arrow 1818 and into pressurized centrifuge 1838, which rapidly removes the lean particles from the suspended condition in the carbonic acid. The lean particles are then transferred in a continuous stream via conduit section 1820 and in the direction shown by arrow 1806 and into free space 1804 of pressurized vessel 1802.

Vessel 1802 is suspended on load cells mounted on brackets 1808, 1793, and a third load cell not shown. In this way, the contents 1800 of vessel 1802 can be weighed. The fat content of lean beef 1800 can be controlled to within + or −1% lean content. Space 1804 is pressurized to maintain a pressure within the separation manifold and conduits of the system as required to facilitate the retention of carbon dioxide in the fluid separated by centrifuge 1838 and transferred via Waukesha positive displacement pump 1812 in the direction shown by arrow 1816 via conduit 1814 and through coriolis measuring instrument 1842 in the direction shown by arrow 1844.

The separated liquid carbonic acid is transferred via conduit 1846 and into free space 1950 within vessel 1944. Additionally, the stream of carbonic acid and fat suspended therein transferred via conduits 1822, 1788, 1789 and 1828 is also transferred into space 1950, wherein the buoyant fat matter 1948 floats upward to form a segment of fat filling a portion of vessel 1944 and held between the upper horizontal plane 1938 and a lower horizontal plane 1946. Vessel 1944 is pressurized and provides the means for fat particles to accumulate in stratum 1940 and to be transferred through conduit 1928 having an open end 1942 arranged to enable the pressurized fat particles to be transferred therethrough and through conduit 1928 and 1932 in the direction shown by arrow 1930.

Fat stream transferred there through is then transferred into emulsifier 1934 and after emulsification in the direction shown by arrow 1936, which communicates directly with a heat exchanger followed by decanter centrifuge which separates the oil from any remaining solids in the stream. Vessel 1944 comprises an elongated vertically disposed cylindrical tube with a dome closing the upper end of a tube and a cone at the lower end. A gate valve is provided at the lower end of the lower cone and a section of, for example, 6 inch diameter stainless steel tube 1924 is mounted at the upper end to enable the transfer of carbon dioxide gas via conduit 1904 and in the direction shown by arrow 1902.

Liquid carbonic acid from the separation process of the centrifuge 1838 and liquid carbonic acid containing fat particles is transferred to the lower section of the pressure vessel 1944, and the two streams are allowed to combine and any suspended solids separate by stratification, wherein a small amount of lean matter 1840 may still accumulate at the lowermost section of the vessel 1944 while carbonic acid is allowed to accumulate in a space 1950 at the middle section of the vessel 1944. Fat segment 1940 can therefore accumulate by flotation to the upper surface of carbonic acid liquid 1950. The location of inlet ports (2) and outlet ports (4) is arranged to facilitate the removal of accumulated and stratified fat via port 1942, stratified lean 1840 via conduit 1830, liquid carbonic acid via conduit 1926 in the direction shown by arrow 1848. Gas is transferred from space 1864 via conduit 1924, 1904 in the direction shown by arrow 1902 and conduit section 1876 in the direction shown by arrow 1878.

The stream of carbonic acid discharged from space 1950 within vessel 1944 is transferred into heat exchanger 1918 via conduit 1906, wherein the temperature of the carbonic acid stream is increased by at least 30° F. with a heating medium entering exchanger 1918 via 1914, such that the carbonic acid will decompose into water and carbon dioxide. The stream of decomposing heated fluid is transferred into vessel 1872 via conduit 1908 and port 1870 into space 1877 in the direction shown by arrow 1912. Carbon dioxide gas is then free to form bubbles and ascend upwardly in the direction shown by arrow 1874 and to accumulate in space 1898 and 1896 of vessel 1872. Carbon dioxide gas can then be transferred via conduit 1894 in the direction shown by arrow 1892 to Blackmer compressor 1888 and after compression to about 300 psia into heat exchanger 1882, via conduit 1890, and then via conduit 1886 in the direction shown by arrow to a suitable storage vessel prior to reuse. The shell side of tube in shell style heat exchanger 1882 is filled with chilled fluid transferred therein via conduit 1884 and the spent fluid returned to its source via conduit 1880 in the direction shown by arrow 1881, in order to cool the compressed carbon dioxide gas after compression.

Referring again to FIG. 4 and in particular vessel 1802. Lean beef 1800 accumulates in the lower portion of the vessel while carbon dioxide gas pressurized to a selected pressure but most preferably around 70 psia accumulates in space 1804 and 1810. Carbon dioxide gas is transferred into space 1804 with the lean stream and excess gas is released via conduit 1794 in the direction shown by arrow 1819 wherein said conduit 1794 communicates directly with conduit 1900 in the direction shown by arrow 1910 to connect with the carbon dioxide gas exiting vessel 1944. Excess gas accumulating in space 1864 and 1924 of vessel 1944 above the fluid surface 1938 is transferred through conduit 1904 in the direction shown by arrow 1902 and arrow 1878 communicating directly with conduit 1894, thereby enabling transfer of excess gas from vessels 1872, 1944, and 1802 to carbon dioxide compressor 1888, which elevates the gas supplied thereto at a pressure of greater than 25 psia compressing the carbon dioxide gas supply to around 300 psia which is then transferred via conduit 1890 and heat exchanger 1882 to suitable storage vessels (not shown) in the direction shown by arrow 1886. Arrows 1884 and 1881 represent the introduction of a cooling medium in the heat exchanger 1882 for cooling the carbon dioxide gas following compressor 1888.

Lean 1800 in vessel 1802 is progressively transferred via bottom port 1798 along conduit 1796 and 1792 in the direction shown by arrows to port 1780 and into enclosed hopper 1776. Enclosed hopper 1776 with cover 1778 is sealed and may be pressurized to any suitable pressure up to around 70 psia or ambient pressure however lower flange 1782 communicates directly with a vacuum filler such as a Handtmann VF620 and boneless beef having a predetermined fat content can thereby be transferred from holding hopper 1776 to any selected subsequent process such as chub packaging or anoxic case ready packaging in the direction shown by arrow 1774.

Heat exchanger 1918 is arranged to provide a means of heating the liquid carbonic acid transferred therein via conduit 1906. Hot fluid heated to a selected temperature of not more than 200° F. is transferred into the shell side of shell and tube heat exchanger 1918 so as to circulate around the tube side through which carbonic acid is transferred. Spent heating fluid is then discharged and returned to its source via conduit in the direction shown by arrow 1920 while the heated fluid carbonic acid, carbon dioxide gas and water, is transferred via conduit 1908 into space 1879 of vessel 1872. Waste water is discharged via port 1868 along conduit 1866 to a suitable disposal such as a sewer in the direction shown by arrow 1865.

3. Separators

This section more particularly describes the separators. As used herein, a separator is the equipment arranged to separate from a mixture containing fluid, fat particles, and lean particles, at least one stream of fluid and lean, and preferably separate two streams one of lean matter and one of fat matter. Particles of fat are formed, as discussed above, through a bond breaking process that breaks frozen fat from beef particles, leaving mostly lean on the remaining particle. The first stream contains fluid and the majority of the lean particles, and the second, contains fluid and the majority of the fat particles. The fluid can be carbonic acid, or a mixture of water and carbon dioxide, or other fluids mentioned herein. It is to be appreciated that at this stage of separation, small amounts of lean particles may be entrained in the fluid stream of fat particles, and small amounts of fat may be entrained in the fluid stream of lean particles. Indeed, the retention of some fat, and preferably a desired content of fat content in the fluid stream of lean particles is desirable to produce a lean product of desired fat content. The fat may also be present on lean particles that fails to separate from the lean matter during the bond breaking process. The first and second fluid streams mentioned correspond to blocks 32 and 36 of FIG. 1.

It has been determined that the fat matter of a frozen, diced piece of beef (or other meats) can be separated from the lean matter by crushing the frozen beef so as to fracture the fat (fatty adipose tissue).

The fat matter behaves quite differently to the lean matter, particularly when frozen to a temperature below about 25° F. to about 10° F. or lower, but not to such a low temperature that will cause the lean to become brittle. When reduced size beef pieces are frozen in this way, the fat can be shattered and will crumble providing a suitable means of separating the fat matter from the lean matter initially present in the beef pieces. Typically, this method of separation produces much smaller particles of fat while the lean particle size remains largely unaffected. It is therefore possible to separate lean from fat by freezing, shattering the fat matter, and then transferring the resultant stream of material through a vibratory sieve, which will allow the small fat particles to pass through a sieve while transferring the larger lean pieces to another hopper; however, the sieve is not as cost effective as using the method of flotation in an anti-microbial carbonic acid.

The separation of bone fragments, lean and fat relies not only on the respective densities of bone (cartilaginous matter or bone), fat, lean, and fluid carbonic acid to cause separation when all are maintained at a similar temperature, above the freezing point of water, but also when the water-containing lean and bone fragments are at a temperature below the freezing point of water.

Table 1 (below) lists the densities of; firstly, several beef components including bone, lean beef, fat and cartilaginous bone, at both above and below the respective frozen condition; and also carbonic acid and water. It can be seen that the densities of the frozen, water-containing beef components of lean and fat have lower densities compared to their respective unfrozen condition. This physical variation is because water expands when it freezes. The temperature at which beef freezes is at about 29° F. or below. Beef fat will float in water or carbonic acid whether it is in frozen condition or not but, as can be seen in Table 1, frozen lean beef having a density of about 59 lbs per cubic foot will float in water and/or carbonic acid which have densities of about the same value, about 63 lbs per cubic foot; however, when the lean beef is not frozen, its density increases to about 65 lbs per cubic foot and therefore will sink when suspended in water or carbonic acid. Furthermore, the introduction of initially frozen water-containing beef into such fluids at a higher temperature than the frozen beef will cause suspension or floating of the beef initially. As the temperatures equilibrate, this causes thawing of the water in the beef with an attendant decrease in volume and increase in density, which will cause the beef or lean to sink in the fluid. Neither bone nor cartilaginous bone contain significant quantities of water and their respective densities are not significantly affected by freezing followed by thawing; both are more dense than fat or lean beef.

The separation methods described herein employ the density variations described above to provide an effective method of dividing a quantity of beef into fractions comprising the separated components of bone, lean beef and beef fat. Beef is used only for purposes of illustrating the various embodiments, it is to be appreciated that other meats, including pork, chicken, and fish may also be used in the disclosed methods. Furthermore, bone or cartilaginous bone may or may not be present in some embodiments.

TABLE 1

| Physical Matter | Density @ 4° C. | % Water Content | Density when frozen |
| --- | --- | --- | --- |
| Bone | 118.6 lbs/cu' | 0% | 118.6 lbs/cu' |
| Cartilage | 80 lbs/cu' | 0% | 80 lbs/cu' |
| Lean Beef | 64 lbs/cu' | 59% | 59.6 lbs/cu' |
| Lean Beef | 64 lbs/cu' | 73% | 58.6 lbs/cu' |
| Carbonic Acid | 63 lbs/cu' | 70% | 58 lbs/cu' |
| Water | 62 lbs/cu' | 100% | 57 lbs/cu' |
| Ice | 57 lbs/cu' | 100% | 57 lbs/cu' |
| Beef Fat | 55 lbs/cu' | 11% | 54.5 lbs/cu' |

APPROXIMATE DENSITIES & WATER CONTENT OF SPECIFIED MATTER

Low pH carbonic acid can be manufactured in block 24 of FIG. 1 by combining a quantity of carbon dioxide vapor/gas with clean pure filtered water at a ratio of weight equal to about 1 part carbon dioxide to two parts water at a pressure of up to about 150 psia which will provide carbonic acid having a pH of about 2.6 units. Pressure of about 125 psia to 150 psia results in a pH value of the carbonic acid in the order of between 3.4 and 2.6 pH. The carbonic acid may be used as a fluid in which to separate the respective components of beef.

Embodiment 1

Figure 5:
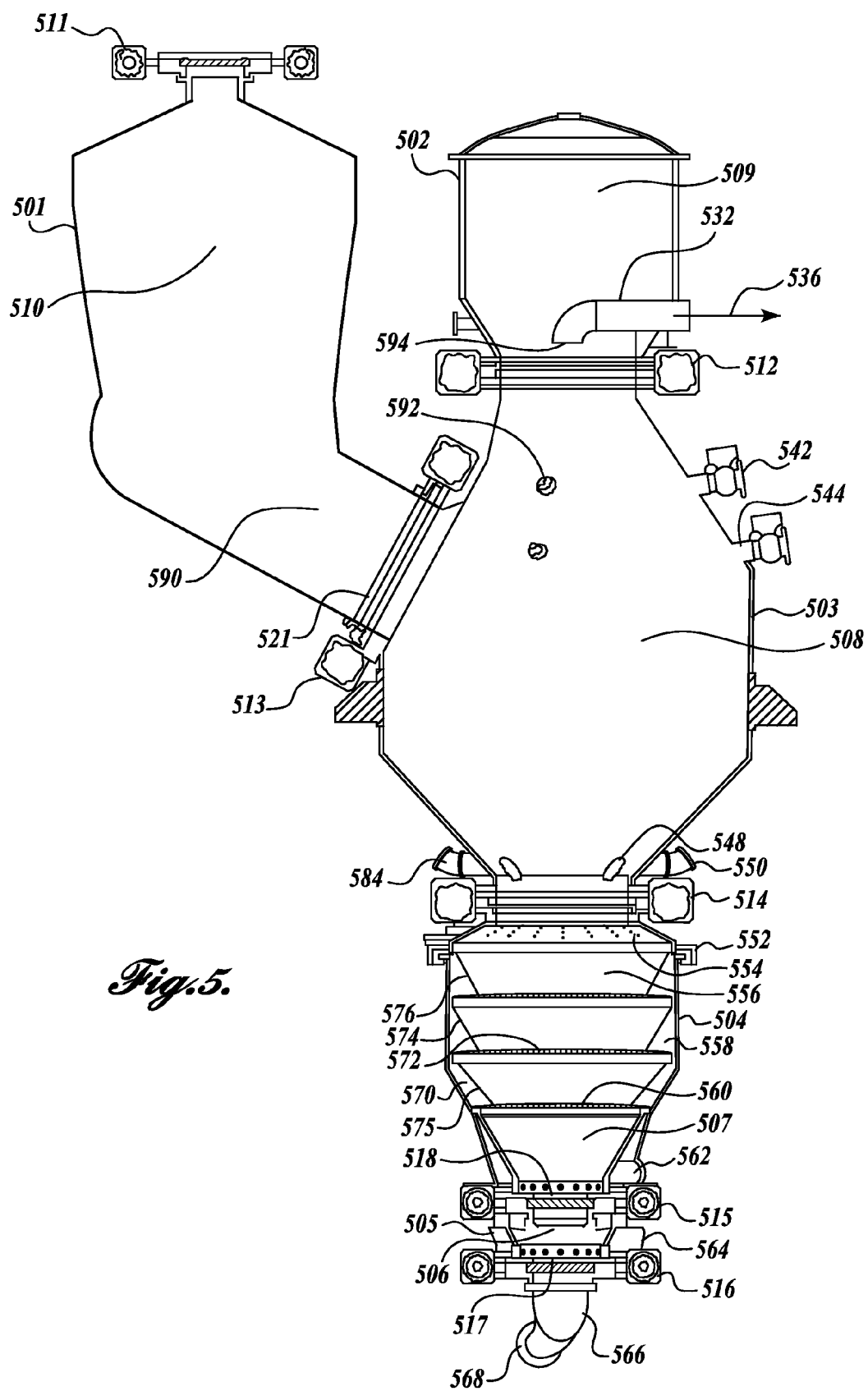
FIG. 5 is a diagrammatical illustration of apparatus for the separation of fat from lean.

One embodiment for separating respective streams of lean and fat particles may use the vessel illustrated in FIG. 5. FIG. 5 shows an apparatus 500 designed for the separation of bone fragments, lean beef and fat particles.

The arrangement of the vessel 500 illustrated in FIG. 5 comprises an arrangement of 5 pressure vessels, 501, 502, 503, 504, and 505 that are connected together to provide an assembly of pressure vessels and configured to allow communication between the vessels but also having valves 511, 512, 513, 514, 515, and 516 provided at the juncture between any two vessels so as to facilitate communication between the vessels or the isolation of each vessel as desired.

Spaces 510 and 590 have a combined volume sufficient to accommodate a full charge of beef (meat) pieces, wherein the charge has a volume and/or mass equal to the maximum quantity of beef pieces that can be processed in one cycle of the apparatus 500.

The space 508 is equal to approximately 4 times the combined space of 510 and 590, and the space 509 is approximately equal to the maximum quantity of beef fat that can be processed by the separation apparatus 500.

The arrangement of vessel 500 as shown in FIG. 5 is constructed with vessel 502 at the upper end of a vertically disposed arrangement with vessel 503, which is centrally located. Vessels 504 and 505 are also vertically disposed below vessel 503, and loading vessel 501 is mounted above and to the side of the main separation vessel 503.

The sequence of operation is as follows:

With valves 511 open and valve 513 closed, a charge of carbonic acid, lean particles, and fat particles, and bone, frozen to below 29.5 F. and most preferably below 27 F. and as low as 15 F., are transferred into space 510, after which valve 511 is closed. Carbon dioxide gas is provided into voids remaining in space 510 up to a pressure of about 150 psia. With valves 512, 513, and 514 closed, space 508 is pressurized to about the same pressure as space 510 with carbon dioxide and valve 513 is opened such that aperture at 521 is fully open, thereby allowing the contents of space 510 to transfer by gravity feed into the lower region of space 508, after which valve 513 is fully closed. Space 510 can be now reloaded in readiness for the next loading cycle of space 508.

Carbonic acid, water, filtered water, distilled water, potable water, water having been transferred through reverse osmosis treatment to produce potable water, or any suitable antimicrobial organic acid or alkali having a density of about 62-63 lbs per square foot at a temperature of about 40 F. to 60 F. is transferred into space 509, the remaining space in 508 and spaces 556 and 506 under pressure at about 150 psia. The antimicrobial fluid is recycled through ports 550, 584, 542, 544, and 592 at such a rate of flow so as to create turbulence and agitation of the mixture of particles which are now suspended in the antimicrobial fluid that fills the entire inner spaces of vessels 502, 503, 504, and 505. The valves 512, 514, and 515 are opened while the beef particles remain substantially frozen and the agitation is stopped so as to allow bone fragments to settle by sedimentation into the lowermost space 505. Before the temperature of the beef particles within vessels 502, 503, 504, and 505 equilibrates with the antimicrobial fluid in which it is suspended to an equilibrated temperature of above 32 F., the valve 515 is closed to isolate all bone particles or chips in space 506. When the temperature of lean and fat matter of the beef particles transferred into space 508 is below the freezing temperature of the water contained within the particles, both fat and lean particles will remain suspended in the fluid because the density of the particles is less than the density of the antimicrobial fluid; however, when the temperature of the fluid and particles equilibrates, the lean particles will sink into space 504 and below valve 514 at which time valve 514 is closed so as to isolate spaces 508 and 504. Fat particles float upward into space 509 after which valve 512 is closed so as to isolate space 509.

The quantity of fat particles at about 34 F. or more, which are now enclosed within space 509, is extracted, most preferably by vacuum, via port 594 and through conduit 532 in the direction shown by arrow 536.

Bone chips and unwanted cartilaginous bone is removed via port 564 and/or via aperture 517 after valve 516 is opened.

Lean beef (meat) is extracted via port 518 in valve 515 and through port 517 in valve 516, and then through conduit 566 and port 568, and transferred for further processing into edible food.

Fluids can be extracted through spaces 558, 570, after passing through holes 554, 572, 560, and also via ports 562 and 564, for water and carbon dioxide recovery for subsequent recycling prior to removal of solids as described above. Vessel 504 can include an outer cylindrical shell that tapers to a smaller diameter at the bottom. Within the vessel 504 are provided a series of frustoconically shaped vessels numbered 576, 574, 575 and 507 from top to bottom, wherein the wider "bases" are oriented towards the upper portion of vessel. The side with the smaller diameter of the frustoconically shaped vessel fits within the side of the larger diameter of an adjacent vessel. This difference in diameter allows the placement of annular screens with holes 554, 572, and 560 in the annular space between the frustoconical vessels. Furthermore, the frustoconical shape creates spaces between the frustoconically shaped vessels and the interior of the outer shell of vessel 504.

Embodiment 2

A manifold as used herein when referring to a separator takes the from of a conduit that branches from a main conduit transferring the mixture of fluid, fat and lean particles into at least two or more conduit branches. The two or more conduit branches are, respective to each other, different in elevation, so that matter that is lower in the main conduit may be transferred to the low conduit branch, while matter that is higher in the main conduit is transferred to the higher conduit branch.

Figure 6:
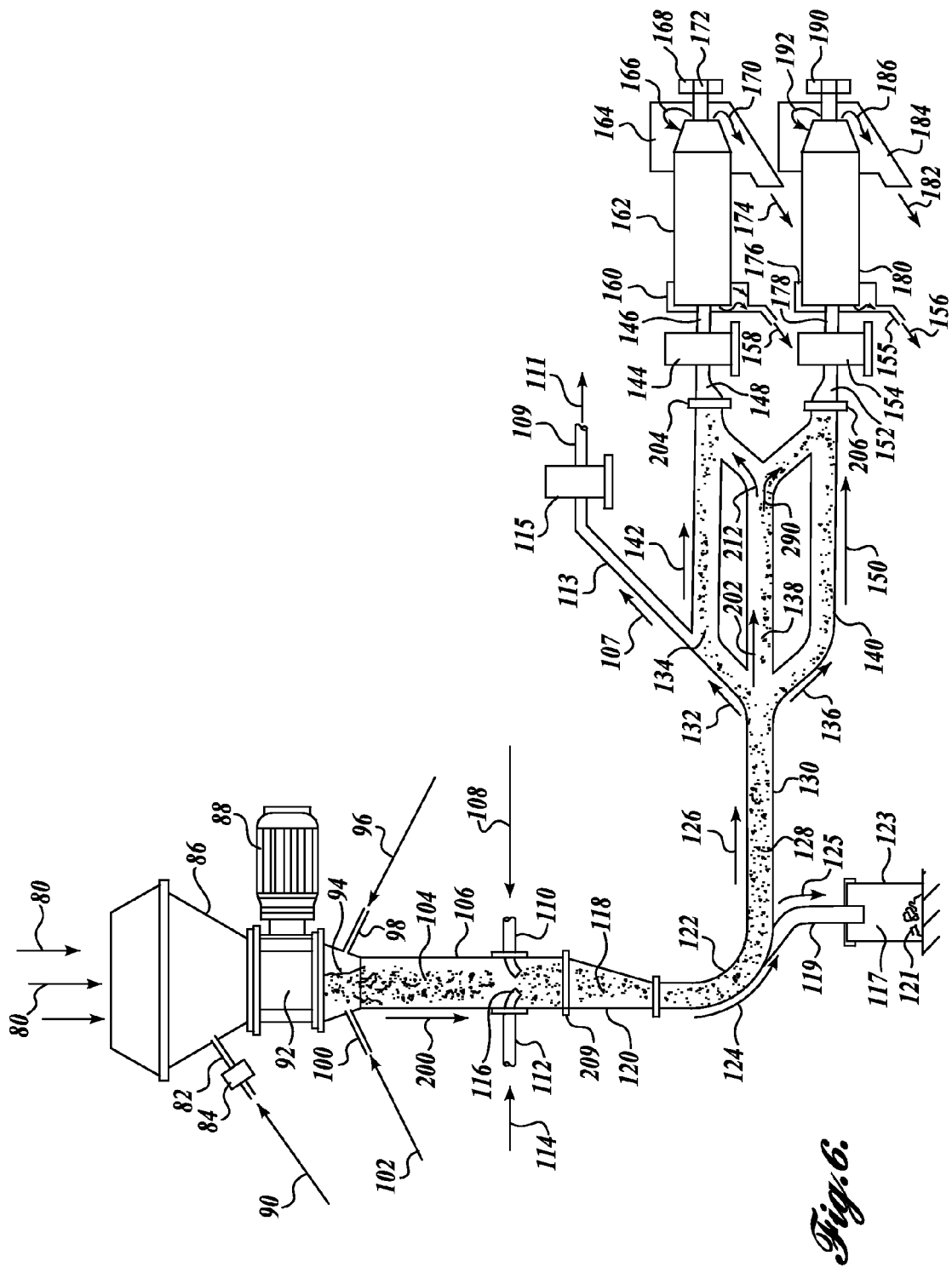
FIG. 6 is a diagrammatical illustration of apparatus for the separation of fat from lean.

Referring to FIG. 6, a manifold 122 used as a separator is arranged between a feed hopper 86 at ambient pressure, and rotary valve 92 (block 22 of FIG. 1) with driver 88 on the in-put end of the manifold assembly and the spent liquid centrifuges 162 and 180 at the output. The manifold separator 122 may be used as the separator block 30 of FIG. 1.

Hopper 86 is loaded most preferably by way of an enclosed conduit with frozen beef particles in the direction shown by arrows 80 from the bond breaking compression device. The frozen beef particles refer to the fat and lean particles produced by the bond breaking compression device, block 12 of FIG. 1. Hopper 86 is attached directly to the upper side of a rotary valve 92 which provides the means of transferring the frozen beef particles from hopper 86 into vertically disposed column conduit 106 when the pressure within conduit 106 is maintained at a constant elevated pressure such as 50 psia or 70 psia. If required, carbon dioxide gas is injected into hopper 86 via connection tube 82 with on/off valve 84 in the direction shown by arrow 90.

Conduit 106 is attached directly to the underside of rotary valve 92 via a connection member 94 into which carbon dioxide gas can be injected via tubes 100 and 98 in the direction shown by arrows 102 and 96 respectively. Frozen beef particles 104 including fat and lean particles are shown descending in the direction shown by arrow 200 toward mixing section 116 between carbonic acid injection ports 112 and 110 via which carbonic acid is injected in the directions shown by arrows 114 and 108. The blended beef particles including fat and lean particles and carbonic acid fluid 118 continue downward through reducing conical member 120 and around radius 122 in the direction shown by arrow 124.

Immediately after the 90 degree bend in the conduit 122 at the lowermost underside point, tube 119 is attached and communicates directly with pressurized vessel 123 filled with fluid 117. In one embodiment, the tube 119 is configured to be at or approximately tangent to the lowermost end of the bend 122. However in other embodiments, the tube 119 can be placed at a horizontal run of conduit, wherein the tube 119 branches at an angle less than or equal to 90 degrees. The purpose of tube 119 and vessel 123 is to allow the heavy bone fragments that occasionally occur in boneless beef to be separated by following conduit 119 into vessel 123 and accumulating therein as bone or cartilage matter 121 thereby being removed from the boneless beef. It is to be appreciated that the frozen or partially frozen lean particles by the time they pass above tube 119 have not yet thawed sufficiently to cause their density to increase and fall to the lower side of conduit 122 and are still suspended in the mixture. Thus, this avoids the lean particles being carried with bone and cartilage into tube 119 and vessel 123.

The temperature of the carbonic acid injected via inlet ports 112 and 110 must be sufficient to elevate the temperature of the boneless beef particles including fat and lean particles such that any water contained therein will thaw. The temperature of the water contained within the boneless beef particles should be on the order of 32-34° F. after equilibration. The proportion of carbonic acid expressed as a ratio to the frozen beef particles including fat and lean particles should be in the range of not less that 1:1 and not more than 6:1, wherein, with a ratio of 1:1, the quantities are equal or not more than six parts carbonic acid and one part beef particles.

Density of beef tallow or fat is approximately 55 lbs/cubic foot whereas the density of lean beef is approximately 66 lbs/cubic foot when not frozen. When frozen, lean beef has a density of around 60 lbs/cubic foot and beef fat around about 54 lbs/cubic foot. Given that carbonic acid has a density of approximately 62.4 lbs/cubic foot when frozen, both lean beef and beef fat will float after immersion in carbonic acid. However lean beef with a density of 66 lbs/cubic foot when not frozen will therefore sink when no longer frozen. The apparatus shown in FIG. 6 is arranged to take advantage of these variations in density by allowing bone fragments to be separated from the mixture via conduit 119, while both beef fat and lean 128 are still frozen and therefore will flow following the upper side of conduit 130. As the mixture of carbonic acid and beef particles including fat and lean particles flow through conduit 130 in the direction shown by arrow 126, lean particles increase in temperature such that the water contained therein will begin to thaw and is no longer frozen. As this occurs, the density of the lean particles increases so that the lean particles fall to the lower side of the conduit 130, thus, facilitating the separation of the lean particles via a low elevation branch conduit 140 in the direction shown by arrow 136 and the lighter fatty particles follow in the direction shown by arrow 132 through a higher elevation branch conduit 134. However, any particles that remain suspended in the carbon dioxide will continue in the direction shown by arrow 202 through a third middle elevation branch conduit 138. The third middle elevation branch conduit 138 then branches, so that one branch reconnects with the higher elevation conduit branch 138, and one branch from middle branch 138 reconnects with the lower elevation branch conduit 140. Middle elevation branch conduit 138 provides additional length for fat particles and lean particles to diverge into upper and lower spaces in the conduit.

High and low elevation conduits 134 and 140 then connect with respective pumps 144 and 154, which then feed respective centrifuges 162 and 180. High and low elevation conduits 134 and 140 may include respective measuring instruments, such as coriolis flow meters, to measure flow rate, density and temperature to derive a fat or water content, and these measurements may be used to adjust the flow rate of pumps 144, 154. A fourth branch conduit 113, optionally, of smaller diameter than branch conduit 134 communicates at a 45 degree disposition with positive displacement pump 115. Conduit 113 branches from conduit 134 at the end of a bend before conduit 134 returns to a horizontal run. Positive displacement pump 115 controls the amount of fluid with suspended solids that travel in the direction shown by arrow 107. As the lighter fatty particles change direction following the conduit 134 and shown by arrow 142, the lightest smallest fat particles are drawn into conduit 113 and in this way substantially pure fat particles substantially excluding protein or connective tissue can be drawn into conduit 113 in the direction shown by arrow 107. The remaining lighter particles but still heavier than particles in conduit 113 continue in the direction shown by arrow 142 and into positive displacement pump 144 which controls the mass flow of suspended solids and fluid into centrifuge 162.

The heavier lean particles and carbonic acid flow along conduit 140 in the direction shown by arrow 150 and into positive displacement pump 154 which controls the mass flow of the solids and fluids into centrifuge 180. Both centrifuges are arranged to remove the spent carbonic acid from the streams of solids which are discharged via separate ports. Thus, these fulfill the function of blocks 42 and 48 of FIG. 1. However, other liquid separators described herein may be substituted for the centrifuges 162 and 180, such as buoyancy separators. The liquid carbonic acid separated from the solid fat particles in centrifuge 162 is discharged via a port in the direction shown by arrow 158 and the liquid carbonic acid separated from the solid lean particles in centrifuge 180 is discharged via port 155 in the direction shown by arrow 156. The fat particles are discharged via a port at the opposite end of the centrifuge in the direction shown by arrows 170 and 174 and the lean particles are discharged via port 184 in the direction shown by arrows 186 and 182. Because the fat content of lean particles traveling in conduit 140 has been measured and adjusted through the control of pumps withdrawing a greater or lesser volume of the fat particles, the separated lean particles may be produced having a desired fat content. Alternatively, the liquid free fat and lean particles exiting centrifuges may be weighed and combined in desired proportions to arrive at a desired fat content product. The liquid carbonic acid discharged from centrifuges may be sent to a carbon dioxide recovery process as described above, and any carbon dioxide gas vented from any equipment may be directed to a carbon dioxide gas treatment process and compression as described above to be reused to make carbonic acid or as the carbon dioxide gas injected into the bottom of rotary valve 92 through ports 98 and 100.

Embodiment 3

Figure 7:
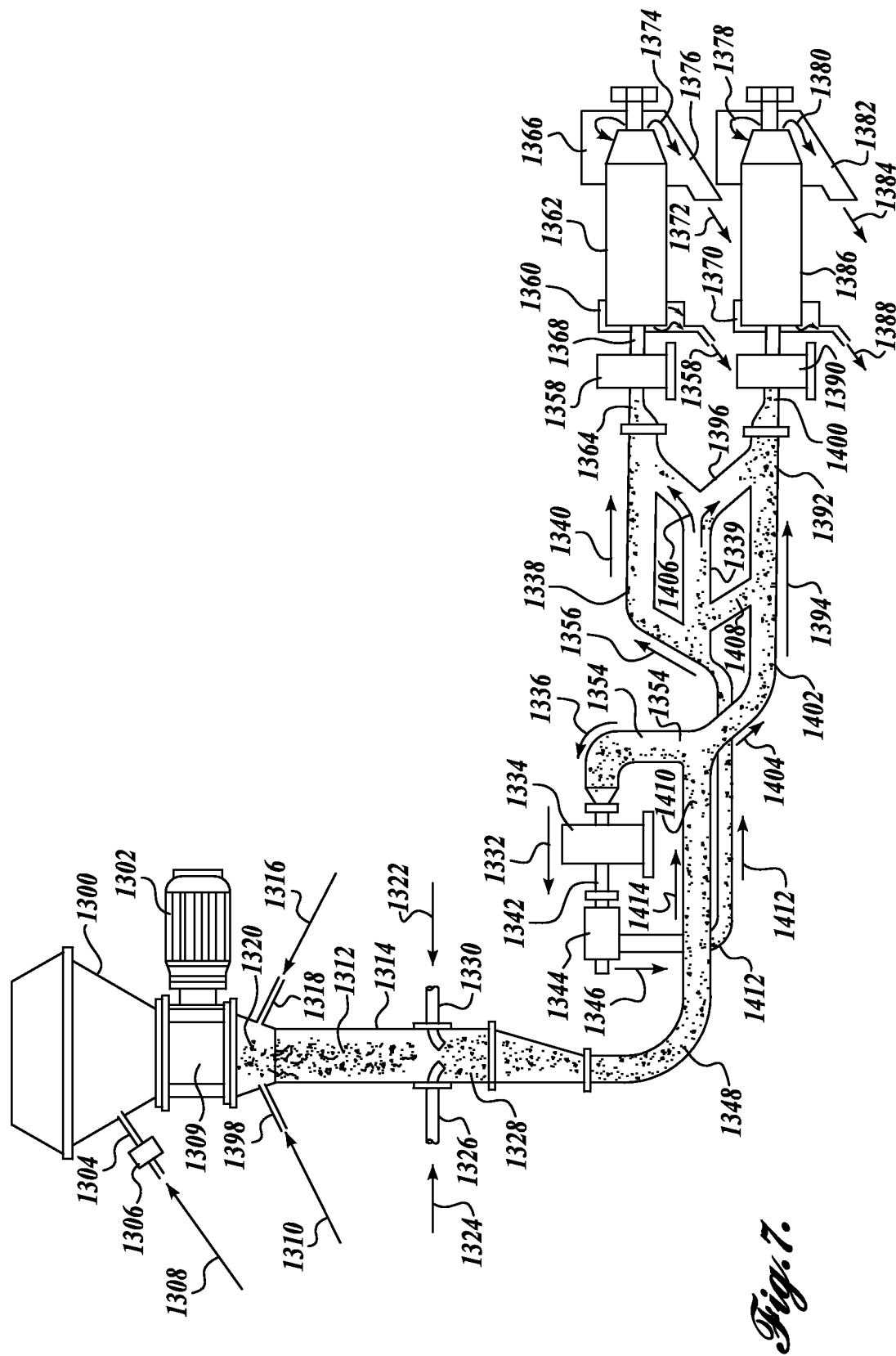
FIG. 7 is a diagrammatical illustration of apparatus for the separation of fat from lean.

Referring to FIG. 7, a manifold used as a separator is arranged between a feed hopper 1300 at ambient pressure, and rotary valve 1300 (block 22 of FIG. 1) with driver 1302 on the in-put end of the manifold assembly and the spent liquid centrifuges 1362 and 1386 at the output. The manifold separator may be used as the separator block 30 of FIG. 1.

The assembly and operation of the apparatus shown in FIG. 7 is similar to the operation of the apparatus shown in FIG. 6, however the fat stream is processed differently in the apparatus shown in FIG. 7.

As can be seen in FIG. 7, the process is similar to FIG. 6 up to the 90 degree bend following the introduction of carbonic acid fluid through ports 1326 and 1330. After the 90 degree bend 1348, the horizontal conduit 1410 with fluid being transferred in the direction shown by arrow 1414, diverges into two conduits with a lower branch conduit 1354 and an upwardly disposed branch conduit 1352. In this way, lean particles and a proportion of carbonic acid are directed in the direction shown by arrow 1404 through downwardly inclined branch conduit 1354 and then horizontally in section 1402. However, the fat particles and a proportion of carbonic acid is transferred upwardly and then in the direction shown by arrow 1336 to positive displacement pump 1334 which pumps under pressure the fat with fluid in the direction shown by arrow 1332, via conduit 1342 and into "emulsifying" device 1344. Device 1344 is described herein in association with FIGS. 11 and 12 and is constructed for the purpose of separating any fat matter that remains connected to connective tissue. The fluid and fat in the fat stream diverted and processed by pumping via device 1344 is subjected to an explosive force when transferred through a narrow annular slot which "scrapes" fat from other more pliable and tough matter. The processed stream is then transferred via a conduit in the direction of arrows 1346 and 1412 through a horizontal conduit 1350. Horizontal conduit 1350 transferring emulsified fat particles and other tissue, then branches into three branches of high, middle, and low elevations.

The high elevation branch conduit 1338 connects to pump 1358 followed by centrifuge 1362. The middle elevation branch conduit 1339 has a short horizontal run and then branches into an upwardly inclined high branch 1406 that reconnects with high elevation branch 1338, and a downwardly inclined low branch 1396 that reconnects with initial branch 1402 carrying the lean particles. The low elevation branch 1408 from conduit 1350 connects to branch 1402 carrying lean particles 1402 at a location before the connection from middle elevation conduit downwardly inclined branch 1396. In this way, the emulsified materials are connected with the separation manifold upstream of upward and downward conduits which allow heavier lean components to sink into conduit 1392 and lighter fat particles to conduit section 1338 and forward to respective centrifuges 1362 and 1384.

High and low elevation branch conduits 1364 and 1400 before pumps 1358 and 1390 may include respective measuring instruments, such as coriolis flow meters, to measure flow rate, and density to derive a fat content, and these measurements may be used to adjust the flow rate of pumps 1358 and 1390 that feed centrifuges 1362 and 1386. Both centrifuges 1362 and 1386 are arranged to remove the spent carbonic acid from the streams of solids which are discharged via separate ports. Thus, these fulfill the function of blocks 42 and 48 of FIG. 1. However, other liquid separators described herein may be substituted for the centrifuges 1362 and 1386, such as buoyancy separators. The liquid carbonic acid separated from the solid fat particles in centrifuge 1362 is discharged via a port in the direction shown by arrow 1358 and the liquid carbonic acid separated from the solid lean particles in centrifuge 1386 is discharged via a port in the direction shown by arrow 1388. The fat particles are discharged via a port at the opposite end of the centrifuge 1362 in the direction shown by arrows 1374 and 1372 and the lean particles are discharged via a port 1382 in the direction shown by arrows 1380 and 1384. Because the fat content of lean particles traveling in conduit 1400 has been measured and adjusted through the control of pumps withdrawing a greater or lesser volume of the fat particles, the separated lean particles may be produced having a desired fat content. Alternatively, the liquid free fat and lean particles exiting centrifuges may be weighed and combined in desired proportions to arrive at a desired fat content product. The liquid carbonic acid discharged from centrifuges may be sent to a carbon dioxide recovery process as described above, and any carbon dioxide gas vented from any equipment may be directed to a carbon dioxide gas treatment process and compression as described above to be reused to make carbonic acid or as the carbon dioxide gas injected into the bottom of rotary valve 1309 through ports 1398 and 1318.

Embodiment 4

Figure 8:
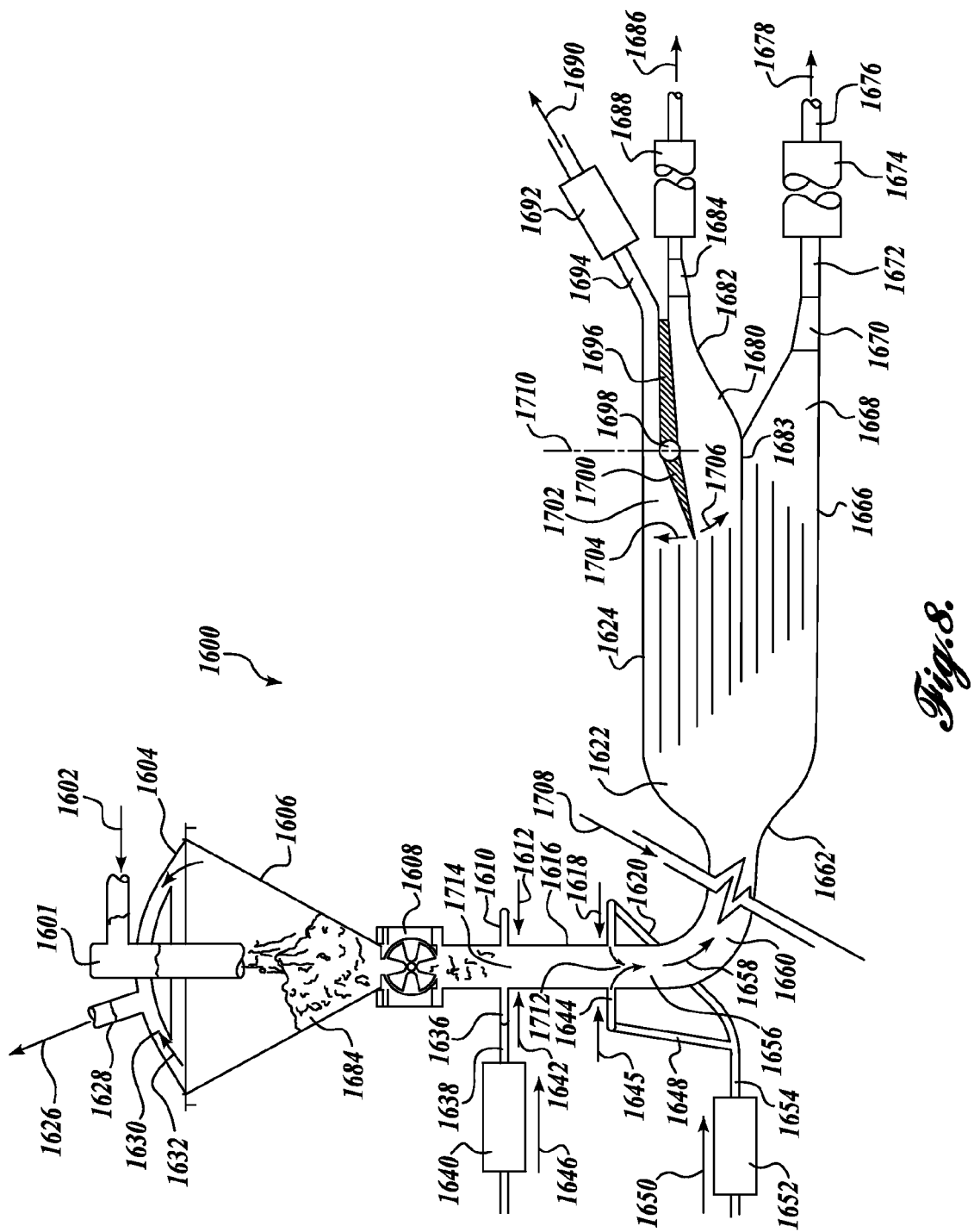
FIG. 8 is a diagrammatical illustration of apparatus for the separation of fat from lean.

Referring now to FIG. 8, another embodiment of a separation manifold 1600 is illustrated. The separation manifold 1600 can be used as the separator block 30 mentioned in association with FIG. 1. In this embodiment, the apparatus is intended to enable the continuous flow of a stream in the direction shown by arrow 1658 within conduit 1616 and in to manifold 1662, wherein the stream comprises solids introduced via rotary valve 1608, which allows a controlled flow of solids from hopper 1606 and contents 1684 and into space 1714, immediately above fluid introduced via conduit 1654, 1620, and 1648, in the direction shown by arrows 1645 and 1618.

Fluid introduced into vertical column at 1712, such as carbonic acid, is measured by a coriolis measuring instrument 1652. Controlled flow of carbon dioxide vapor is introduced via conduits 1636 and 1610 and the total can be measured by a coriolis measuring instrument 1640. An additional coriolis instrument provided in Section 1708 (but not shown) measures the combined stream comprising carbonic acid fluid, lean particles, and fat particles, flowing in the direction 1658. The proportion of fluid, solids, and carbon dioxide gas are adjusted to achieve optimal operation of the apparatus. If too much carbon dioxide is present it will not dissolve in the fluid and will affect the accuracy of coriolis measuring instruments, therefore, the flow of carbon dioxide vapor and carbonic acid transferred through conduits 1636 and 1654 respectively must be measured and controlled accurately to ensure any gas introduced via conduit 1636 and 1610 will dissolve.

Solids at 1714 combine with the carbon dioxide vapor which acts as a barrier between the fluid entering at 1712 through ports 1618 and 1644 to ensure that the fluid cannot come into contact with the underside of rotary valve 1608. The combined stream within conduit 1616 is measured by coriolis measuring instrument installed at space 1708, followed by a large diameter coriolis measuring instrument.

In this embodiment, the manifold is a large diameter conduit 1624 having a series of horizontal plates. The horizontal plates are aligned parallel to each other within the conduit 1624. The higher a plate is in elevation, the more the plate is located forward of the adjacent plate lower in elevation. Thus, each horizontal plate has a forward end (or proximal side) that terminates closer from the entrance of conduit 1624, than a horizontal plate below it.

The solids introduced into the conduit 1624 enter space 1622 after transfer through a positive displacement pump and coriolis (both not shown) inserted in space 1708. Within space 1622, the lean solids particles have preferably reached equilibrium of temperature with the fluid to allow the increase in density that comes with the thawing of frozen water within the lean matter. The pump delivers the fluid mixture with suspended solids at a controlled rate into the space 1622 so as to enable the fat content to elevate and stratify up against the underside of the upper section of manifold 1624 whereas the heavier solids such as lean will sink and accumulate at the lower section near location 1662.

The series of horizontal plates within manifold 1624 are provided to ensure lateral flow does not facilitate mixing of the separated stratified particles. The distal side of manifold 1624 branches into three conduit branches, including high conduit branch 1694 which is highest in elevation, low conduit branch 1672, which is lowest in elevation, and middle conduit branch 1682, which is between the low and high conduit. One horizontal dividing plate 1683 can extend distally to completely separate the low conduit branch 1672 form the middle conduit branch 1684. The dividing plate 1683 separates the horizontal plates into an upper array and a lower array. The lower array feed into low conduit branch 1672 only, while the upper array variously feeds both the high 1694 and middle 1682 branch conduits.

Within manifold 1624, a pivoting plate 1770 is provided. A horizontal and stationary dividing plate 1696 is located distal to the pivoting plate 1700. The horizontal plate 1696 separates the high conduit branch 1694 from the middle conduit branch 1682. The proximal end of pivoting plate 1770 can be positioned at the end of any of the distal ends of the horizontal plates that comprise the upper array of horizontal plates above the dividing plate 1683. The pivoting plate 1770 thus can be positioned so that one or more of the upper array horizontal plates feed into the high conduit branch 1694, while the remaining horizontal plates of upper array feed into the middle conduit branch 1684. As illustrated, the fluid with solid particles collected in space 1702 above the plate 1700 will flow toward the high conduit branch 1694, while the fluid with solid particles collected in space 1680 below the plate 1700 will flow toward the middle conduit branch 1682. It is believed that the higher a particle is in fat content, the higher in elevation the fat particle will float in the fluid. Thus, the higher the pivoting plate 1770 is positioned, the higher the fat percentage will be the stream collected in the high conduit branch 1694.

Plate 1700 can be positioned as shown by movement indicated by arrows 1704 and 1706. High conduit branch 1694 has a coriolis measuring instrument 1692. Middle conduit branch 1682 has a coriolis measuring instrument 1688. Low conduit branch 1672 has a coriolis measuring instrument 1674. In this way, fat content of suspended solids flowing along high conduit branch 1694 can be either increased or decreased according to measurements recorded by coriolis measuring instrument 1692 or 1688. Coriolis measuring instruments 1674, 1688, and 1692 can also control fat content of each of the streams represented by arrows 1690, 1686, and 1678 when positive displacement pumps are connected directly inline with conduits 1694, 1682, and 1672.

Embodiment 5

Figure 9:
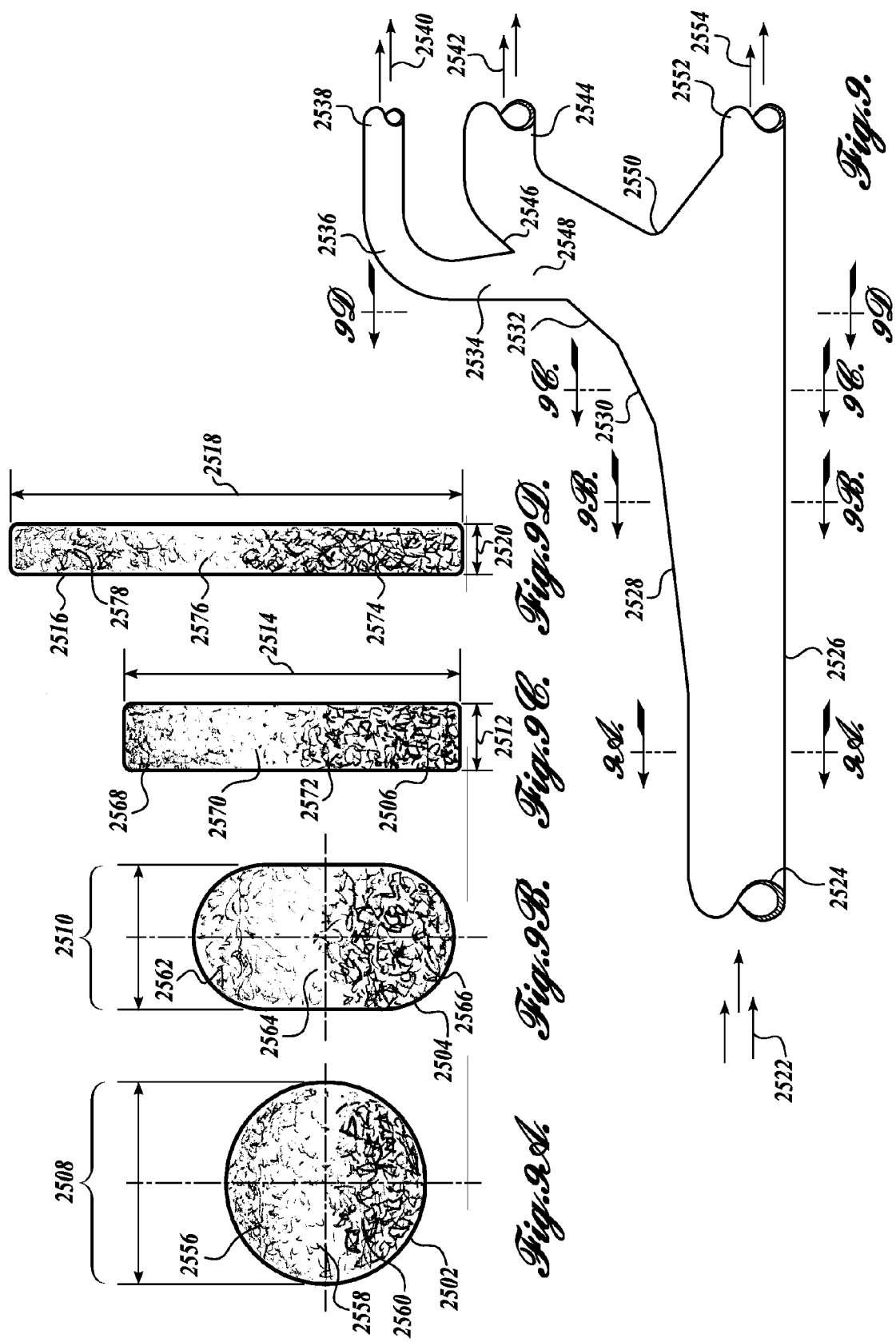
FIGS. 9A, 9B, 9C, and 9D are diagrammatical illustrations of cross sections of the apparatus shown in FIG. 9.

Referring to FIG. 9, the side elevation of a manifold 2528 is shown with four cross section views A-A, B-B, C-C, and D-D taken along the length. The embodiment of a manifold 2528 illustrated in FIG. 9 may be applied to anyone of the manifold separators illustrated in FIGS. 2, 3, 4, 6, 7, and 8.

The manifold 2528 is arranged to enable the separation of a single stream of particles suspended in a fluid such as carbonic acid wherein particles, some of which are approximately 100% fat, some are approximately 100% lean, and others are a combination of fat and lean in varying percentages between 100% lean and 100% fat. Arrows 2522 show the direction in which the stream with suspended particles is flowing within the conduit 2528 under selected pressure such as 70 psi or several hundred psi such as 200, 300, 400 or more. The manifold separator 2528 includes a changing cross-sectional profile as the separation manifold approaches the diverging conduit branches. The manifold 2528 cross-sectional aspect ratio (the width divided by the height) decreases from a proximal to distal position. This decrease in the aspect ratio assists to provide better separation.

At cross section A-A shown as 2508, the separation manifold 2528 has a circular profile 2556. At cross section B-B shown as 2510, the separation manifold 2528 is elongated in the vertical direction as shown in 2562. At cross section C-C shown as 2512, the separation manifold 2528 is elongated even further, and at cross section D-D, the separation manifold 2528 is even more so.

The diameter of cross section A-A 2556 may be in the order of 6 inches whereas the width at section D-D of the manifold may be 1 inch to 1½ inches by approximately 6-8 inches in height and the manifold profile between section A-A and D-D gradually changes in such a way that no sharp corners are created. The fluid stream with suspended particles in carbonic acid represented by arrows 2522 is transferred through manifold 2528 and divided into three streams in three conduit branches, 2538, 2544, and 2552, represented by arrows 2540, 2542, 2554.

Referring to circular cross section A-A, in the lower section, particles 2502 higher in lean content stratify by sedimentation, whereas the particles 2556 higher in fat content are stratified at the upper inner side of the circular conduit, which are the lighter, less dense particles. At the central section 2558, the density of particles suspended in the fluid is between the upper and lower extremes. As stream 2522 travels under controlled positive displacement pump flow, the manifold profile gradually changes and at cross section B-B represented by member 2510, stratified suspended particles are shown to be located at the upper 2562 and lower 2566 extremes with space 2564 generally containing few particles. As the profile changes moving further down the manifold 2528 to the cross section 2512, the light particles 2568 located at the upper extreme of manifold 2528 are now further away from the denser particles 2572 which are located at the lower end of the elongated cross section. Cross section D-D shows even greater separation of the lighter particles 2578 in the upper section 2516 from the more dense particles in the low section at 2574 with middle section 2576 carrying the least accumulation of particles.

A pump is attached to the conduit 2538. The mass flow of fluid with suspended particles extracted in the direction shown by arrows 2540 within conduit branch 2538 is controlled by the positive displacement pump driven by variable frequency drive speed control. Similarly a positive displacement pump is attached to conduit branch 2544 so as to control mass flow of the fluid with suspended particles passing through conduit 2544 in the direction shown by arrows 2542. It is not necessary to install a positive displacement pump attached at conduit branch 2552 since the flow control of stream 2544 is determined by the combined flow of streams represented by arrows 2540 and 2542. By adjusting the mass flow of one or both of the streams 2540, and 2542, the fat content and the lean content of each stream can be adjusted. For example, by slowing mass flow through conduit branch 2538, fat content in the lower streams will increase, and by increasing mass flow through conduit 2538, the fat content of the lower streams shown by 2542 and 2554 will be reduced. Although the embodiment just described may have mass flow control on the high conduit branch 2538 and the middle conduit branch 2544, the pump on either can be omitted and placed on the lower conduit branch 2552. In general, for X number of conduit branches, X-1 pumps can be used to control the flow of all conduit branches, so that the flow through the conduit branch without a pump, is controlled as a result of control of the other flows.

Embodiment 6

Figure 10:
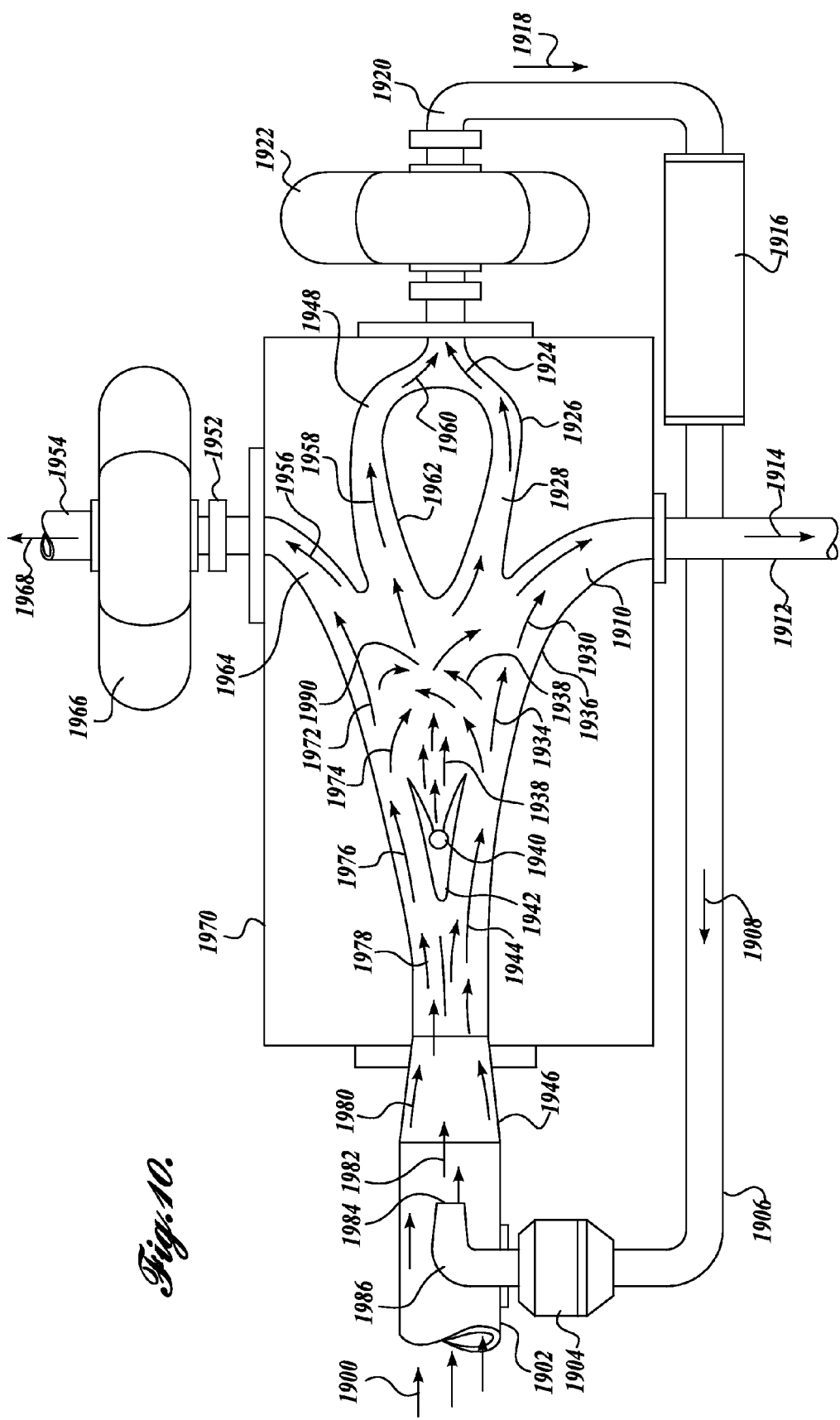
FIG. 10 is a diagrammatical illustration of apparatus for the separation of fat from lean.

Referring to FIG. 10, an embodiment of a separation manifold 1970 is illustrated. The separation manifold 1970 can be used as the separator block 30 mentioned in association with FIG. 1. The separation manifold illustrated in FIG. 10 may be substituted for any of the previous embodiments of separation manifolds illustrated in FIGS. 2, 3, 4, 6, 7, 8, and 9. The separation manifold 1970 includes that portion of the manifold that receives an inlet fluid comprising fat particles and lean particles and produces at least two fluid streams, respectively of high fat and high lean content. One fluid stream includes essentially fat particles, while the second fluid stream includes lean particles and a generally desired content of fat particles so that the majority of the particles are lean particles. The remaining solids are determined to result in a desired concentration of fat.

In FIG. 10, the inlet fluid stream 1900, shown as arrows, enters inlet 1902. The fluid 1900 includes fat particles and lean particles in a fluid mixture. The fluid passes through an interior centrally disposed nozzle 1986, which outlets at 1984. The purpose of nozzle 1986 will be described further below. In one embodiment, as the inlet fluid passes the nozzle 1986, the manifold enters a convergent section 1946. In the convergent section 1946, the diameter of the inlet 1902 can reduce to a smaller diameter, which has the effect of increasing the speed of the inlet fluid 1980 together with the fluid 1982 exiting the nozzle 1986. After entering the convergent section 1946 and passing into the small diameter of the convergent section 1946, the separation manifold may be constructed from a block 1970.

Block 1970, the separation manifold, can be described as follows. From the small diameter following the convergent section 1946, the separation manifold expands in diameter. At its greatest diameter, the manifold branches into four distinct separate conduits. The separation manifold gradually expands in diameter to reach a maximum diameter. At or approximately at the largest diameter, the separation manifold branches into four conduit branches, each conduit branch being a smaller diameter than the maximum diameter prior to the conduit branches. The first conduit branch 1964 is highest in elevation, and as described before, the highest elevation of the fluid contains substantially all fat particles, denoted by arrow 1956. The fluid that is drawn into branch conduit 1964 enters pump 1966, which transfers the fluid and fat particles denoted as arrow 1968 to the fat/liquid separation, block 48, illustrated in FIG. 1. The lowest elevation conduit branch 1910 carries a majority of lean particles and may further carry a desired proportion of fat particles. The lowest conduit branch 1910 does not have a pump and exits through outlet 1912 and the fluid with the majority of lean particles and a desired or minor proportion of fat solid particles 1914 can be transferred to liquid/separation, block 42 illustrated in FIG. 1. Two middle conduits, respectively 1928 and 1962, are intermediate in elevation between the high elevation conduit branch 1964 and the low elevation conduit branch 1910. The middle branch conduits 1962 and 1928 rejoin each other at the inlet for pump 1922. Upper middle branch 1962 and lower middle branch 1928 essentially collect fluid with minimal solid matter from the central portion of the manifold. From pump 1922, the fluid is transferred through pump outlet 1920 and then into coriolis measuring instrument 1916 and to conduit 1906. The fluid then enters device 1904, which is generally an emulsifier of fat that further separates any remaining fat from connective tissue. Following emulsifier 1904, the fluid is injected in the middle of the inlet stream 1900. The emulsification of any fat and connective tissue allows for the separation and collection of additional fat.

The separation manifold 1970 includes a divider 1942 placed in the path of the stream at 1978. The divider 1942 includes an injection port 1940, which injects clear fluid, denoted by arrows 1938 into the separation manifold and with the direction of flow of the fluid. The divider 1942 may have a singular point at the proximal edge and two distal points at the distal end, appearing to be two mirror image chevrons. Clear fluid is dispensed between the distal points and with the flow of the fluid. The clear fluid will generally flow into the upper and lower middle conduit branches 1962 and 1928. The clear fluid provides a layer of fluid that allows any fat that gets entrained in the lower section of the separation manifold to migrate through the clear fluid in the center of the stream in the direction shown by arrow 1932, and to combine with the fat particles flowing in the direction of arrow 1972 to enter into the higher elevation conduit 1964. Similarly, any lean particles that become entrained and are transferred in the flow stream above the divider 1942 will migrate across the clear fluid stream in the direction of arrow 1974 to rejoin the essentially all-lean stream 1930 and exit through the lower branch conduit 1910. The fat particles that are entrained in the flow below the divider 1942 will cross the clear fluid boundary layer and rejoin the flow of essentially all fat particles 1972 and exit through the higher branch conduit 1964.

As can be appreciated there is one inlet stream to manifold 1970 and two outlet streams. A measuring instrument from which it is possible to determine the fat content of a stream, such as a coriolis measuring instrument, may be placed inline on the conduit 1968 from pump 1966, and on conduit 1912. The speed of the pump 1966 can control the amount of fat that leaves with the lean solid particles through conduit 1910. For example, by slowing the pump 1966, more fat will enter the lean stream and leave through lower conduit branch 1912. Conversely, speeding up the pump 1966 will withdraw more fat from the system thus leaving less fat to exit with the lean particle stream 1910 through lower conduit branch 1912. As can be appreciated the fat content of the flow through conduit 1912 may be controlled to produce a product having a desired fat content.

Embodiment 7

Figure 16:
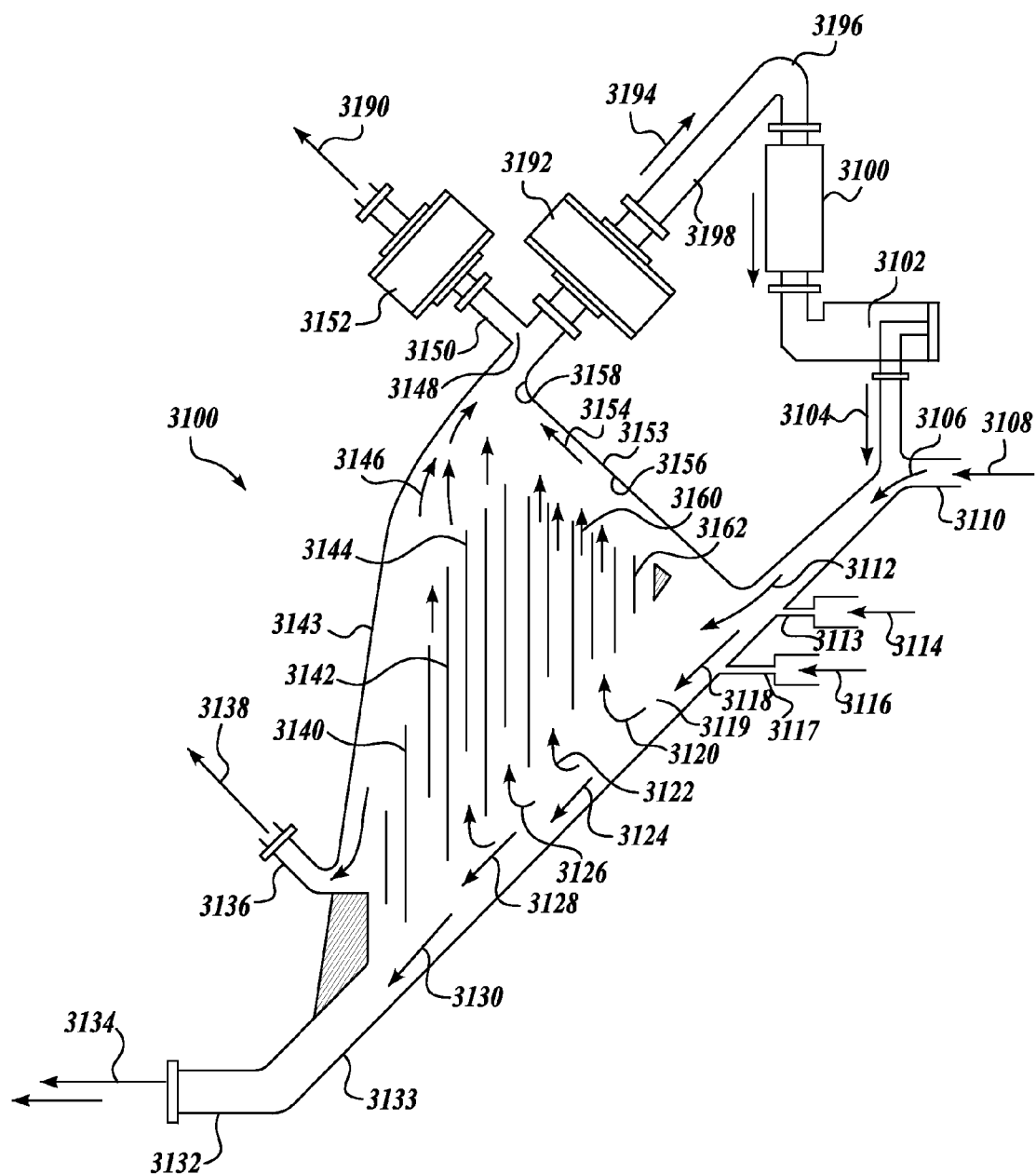
FIG. 16 is a diagrammatical illustration of apparatus for the separation of fat from lean.

Referring to FIG. 16, another embodiment of a conduit used as a manifold separator 3100 is illustrated. The manifold separator 3100 may be used as the separation block 30 in the method illustrated in FIG. 1. The manifold separator 3100 comprises a "triangular" shaped chamber defined by sides 3153 at the upper right, 3133 at the lower right and 3143 at the upper left, and has a rectangular cross section and is about 6 inches deep. The separator 3100 is configured such that a corner where the sides 3153 and 3143 meet is positioned to be the highest in elevation.

Ports are also provided at each lower corner. Thin gauge plates such as 3142, 3144, 3140, 3162 are fixed in a vertical disposition across the flat front and flat back of the separator chamber. The vertical plates are spaced apart so as to restrict fluid and suspended solids movement to a vertical direction such as shown by arrow 3160. The vertical plates allow spaces between the plates and the three sides 3153, 3133, and 3143, so that fluid and lean and fat matter can be carried therethrough. Conduit 3110 is the entry conduit for a "slurry" of treated beef particles (having been chilled, transferred through the bond breaking device (block 12 of FIG. 1) and mixed with a measured (minimized) quantity of fluid such as carbonic acid or water etc) in direction of arrow 3106. Jets of more temperature controlled fluid are transferred into space 3119 via ports 3113 and 3117. Lighter fat particles will separate and move upwards or float in the direction shown by arrows 3120, 3122, 3126, while heavier lean particles will sink in the direction shown by arrows 3124, 3128, 3130 and will collect in conduits 3133, 3132 in direction shown by arrows 3134.

Excess fluid is extracted via a port 3136 in the direction shown by arrow 3138. Input and output streams may be mass flow controlled by pumps such as WAUKESHA 3152, and 3192. Coriolis measuring instrument 3100 and homogenizing member 3102 are arranged to measure and treat the fat and lean stream transferred through conduit 3198, 3196 in the direction shown by narrows 3194, 3104 and mass flow controlled according to a "balanced" input and output control system. Fat stream represented by stream 3190 is flow controlled by Waukesha pump 3152 via port 3148.

The embodiment of FIG. 16 can minimize the amount of fluid required by providing adequate fluid at the place of separation only. For example, very little fluid will leave with the fat stream represented by arrow 3196.

Embodiment 8

Referring to FIGS. 17A-17C, a method and an apparatus for pathogen deactivation combined with separation are illustrated.

First and second vessels, 220 and 222, of similar capacity are arranged in parallel at close proximity and at a common height. A single direct connection between the vessels 220, 222, is located at the highest altitude in each vessel and comprises a horizontal conduit 218 with a valve 216 centrally located. The conduit 218 communicates at each end via a single port with each of the first 220 and second 222 vessels.

Both first 220 and second 222 vessels have a large diameter, and upper and lower ports. Vessel 220 has upper port 240 and lower port 230. Vessel 222 has upper port 226 and lower port 224. Each port is fitted with a suitable valve. Each port is located at opposite sides of the first and second vessels with a first centrally located along the upper ridge of the vessel and a second along the lower ridge of the vessel.

Each vessel 220 and 222 has a first and second piston. For example, vessel 220 has pistons 208 and 210. Vessel 222 is similarly fitted with two pistons. Each of the first and second pistons are attached to first and second piston rods with each piston fitted into opposing ends of each vessel. Suitably sized and mounted hydraulic cylinders are arranged to drive each piston independently or simultaneously toward or away from the perpendicular centerline of each first 220 and second 222 vessels.

Diced beef is chilled and treated to break the friable fat away from the lean matter as described above, and the beef pieces 201 comprising lean particles and fat particles are loaded into a feed hopper 204 via port 202. The first vessel 220 is then filled through port 240 to about 50% of vessel's 220 internal volume and the remaining space is then filled with liquid carbon dioxide 212 through port 230 and pressurized to 495 psia+/−2 psia.

The second vessel 222 is filled with carbon dioxide vapor at 495 psia and connected directly, via conduit 218, with the space 232 of the first vessel 220 above the beef pieces 228 and in such a way as to ensure constant (equal) pressure in first 220 and second 222 vessels.

At greater than 400 psia and 18° F. (density of carbon dioxide is 60.20 lbs/cubic foot) and less than 536 psia at 36° F. (density of carbon dioxide is 56.92 lbs/cubic foot) and most preferably at between 490 psia at 30° F. (density of carbon dioxide is 58 lbs/cubic foot) and at 505 psia at 32° F. (density of carbon dioxide is 57.77 lbs/cubic foot). The density of beef fat and beef lean, held at a temperature ranging between 18° F. to 36° F. is about 55 lbs./cubic foot to 56 lbs./cubic foot for fat and between about 60 lbs./cubic foot and 66 lbs./cubic foot for lean beef and between 29.5° F. to 32° F. about 55 lbs./cubic foot for fat and 66 lbs./cubic foot for lean beef (i.e., above temperature of frozen water) lean has a density of about 66 lbs/cubic foot.

The contents of the first vessel 220 is then agitated gently, so as to enable the buoyant fat 246 to float and the heavier lean 244 to sink, steadily, as seen in FIG. 17B. The valve 216 on conduit 218 is then opened and the pistons 208, 210 in the first vessel 220 are closed together until the buoyant fat 246, having accumulated along the uppermost level along the inside of the vessel 220, is transferred through connecting conduit 218 to second vessel 222, as seen in FIG. 17C.

| H2O CONTENT | Matter | DENSITY (LBS/CU') AT SPECIFIED TEMPERATURE | | | | |
|---|---|---|---|---|---|---|
| | | 18° F. | 36° F. | LBS/CU' | 29.5° | 32° F. |
| 15% | Fat | 56 | 55 | LBS/CU' | 55 | 55 |
| 73% | Lean | 60 | 66 | LBS/CU' | 66 | 66 |
| 100% | Water | 57.41 | 62.4 | LBS/CU' | | 62.4 |
| 100% | Ice | | | 57.41 LBS/CU' | 57.41 | |

All 4 pistons (2 in each vessel) may also be activated to expand and contract the space within both vessels and compress contents of first and second vessels to elevate carbon dioxide pressure to above the critical pressure and temperature of carbon dioxide. Supercritical carbon dioxide can be used reduce the activity of any microorganisms are present on the lean or fat matter. The pressure within vessels 220 and 222 can be cycled between a low and higher pressure exceeding the critical pressure and temperature a plurality of times until the microorganisms are reduced to an acceptable level.

After transfer of the fat matter 246 to the second vessel 222, and optionally performance of cycling between a low pressure/temperature and a high pressure above the critical pressure and temperature of carbon dioxide, the pistons in each of the respective vessels 220 and 222 can compress to separate carbon dioxide fluid from the lean matter in vessel 220 and from the fat matter in vessel 222.

As can be appreciated from the description of the separators described above, the separators described above may be used in a method for separating lean from fat. The method includes transferring a mixture, the mixture comprising lean particles comprising frozen water, fat particles, and a fluid, through a conduit, allowing the frozen water in the lean particles to thaw as the mixture travels through the conduit and increases the density of the lean particles, accumulating the lean particles with non-frozen water at a first elevation in the conduit and accumulating fat particles at a second elevation in the conduit, wherein the first elevation is lower than the second elevation, and transferring a portion of the mixture having the accumulated lean particles through a first conduit branch connected to the conduit, wherein the portion of the mixture transferred in the first conduit branch has a majority of the lean particles in the mixture. This method further includes additional features and steps as step forth below and as described in the embodiments that follow.

In one embodiment, the method may further include transferring a second portion of the mixture having the accumulated fat particles through a second conduit branch connected to the conduit, wherein the mixture in the second conduit branch comprises a greater percent by weight of fat particles compared to the mixture in the first conduit branch.

In one embodiment, the method may further include transferring a third portion of the mixture through a third conduit branch connected to the conduit, wherein the mixture in the third conduit branch comprises a greater percent by weight of fluid than fat and lean.

In one embodiment, the method may further include, wherein the lean particles and the fat particles in the mixture in the conduit prior to thawing of the frozen water have a substantially similar density that prevents the lean particles and the fat particles from accumulating at different elevations.

In one embodiment, the method may further include adding carbonic acid solution to the mixture before step (a), wherein the carbonic acid solution has a temperature higher than the freezing point of water to thaw the frozen water.

In one embodiment, the method may further include, wherein the mixture comprises bones, and allowing the bones to separate from the mixture before the thawing of water.

In one embodiment, the method may further include, wherein the conduit comprises a vertical section and a horizontal section, and bones are separated at a bend from the vertical section to the horizontal section.

In one embodiment, the method may further include, wherein the conduit comprises a vertical section and a horizontal section, and carbonic acid solution is added at a point in the vertical section.

In one embodiment, the method may further include, wherein the conduit comprises a vertical section and a horizontal section, and a hopper is connected to an upper end of the vertical section, and carbon dioxide gas is added to the vertical section above the point where the carbonic acid solution is added to prevent carbonic acid solution from entering the hopper.

In one embodiment, the method may further include providing a valve at the bottom of the hopper, and the valve is opened to allow a predetermined amount of mixture into the vertical section.

In one embodiment, the method may further include, before step (a), crushing beef particles comprising both fat matter and lean matter to produce the lean particles and the fat particles in the mixture.

In one embodiment, the method may further include before crushing beef particles comprising both fat matter and lean matter to produce the lean particles and the fat particles in the mixture, chilling the beef particles to a temperature at which the fat matter can crumble and separate from the lean matter to produce fat particles and lean particles.

In one embodiment, the method may further include, wherein the amount of fluid by weight is at least equal to or greater than the combined weight of fat particles and lean particles.

In one embodiment, the method may further include transferring a third portion of the mixture through a third conduit branch connected to the conduit, wherein the mixture in the third conduit branch comprises a greater percent by weight of fluid than fat and lean, wherein the third conduit branch is higher in elevation than the first conduit branch.

In one embodiment, the method may further include transferring a second portion of the mixture having the accumulated fat particles through a second conduit branch connected to the conduit, wherein the mixture in the second conduit branch comprises a greater percent by weight of fat particles compared to the mixture in the first conduit branch, and transferring a third portion of the mixture through a third conduit branch connected to the conduit, wherein the third conduit branch divides into an upper branch to connect with the first conduit branch, and a lower branch to connect with the second conduit branch.

In one embodiment, the method may further include transferring a second portion of the mixture having the accumulated fat particles through a second conduit branch connected to the conduit, wherein the mixture in the second conduit branch comprises a greater percent by weight of fat particles compared to the mixture in the first conduit branch; and emulsifying the second portion of the mixture and transferring the emulsified mixture through a lower and upper branch conduits, wherein the lower branch conduit connects to the first conduit branch.

In one embodiment, the method may further include transferring the emulsified mixture through a lower, center and upper branch conduits, wherein the lower branch conduit connects with the first conduit branch, the center branch conduit connects with the upper branch conduit and the first conduit.

In one embodiment, the method may further include separating fluid from the portion of the mixture having the accumulated lean particles via centrifugation.

In one embodiment, the method may further include transferring a second portion of the mixture having the accumulated fat particles through a second conduit branch connected to the conduit, wherein the mixture in the second conduit branch comprises a greater percent by weight of fat particles compared to the mixture in the first conduit branch; and separating fluid from the second portion of the mixture having the accumulated fat particles via centrifugation.

In one embodiment, the method may further include transferring a second portion of the mixture having the accumulated fat particles through a second conduit branch connected to the conduit, wherein the mixture in the second conduit branch comprises a greater percent by weight of fat particles compared to the mixture in the first conduit branch; and allowing fluid and fat particles from the second portion of the mixture to stratify within a vessel to produce a stratum comprising a majority of fat particles and a stratum comprising a majority of fluid. This method may further include collecting the stratified fat particles. This method may further include, wherein the fluid comprises carbonic acid, and further comprising collecting the stratified fluid with carbonic acid and heating the fluid to produce carbon dioxide gas. This method may further include collecting lean particles that stratify at the bottom of the vessel, and returning the lean particles to the mixture of step (a).

In one embodiment, the method may further include, wherein the portion of the mixture transferred in the first conduit comprises a minority of the fat particles in the mixture. This method may further include, wherein the second portion of the mixture transferred in the second conduit comprises a minority of the lean particles in the mixture.

In one embodiment, the method may further include, wherein the conduit comprises a chamber having a triangular shape with three sides, a corner of the chamber formed by two of the sides is at a first high elevation, and the chamber includes plates defining passages leading from a lower elevation of the chamber to the first high elevation. This method may further include, wherein the triangular chamber comprises at least two exterior sides that are not horizontal and not vertical with respect to a ground surface.

In one embodiment, the method may further include providing a plurality of horizontal plates in the conduit, wherein a horizontal plate comprises a proximal end that terminates further upstream in the conduit as compared to a proximal end of a horizontal plate of lower elevation.

In one embodiment, the method may further include providing a second branch conduit connected to the conduit at a higher elevation than the first branch conduit, providing a third branch conduit connected to the conduit at a higher elevation than the second branch conduit, providing a plurality of horizontal plates in the conduit, and juxtaposing a proximal end of a dividing plate next to a distal end of a horizontal plate, and transferring a portion of the mixture below the dividing plate to the second branch conduit, and transferring a portion of the mixture above the dividing plate to the third branch conduit, wherein the percent of fat by weight of the mixture in the third conduit is higher than the percent fat by weight of the mixture in the second conduit. This method may further include, wherein the distal ends of the horizontal plates define an arc, and the dividing plate is pivotable to juxtapose a proximal end of the dividing plate next to a distal end of a horizontal plate. This method may further include providing a stationary dividing plate between the second and third conduits, wherein the lower surface of the dividing plate leads to the second branch conduit, and the upper surface of the dividing plate leads to the third branch conduit, and the pivoting dividing plate is proximally located to the stationary dividing plate.

In one embodiment, the method may further include, wherein the conduit has an aspect ratio defined as the cross-sectional width divided by the cross-sectional height, and the aspect ratio decreases along the length of the conduit from a proximal side to a distal side.

A method for separating fat matter from lean matter includes transferring a mixture, the mixture comprising lean particles comprising frozen water, fat particles, and a fluid, through a conduit, allowing the frozen water in the lean particles to thaw as the mixture travels through the conduit and increases the density of the lean particles, accumulating the fat particles at a first elevation in the conduit and accumulating the lean particles with nonfrozen water at a second elevation in the conduit, wherein the first elevation is higher than the second elevation, and transferring a portion of the mixture having the accumulated fat particles through a first conduit branch connected to the conduit, wherein the portion of the mixture transferred in the first conduit branch has a majority of the fat particles in the mixture. This method may further include transferring a second portion of the mixture through a second branch conduit that connects to the first conduit branch, and the second branch conduit is higher in elevation than the first branch conduit, and includes a greater percentage of fat matter as compared to fat matter in the first conduit branch.

One embodiment of a method is related to a method for separating lean from fat. The method includes: (a) transferring a mixture through a conduit, wherein the mixture comprises lean particles with frozen water, fat particles, and a fluid; (b) allowing the frozen water in the lean particles to thaw as the mixture travels through the conduit, and increases a density of the lean particles; (c) accumulating the lean particles with non-frozen water at a first elevation in the conduit, and accumulating fat particles at a second elevation in the conduit, wherein the first elevation is lower than the second elevation.

In one embodiment, the method may further comprise transferring the accumulated lean particles through a conduit branch connected to the conduit, wherein the accumulated lean particles transferred in the conduit branch comprise a majority of the lean particles in the mixture.

In one embodiment, the method may further comprise transferring the accumulated fat particles through a conduit branch connected to the conduit, wherein the accumulated fat particles transferred in the second conduit branch comprise a majority of the fat particles in the mixture.

In one embodiment, the method may further comprise transferring a portion of the mixture through a conduit branch connected to the conduit, wherein the mixture in the conduit branch comprises a greater percent by weight of fluid than fat and lean.

In one embodiment, the lean particles and the fat particles in the mixture in the conduit prior to thawing of the frozen water have a substantially similar density that prevents the lean particles and the fat particles from accumulating at different elevations.

In one embodiment, the method may further comprise adding carbonic acid solution to the mixture before step (a).

In one embodiment, the fluid may have a temperature higher than the freezing point of water.

In one embodiment, the mixture may further comprise bones, and allowing the bones to separate from the mixture before the thawing of water.

In one embodiment, the conduit may comprise a vertical section and a horizontal section, and the bones are separated at a bend from the vertical section to the horizontal section.

In one embodiment, the method may further comprise, before step (a), applying pressure to pieces of beef comprising both fat matter and lean matter to produce the lean particles and the fat particles in the mixture.

In one embodiment, the method may further comprise, before applying pressure, chilling the pieces of beef to a temperature at which the fat matter becomes brittle and can crumble and separate from the lean matter upon the application of pressure.

In one embodiment, the method further comprises emulsifying the accumulated fat particles.

In one embodiment, the method may further comprise collecting the accumulated lean particles and centrifuging the lean particles to separate fluid.

In one embodiment, the conduit can have an aspect ratio defined as the cross-sectional width divided by the cross-sectional height, and the aspect ratio decreases along the length of the conduit from a proximal side to a distal side.

When the separators include coriolis measuring instructions that are used to control the massflow via a flow controlled pump, such as generally illustrated in FIG. 3, the separators may be used in a method to achieve a product having a predetermined fat content of the lean stream (i.e., blocks 42, 44, and 56 of FIG. 1). Accordingly, the separators may be used in a method for producing a beef product having a predetermined fat content, including: (a) transferring a mixture comprising measured proportions of a first stream of lean and fat particles with a second stream of fluid, through a conduit; (b) transferring a first portion of the mixture having accumulated lean particles through a first conduit branch connected to the conduit, wherein the portion of the mixture transferred in the first conduit branch has a majority of the lean particles in the mixture; (c) transferring a second portion of the mixture having accumulated fat particles through a second conduit branch connected to the conduit, wherein the portion of the mixture transferred in the second conduit branch has a majority of the fat particles in the mixture; (d) measuring the first portion of the mixture having the accumulated lean particles in the first conduit branch and determining the content of fat in the first portion; (e) comparing the content of fat in the first portion with a target fat content, and further performing (f1) or (f2), wherein (f1) is increasing the massflow of the second portion of the mixture through the second conduit branch to decrease the fat content of the first portion of the mixture in the first conduit branch, and (f2) is decreasing the massflow of the second portion of mixture through the second conduit branch to increase the fat content of the first portion of the mixture in the first conduit branch.

In one embodiment, the method may further include measuring the massflow of the first portion of the mixture and determining a density, and correlating a density to the fat content of the first portion of the mixture.

In one embodiment obtaining a plurality of measurements of the massflow of the first portion of the mixture, and obtaining an average of the measurements.

In one embodiment, the method may further include reducing the mass flow of the second stream of the mixture flowing through the second conduit branch and maintaining a constant mass-flow until the fat content of the first stream of the mixture reaches a high target value, and then increasing the mass-flow of the second portion of the mixture through the second conduit branch and maintaining a constant massflow until the fat content of the first portion of the mixture reaches a low target value, wherein the high target value and the low target value are not the same. This method may further include measuring the fat content of the second portion of the mixture and determining the constant mass-flow based on the measured fat content of the second portion of the mixture.

In one embodiment, the method may further include separating the mixture into three portions, wherein the third portion is lower in fat content than the second portion.

Fat Emulsifier

Figure 11:
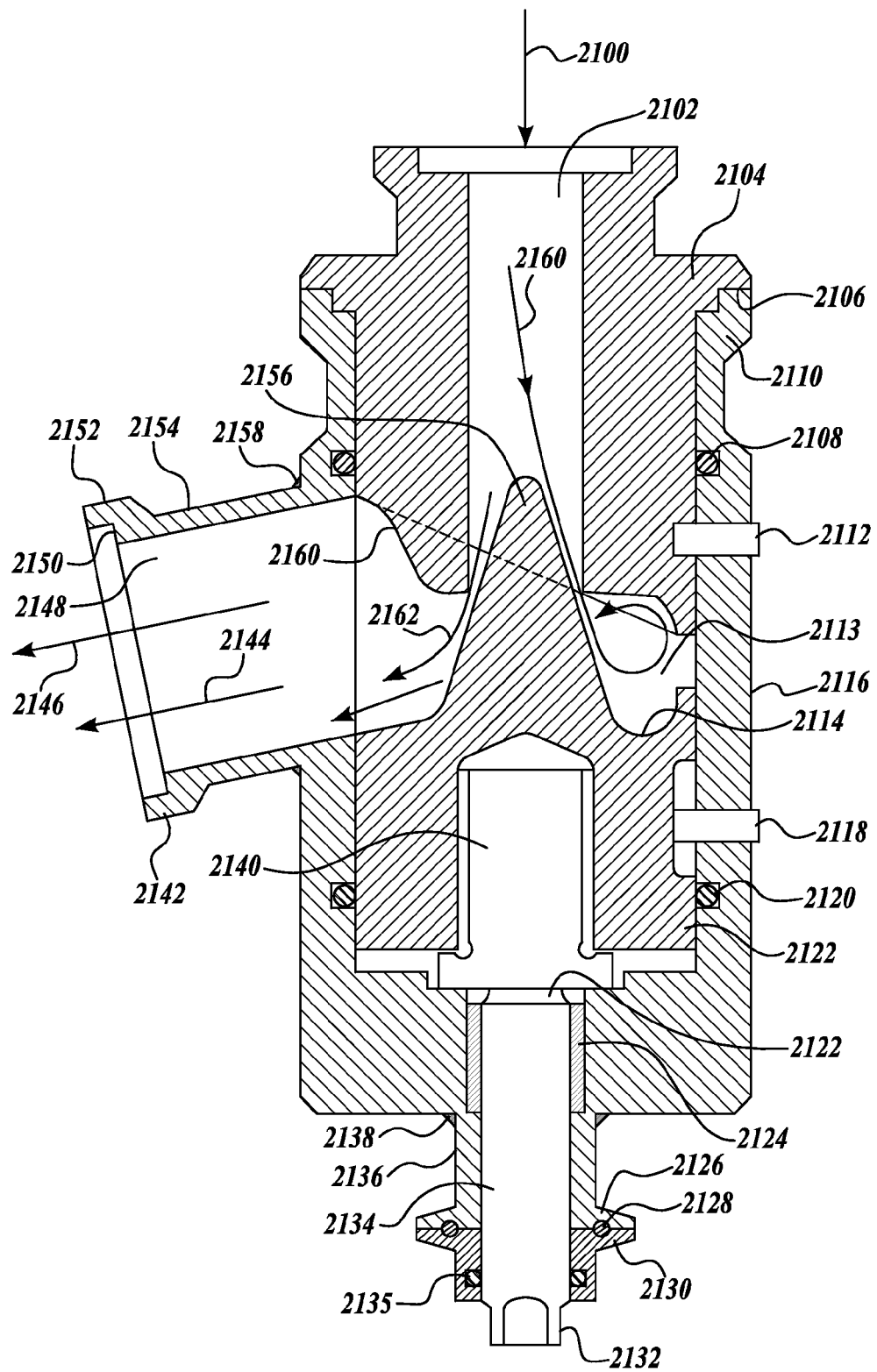
FIG. 11 is a diagrammatical illustration of apparatus for the homogenization and/or emulsification of fat.

Referring to FIG. 11, an emulsifying device is illustrated. The device includes an inlet 2102 and an outlet 2152. Between the inlet 2102 and the outlet 2152, a high shear-producing member is placed in the path of fluid carrying particles comprising fat. The fluid stream comprising fat particles, denoted by arrow 2100, is introduced through the inlet 2102. A cone-shaped plug 2156 fits within a cylinder. The plug 2156 rests on a piston 2122 that is located at the bottom of the chamber. The piston 2122 includes piston rings 2120, which provide sealing around the cylinder walls 2116. Thus, the piston with the cone-shaped plug 2156 can be moved upwards and downwards within the cylinder 2116. An annular member 2104 creates the inlet 2102 of a specific diameter. The annular member terminates at a lower end in a 90 degree edge that approaches, but does not touch the circumference of the cone-shaped plug 2156. The cone-shaped plug 2156 has a diameter at its base that is larger than that the diameter of the inlet 2102. The cone-shaped plug 2156 tapers as it rises within the inlet of the annular member to the apex of the cone-shaped plug 2156. Furthermore, the base of the cone-shaped plug 2156 may be encircled by a depression 2114. Therefore, as can be appreciated, the piston 2122 and therefore the cone-shaped plug 2156 can create an annular space between the circumference of the plug 2156 and the lower edge of the annular member 2104. If the plug 2156 is brought sufficiently close to the lower edge of the annular member 2104, a very narrow annular space is created between the cone-shaped plug 2156 and the lower edge. As such, the velocity is increased and very high shear forces will cause any fat to be scraped or removed from the larger solid particles. The plug 2156 can be moved up or down to change the width of the annular space, and thus, also create a small or large pressure drop in passing the shear zone.

After passing the shear zone, the solid fat particles travel in the space 2113 around the cone 2156 and eventually exit through the outlet 2154. In this manner, as can be seen, a high-pressure will result in the emulsification of fat from solid particles.

Referring to FIG. 12, a second embodiment of a fat emulsifier is illustrated. The fat emulsifier is incorporated into a conduit 2910 of generally rectangular configuration. The inlet 2904 is for transferring a mixture of fluid, solid, fat and lean particles, denoted by arrows 2900. From the inlet 2904, the conduit 2910 rapidly increases in diameter. This rapid increase in diameter allows fat particles to flow upward, while the lean particles flow downward. The lean particles 2908 follow a path along the lower section of conduit 2910 due to the higher density, while the fat particles 2958 generally flow upward and encounter a diverter 2970. The stationary or movable diverter 2970 is positioned between a first outlet conduit 2952 and a second inlet conduit 2940. The diverter 2970 includes a wide base connected to a narrow stem on top. The diverter 2970 projects downward from the top of the conduit 2910, such that a sharp edge of the diverter 2970 is facing in the direction of the oncoming fluid 2958, 2956 and the edge directs the uppermost fluid to enter the conduit 2952. The diverter 2970 may be raised to create a narrow gap 2954. Such narrowing of the gap 2954, increases the pressure drop and creates higher shear forces on any particles passing through the gap 2954, which provides for a way of separating fat from connective tissue.

The fluid with the entrained solid fat particles, which have now been subjected to high shear forces, are diverted by the plug 2970 into the inlet conduit 2952 and are then directed to a pump (not shown), which then returns the fluid through conduit 2940 into the conduit 2910. The pump returns the mixture of fluid and fat particles through the inlet nozzle 2940 on the distal side of the diverter 2970.

Compared to the diameter of the inlet conduit 2904, the diameter of the conduit 2910 is relatively three-fold, and this causes the fluid carried in the center of the conduit 2910 to be essentially clear fluid. The clear fluid allows the materials separated from the fat and which are heavier than the fat to immediately sink after exiting the distal side of the diverter 2970 through conduit 2940. The conduit 2910 has two distal outlets. The higher elevation conduit branch 2926 will remove a mixture of fluid with fat particles 2930. The lower conduit branch 2920 will remove fluid with lean particles 2922 and any particles that have been stripped from the fat particles. Such particles that were previously attached with fat are shown as arrows 2932 and 2934 traversing downward across the clear fluid that fills the center 2912 of the conduit 2910 and are directed toward the lower conduit branch 2920.

It should be noted that the end piece 2924 of conduit 2910 has a convex interior shape that assists with directing flow to both high conduit branch 2926 and low conduit branch 2920.

Bond Breaking Compression Device

Figure 13A:
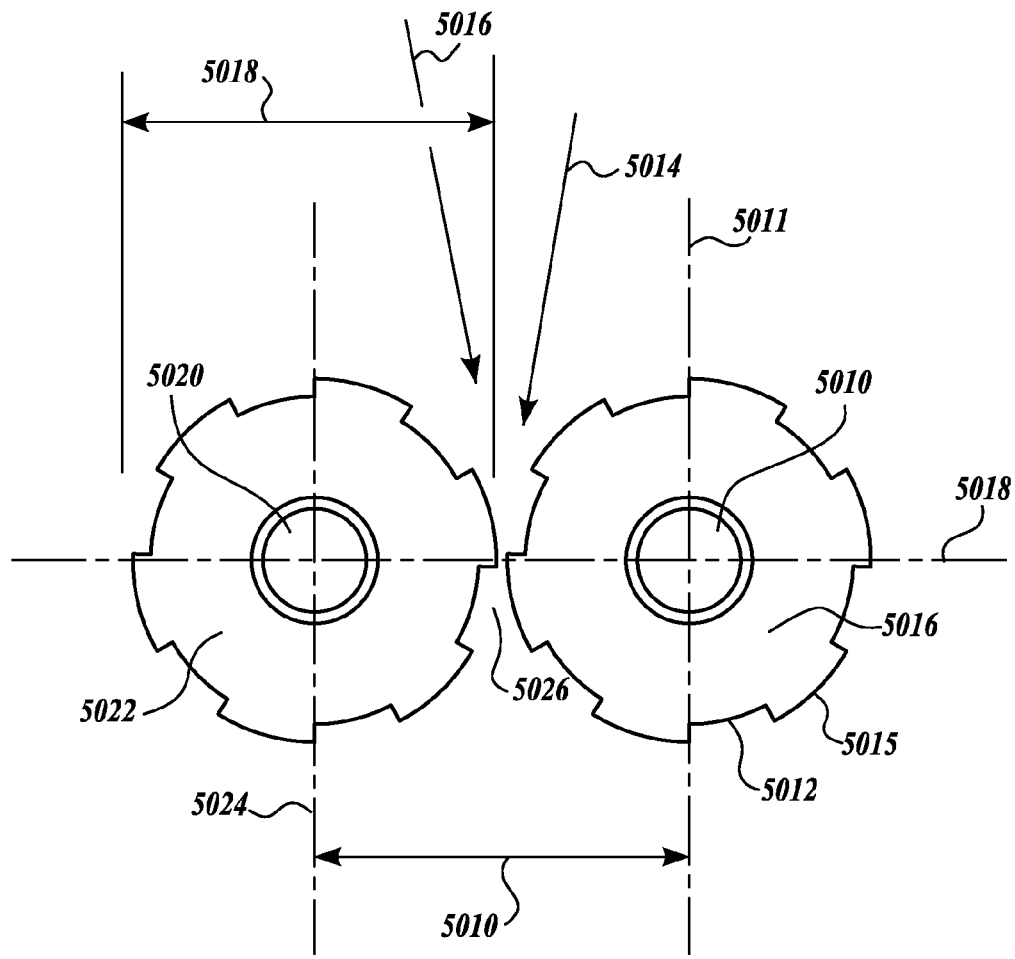
FIG. 13A is a diagrammatical illustration of apparatus for breaking fat.

FIG. 13A shows the end view of a pair of rollers that may be used in one embodiment of the bond breaking compression device, block 12 of FIG. 1. A pair of shafts 5020 and 5010 are mounted in bearings (not shown) with a timing belt drive arranged to rotate roller 5022 and 5016 in opposite directions with roller 5016 rotating in a counter clockwise direction while 5022 rotates in a clockwise direction. Rollers 5016 and 5022 are positioned relative to each other such that diced and temperature-reduced beef product as described earlier can be transferred there between in the direction shown by arrows 5016 and 5014. The distance between the perpendicular centerline of each roller is held in a selected position such that protrusions 5015 and recess 5012 are adjacent to each other as the rollers rotate and provide a gap 5026, as shown in FIG. 13B of a hypothetical condition, wherein the surface of each roller has been straightened and the recess 5008 and protrusion 5004 are arranged opposite to the other roller such that the protrusion is opposite a recess.

The length of the protrusion 5004 is less than the length of the recess 5008 such that when the distance between the rollers 5016 and 5022 is as shown, a clamping force can be applied to the beef pieces transferred therebetween but no damage such as cutting the beef occurs. All corners are radiused heavily and this further limits the capacity of the rollers to damage the beef product by cutting while performing crushing to liberate the friable fat matter from the beef pieces, leaving mostly lean matter and little fat matter on the beef pieces.

The temperature of the individual beef pieces is controlled such that the lean matter of the beef piece will remain flexible and not be prone to breakage or shattering, while the fat matter is friable and prone to breakage and will fracture and shatter into small particles. In one embodiment, the bond breaking compression device includes intermeshing teeth, either on opposed rollers, as just described in associate with FIG. 13A, or on top and bottom threads running parallel in a continuous manner. The spacing of the teeth can be determined based on the size of the fat particles that are shattered coming from the outlet of the bond breaking compression device. If the fat particles are too large, the spacing between the teeth can be decreased to reduce the size of fat particles. If the fat particles are too small and/or lean is combined with the fat, then the spacing of the intermeshing teeth can be increased. From the bond breaking compression device approximately 1,000 lbs., for example, can be accumulated in a storage hopper and at the appropriate cycle time transferred to separation equipment, wherein the beef and fat particles are blended with a quantity of carbonic acid sufficient to fill the separation equipment which is sealed and pressurized to approximately 150 psia prior to the carbonic acid fluid transfer therein.

Figure 13B:
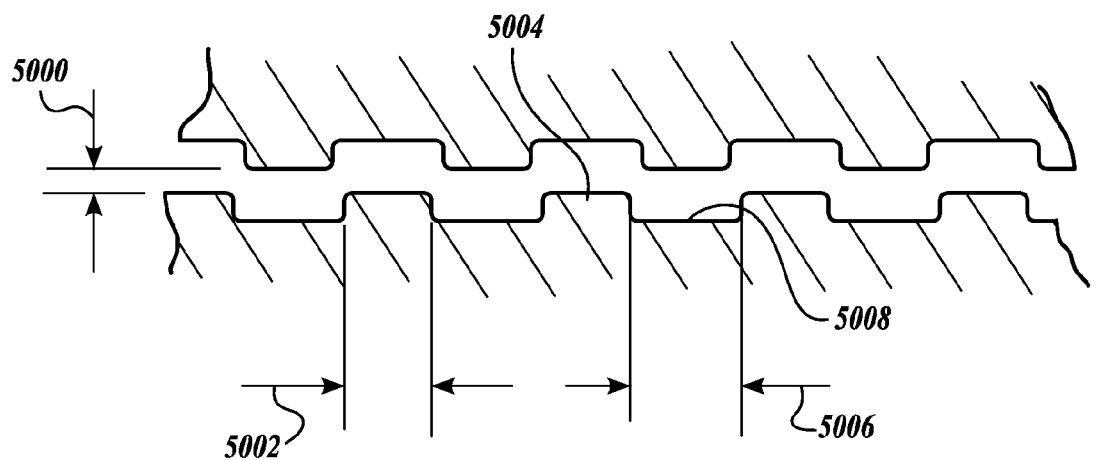
FIG. 13B is a diagrammatical illustration of apparatus for breaking fat.

As can be appreciated from the description above, the bond breaking device of FIGS. 13A and 13B, may be used in a method for separating solid fat from beef pieces.

The method includes (a) chilling beef pieces comprising fat matter and lean matter for a time and at a temperature that results in uneven chilling of surfaces of the fat matter and lean matter, wherein the lean matter is chilled to a temperature to cause freezing of water in the lean matter, and the surface temperature of the fat matter is lower than the surface temperature of the lean matter, and (b) applying pressure to the beef pieces to break the fat matter from the beef pieces while leaving the lean matter intact.

In one embodiment, the method may further include, wherein in step (b) the surface temperature of the fat matter is lower than the surface temperature of the lean matter by at least 5° F.

In one embodiment, the method may further include, wherein in step (b), the surface temperature of the lean matter is 26° F. or less, and the surface temperature of the fat matter is 5° F. or greater, and the surface temperature of the fat matter is lower than the surface temperature of the lean matter.

In one embodiment, the method may further include passing the beef pieces between a pair of parallel, adjacent, non contacting, driven rollers, each roller having alternating recesses and protrusions around the perimeter, wherein the rollers are arranged to position a recess of one roller opposite to a protrusion of the second roller, without the rollers being in contact.

Selected Fat Content

Figure 14:
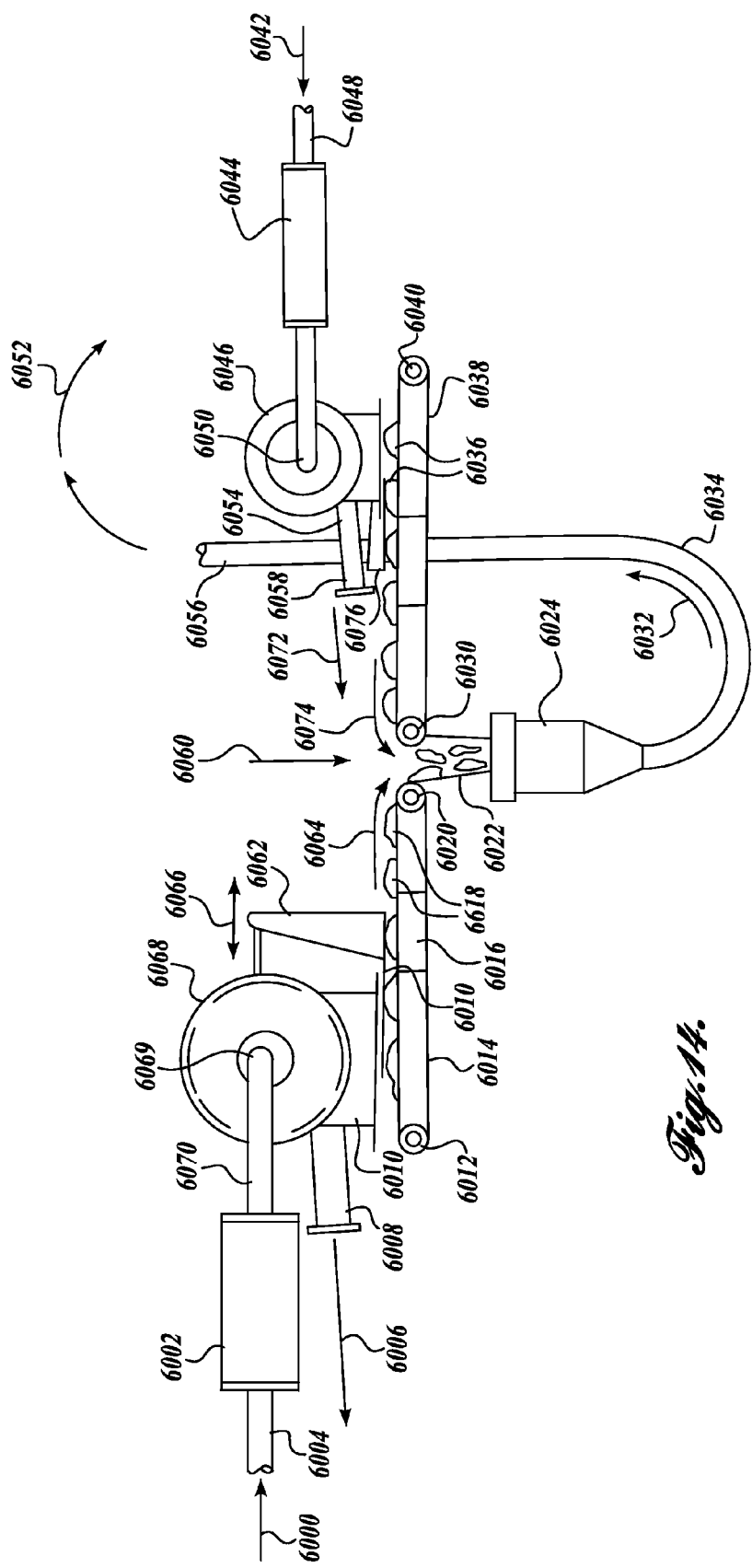
FIG. 14 is a diagrammatical illustration of apparatus for producing product having a desired fat content.

FIG. 14 shows a front elevation of an assembly of apparatus arranged to produce a selected fat content boneless beef product from the lean and fat streams separated in a separation system as described herein in association with FIGS. 2-8. The apparatus can provide for the liquid separation from lean solid particles and fat solid particles shown as blocks 42 and 48 of FIG. 1, and further provide for the combining of fat and lean to produce a product of selected fat content represented by the blocks 42, 44, 46, 48, 50, 52, and 54. However, in other embodiments, the fat content that is present with the lean stream can be controlled via the control of the flow rate of the fat stream, such that more or less fat can be added to the lean stream by controlling the amount of flow that is withdrawn from the system, such as described, for example, in association with FIGS. 3, 4, 6, 7, and 8.

In FIG. 1, all the mass flowing into the separation block 30 is measured as well as the mass flow of any stream leaving the separation block. Therefore, a total mass balance can be performed around the separator. The preferred measurement instrument is a coriolis flow meter. A coriolis flow meter is able to measure the mass flow per unit time and the density and temperature of the fluid. From knowing the density, the volumetric flow may also be determined. In the embodiment of FIG. 1, the total mass flow to the separation block 30 is measured by block 28. Also, the carbonic fluid that is added is also measured by block 26, therefore, by subtracting the mass of the carbonic fluid, the mass of the beef pieces, including fat and lean particles can be known. If more than one stream is added to the inlet flow, then, every flow is measured so that the mass of the combined lean and fat particles can be known. The separation block 30 has at least two outlet flows, including the lean matter with fluid, block 32 and the fat matter with fluid, block 36. However, if additional flows, such as illustrated in FIGS. 6 and 8 are present, then all outlet flows are measured. All inlet or outlet flows are measured to determine the mass flow, density and temperature. In FIG. 1, the bone matter and fluid flow, block 34 is optional, but, if present, this flow may also be measured. As discussed above, the fluid density influences the degree of separation between fat and lean matter. Therefore, fluid density can be related to the amount of fat with the lean matter in block 32 because it has been found that for any given fluid density, the lean matter will contain a predictable fat content. A correlation table can be created that stores a relationship between fluid density and a corresponding amount of fat in the lean matter of block 32. Therefore, the density of the flow of the lean matter and fluid of block 32 can be determined. For example, prior to of each of the flows of blocks 32 and 36d.

In FIG. 14, the lean stream with carbonic acid fluid is transferred in the direction shown by arrow 6000 via conduit 6004 and through coriolis measuring instrument 6002, from which the flow rate, water content and/or fat content of the lean matter/fluid may be determined, and continuing therefrom along conduit 6070 and into centrifuge 6068 via port 6069. In this way, the apparatus as arranged removes liquid carbonic acid and discharges the liquid via conduit 6008 in the direction shown by arrow 6006. The solid, lean matter is discharged via aperture manifold 6010 onto continuous inline weighing conveyor 6016. A shield 6080 is arranged to provide a suitable method of dividing the continuous stream of lean matter deposited on conveyor 6016 into portions with spaces there between and as can be seen with portions, such as 6018, a gap is shown between them and indeed all other portions. This is provided to enable the continuous weighing of the continuous stream divided into portions with gaps by the weighing section 6016. Shield 6080 is attached to member 6062 mounted to a means of providing horizontal movement shown by arrow 6066. The movement indicated by arrow 6066 is in a horizontal plane and shield 6080 can be arranged to shield strips of the conveyor such that gaps are provided as required. Conveyor 6016 comprises a continuous belt which extends horizontally and is held in position by a roller at each end 6012 and 6020. In this way, the continuous stream of lean matter is weighed prior to transfer into accumulation hopper 6024 and in the direction shown by arrows 6064 and 6060.

The fat stream with carbonic acid fluid separated in a separator, such as a manifold arrangement upstream is transferred in the direction shown by arrow 6043 and into conduit 6048 and passes through coriolis measuring instrument 6044, from which the flow rate, water and/or fat content of the fat/fluid may be determined, and then is transferred into centrifuge 6046 via centrally disposed port 6050. Solid fat matter is removed from the stream and the spent carbonic acid is discharged via conduit 6054 in the direction shown by arrow 6072. A horizontally disposed continuous weighing conveyor 6038 is arranged directly beneath the discharge port of centrifuge 6046 such that a measured proportion of fat matter deposited thereon is weighed as it is transferred in the direction shown by arrow 60734. As can be seen, portions 6036 for example are shown with a gap between them similar to the arrangement provided on continuous weigh belt 6016.

A shield 6076 is attached to a member mounted to a means of providing horizontal movement. The shield 6076 can be arranged to shield strips of the conveyor such that gaps are provided as required. Conveyor 6038 comprises a continuous belt which extends horizontally and is held in position by a roller at each end 6030 and 6040. In this way, the continuous stream of fat matter is weighed prior to transfer into accumulation hopper 6024 and in the direction shown by arrow 6076.

The flow of fat matter and flow measured via coriolis measuring instrument 6044 is controlled such that the amount of fat weighed and transferred into collection hopper 6024 is the amount required to provide a selected fat content boneless beef when combined with the lean stream weighed on conveyor 6016.

Pathogen Deactivation Vessels

A vessel includes a shuttling action that provides a semi-continuous process wherein approximately 2,000 lbs of beef is loaded into the shuttling basket and it is then immediately transferred into the autoclave. A measured quantity of the raw beef is accumulated in autoclave or alternatively in a hopper located directly above the shuttling basket at the input end of the autoclave and in such a way that the shuttling basket can be loaded rapidly by opening a set of "bomb" doors arranged in the base of the upper hopper, so as to provide a rapid loading of the basket. The autoclave operates by processing batches of beef product and when an amount of, for example 2,000 lbs, has been accumulated in the shuttle basket, the autoclave is closed and all air removed by displacement with carbon dioxide fluid transferred under pressure from carbon dioxide gas vessel. After purging substantially all air from autoclave, all ports are closed except for the connection to vessel, which charges the autoclave to about 350 psia with carbon dioxide gas. Communication with vessel is disconnected by closing a valve, which is immediately followed with opening of valve connection to vessel containing liquid carbon dioxide to facilitate transfer of carbon dioxide fluid, which then fills autoclave with 950 psia fluid carbon dioxide. During the transfer of carbon dioxide into autoclave, the beef contents enclosed within the "shuttling basket" are agitated to ensure that all surfaces of every piece of beef are exposed to sufficient liquid carbon dioxide to elevate the temperature at the surface of the beef to a preferred temperature of at least 89° F. but not more than about 108° F. Communication with the liquid carbon dioxide source vessel is then interrupted by disconnecting or closing of a valve immediately prior to the immediate opening of a valve allowing transfer of super critical vapor from storage vessel, while carbon dioxide is allowed to escape via conduit connection into carbon dioxide recycle vessel. In this way super critical carbon dioxide vapor is transferred to the autoclave at a pressure of approximately 1,500 psia and, with the suitable agitation within autoclave, all beef particle surfaces are thereby exposed to the aggressive solvent properties of super critical carbon dioxide. Such exposure of pathogens (e.g., $E.\ Coli$. 0157:H7, salmonella, Listeria Monocytogenes and others) to super-critical carbon dioxide is lethal and will cause death within a few minutes of exposure. After a period of time of up to 7 minutes, the flow of supercritical carbon dioxide from vessel through autoclave and into recycle vessel is shut off and autoclave depressurized to atmospheric pressure prior to the pathogen deactivated beef being transferred directly from autoclave to dicing machine prior to transfer to and through carbon dioxide freezing tunnel.

Figure 15:
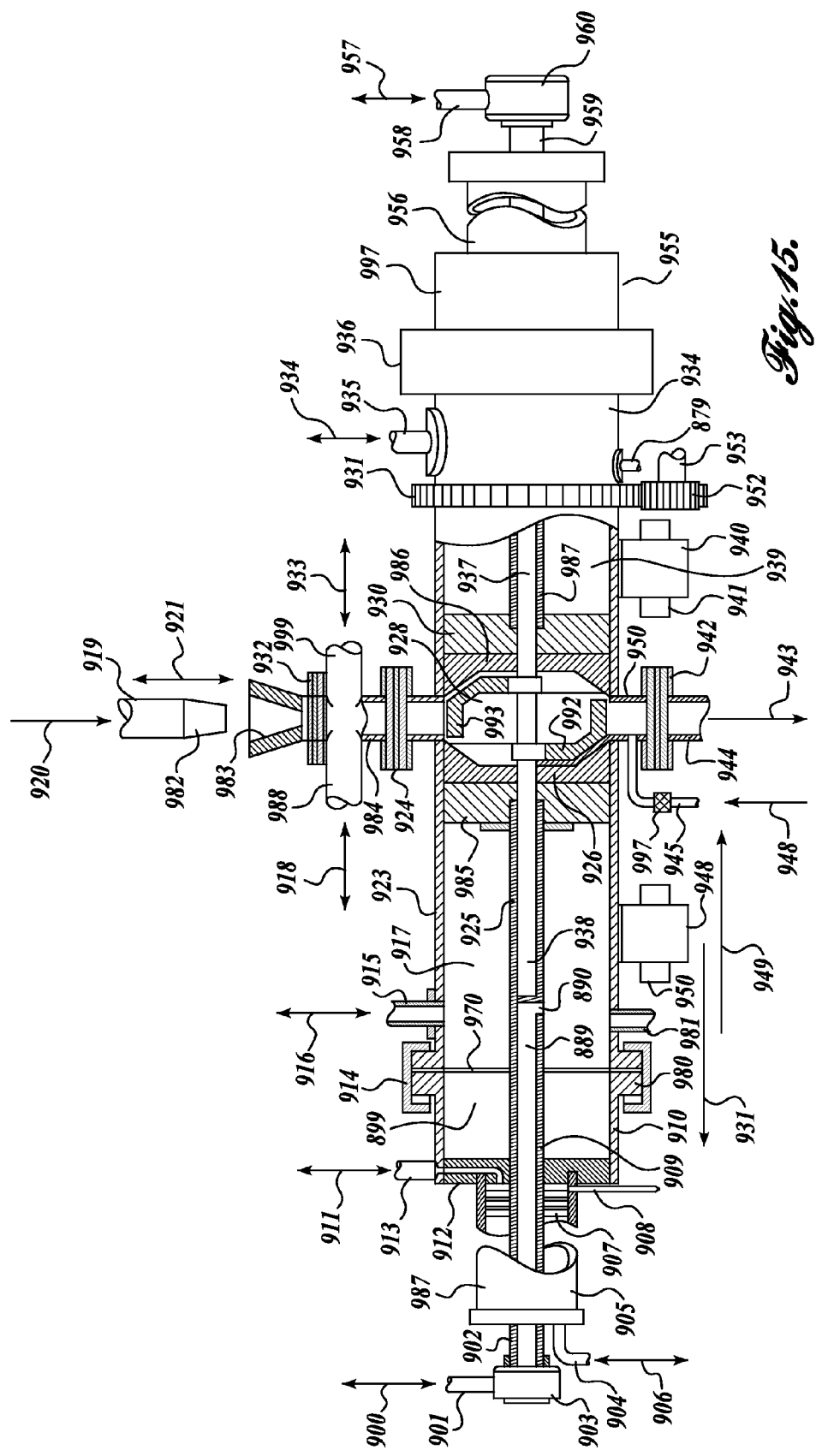
FIG. 15 is a diagrammatical illustration of apparatus for pathogen deactivation.

Referring to FIG. 15, a pathogen deactivation vessel (PDV) 955 is shown in partial cross section. The vessel 955 described herein may be used for block 4 of FIG. 1. Also as described herein, the vessel 955 may also be used to separate carbon dioxide liquid and/or other fluids from solid matter, such as to separate liquid from lean matter in block 42 of FIG. 1 and to separate liquid from fat matter in block 48 of FIG. 1.

The vessel includes a horizontally disposed tubular vessel 923 arranged with end caps 910 and 997 which are held in place by "rings" 914 and 936, thereby providing an adequate sealing at interfaces such as 970. The annular members 914 and 936 can be rotated to release end caps 910 and 997 or alternatively rotate in the opposite direction to tighten the end caps at interface such as 970.

A pair of horizontally opposing pistons 926 and 986, each piston being sealingly mounted within the vessel to provide an enclosed space 928. Pistons 926 and 986 are arranged with backing plates 985 and 930, respectively, attached via piston rods 925 and 937 to hydraulic cylinders 956 and 987. Each piston assembly is fixed at its circumferential center to a piston rod 925 or 937. FIG. 15 shows the piston rods with pistons 986 and 926, in a fully extended position, inwardly, toward the center of the pathogen deactivation vessel 955 so as to provide 3 separated spaces, 928 is the space between the pistons, space 939 is the space between the backing plate 930 and the end cap 997 and space 917 is the space between backing plate 985 and the end cap 910. The space 928 between pistons is connected to both spaces 939 and 917 via conduits and valves. Space 928 connects to space 939 via valve 924, conduit 999 and a continuation of conduit 999 which is not shown to conduit 935 on the top side of the vessel 923 that leads into space 939. Space 928 connects to space 917 via valve 924, conduit 988 and a continuation of conduit 988 which is not shown to conduit 915 on the top side of the vessel 923 that leads into space 917.

An upper, centrally disposed port is attached to a manifold 984 with gate valve 924, which can seal the port closed as needed. Gate valve 924 separates the vessel loading apparatus from manifold 984. Conduits 999 and 988 connect via suitable "open/closed" valves 1000 and 1001 (not shown) directly with ports 935 and 915 respectively (connecting pipes not shown), such that when gate valve 942 is closed and gate valve 924 is open, a direct communication between the centrally located space 928 with spaces 939 and 917 is provided.

The spaces 917 and 939 are used as accumulators to receive fluid at the same or substantially the same pressure that is within space 929. Accordingly, when the pistons 926 and 986 are moved distally from a proximal position, the fluid is forced from the space 928 into one or both of spaces 917 and 939. Before admitting fluid to either of spaces 939 and 917, preferably the spaces have been pressurized to be in equilibrium with the pressure in space 928. Alternatively, instead of the fluid being sent to spaces 939 and 917, the fluid may be transferred to an "external" accumulator connected to the manifold conduits 999 and 988 through a valve 924 located on the top of the vessel 923. An accumulator can be a piston accumulator. A piston accumulator is a known device and may include a fluid section and a gas section with a piston separating the two sections. When the fluid section draws in the fluid from space 928, the piston compresses the gas section, which may be nitrogen, for example. However, other food compatible gasses may be used. When the pressure drops in space 928, the compressed gas forces the piston to discharge the stored fluid. In this case, instead of transferring the fluid to the space 928, the fluid may be transferred to the carbon dioxide recovery block 56 as seen in FIG. 1. A suitable accumulator can be one supplied by Hydac. As described, an accumulator can be the internal spaces 939 and 917 or an external accumulator. However, both have the capability of an increasing/decreasing volume space to accommodate a corresponding change in volume as the vessel pistons 926 and 986 move together so as to keep the carbon dioxide gas at a fairly constant pressure, such as above the critical phase of carbon dioxide. After treating the goods to reduce pathogen populations that may be present with the goods, the pressure can be raised within the tubular vessel 923 to a first fluid pressure value by moving the horizontally opposed pistons 926 and 986 together and reducing the space between them to decrease the density of the fluid to a value lower than a density of the goods. In some embodiments, the density of the fluid is increased.

Then, the valve 924 can be opened to connect the pressurized space 928 to a piston accumulator and allow the relatively lighter fluid to transfer into a liquid space of the piston accumulator while the piston accumulator increases the volume of the liquid space and the pistons located in the vessel 923 reduce the volume of the space 928 containing the goods until the fluid has been transferred into the accumulator leaving a residual quantity of fluid with the goods. Then, the valve 924 can be closed and the pistons 926 and 986 moved apart to decrease the fluid pressure within the vessel 923 to a lower second pressure value and opening a second valve, such as valve 942, to allow transfer of fluid into a second vessel at a lower pressure value.

A lower, centrally located port 961 is connected to extraction conduit 944 via gate valve 942. A drainage pipe 945 with valve 997 is also provided.

Ports 981 and 879 are also connected to space 928 via pipe 945 or manifold 984. Valves (not shown) are provided at ports 981 and 879 to isolate the ports as needed.

A shaft 937 extends through the center of piston rods 987 and 925, pistons 986 and 926 and backing supports 930 and 985 to an end 938. Impellors 992 and 993 are diametrically opposite each other and both are attached to impellor shaft 937 and are also profiled to fit close to the recessed surfaces of the pistons 926 and 986, respectively, as they are rotated by impellor shaft 937, which is attached to a driving mechanism (not shown).

A spur gear (wheel) 931 is fixed to the outer circumference of the pathogen deactivation vessel and is arranged to engage with pinion 952 which is mounted to drive shaft 953.

A "cradle" of rollers such as 940 and 948, mounted to shafts such as 941 and 950, are arranged to retain the entire weight of the pathogen deactivation vessel 955 and hold the vessel captive while allowing it to be rotated in both clockwise and counter clockwise directions by the pinion 952, which is driven via shaft 953 so as to rotate the vessel assembly 955 190 to 180 degrees from the perpendicular in a counterclockwise direction, and then 380 to 360 degrees in a clockwise direction, and then in a counterclockwise direction, repeating the back and forth rotation during each cycle of the apparatus described in association with FIG. 15.

A rotary union 903 communicates directly between supply pipe 901 carrying carbon dioxide liquid or vapor and piston rod 902 passageway 889 and exit port 890.

Female member 922 with inner conical profile 983 is arranged to connect with male member 919 with conical profile 982 such that when member 919 is extended in the direction shown by arrow 921, the outer surface 982 and inner surface 983 of member 922 contact and provide a seal in a way that allows boneless beef to be transferred directly from a vessel (not shown) holding a single "charge" (for example 2,000 lbs) of predetermined quantity of boneless beef.

Member 919 can be extended so as to sealingly mate with member 922 so that when gate valves 942 and 924 are open and valves 1000 and 1001 closed (not shown), sealing contents of spaces 917 and 939 therein. In this way, boneless beef of a predetermined and measured quantity (in a vessel mounted on load cells above pathogen deactivation vessel 955) can be transferred from the vessel, via members 919 and 922 and through manifold 984 and into space 928. After transfer of a full load ("charge") of boneless beef into space 928, gate valve 942 can be closed, and any open space remaining within space 928 can be filled with pressurized carbon dioxide gas to a selected pressure such as 750 psi via conduit 945 and in the direction shown by arrow 948. Following pressurizing of space 928, valves 1000 and 1001 can be opened to provide an open conduit between spaces 917, 928 and 939.

Hydraulic cylinders 987 and 956 hold pistons 926 and 986 in position, as needed, and can be activated simultaneously to move away from each other (from distal to proximal positions), thereby increasing the volume of space 928 and decreasing the volume of spaces 939 and 917. This action causes carbon dioxide fluid to be displaced and transferred into space 928 from both spaces 939 and 917 via ports 915, 981, 879 and 935. Both pistons 926 and 986 can be withdrawn as seen fit but preferably to the fullest extent thereby transferring a major portion of the fluid carbon dioxide into the expanded space 928. Valves 1000, 1001 and the valves isolating ports 981 and 879 are then closed and pistons 986 and 926 activated in a direction toward each other (from proximal to distal positions) so as to reduce the volume of space 928, increasing pressure to about 1,500 psia.

During the movement of pistons 926 and 986 toward and away from each other, impellors 993 and 992 are rotated and pathogen deactivation vessel 955 is also rotated. The density drops from around 40 lbs/cubic foot to 28.96 lbs/cubic foot The pressure in the vessel is then increased quite rapidly to about 1,500 psia to ensure the surface temperature of the goods is elevated to a temperature above the critical temperature of carbon dioxide.

In one embodiment, the pressure is first elevated. Before the pressure is elevated, the vessel 923 is charged first with carbon dioxide gas/vapor to about 500 psia and then liquid carbon dioxide to about 700 psia and agitated to ensure all goods (meat/beef) surfaces are thoroughly soaked (with the liquid carbon dioxide) at a pressure and liquid density in which boneless beef (not frozen) will become somewhat buoyant. This spaces the pieces apart when agitated. There also needs to be space for the sudden expansion from below (about 990 psia) critical pressure (1,072.1 psia) to above critical pressure.

In one embodiment, pistons 926 and 986 are sequentially activated to compress the contents of space 928 and hold a pressure of 1,500 psia, thereby maintaining a pressure above the critical pressure of carbon dioxide (supercritical pressure) in space 928 for a predetermined period such as 85 seconds, in one embodiment, followed by a movement of pistons 926 and 986 away from each other, reducing the pressure in space 928 to a subcritical pressure of 900 psia for 85 seconds.

A treatment of boneless beef can be arranged such that each alternated 85 second period at 900 psi and 85 seconds at 1,500 psi can be sequentially repeated in a series of alternating sub critical and super critical carbon dioxide phase conditions and in such a way that any bacteria present on the boneless beef will be rendered none viable or killed.

At the conclusion of the treatment (cycle), the two pistons 926 and 986 move toward each other and in so doing, reduce the volume of space 928 to a minimum and expand the volume in spaces 917 and 939, while still rotating the vessel (back and forth) until the boneless beef is compressed in the center so as to expel all carbon dioxide fluid which is extracted via the upper manifold and into the spaces 917 or 939. In this way, carbon dioxide loss is substantially reduced. A further advantage is to avoid the freezing of boneless beef during the removal of the fluid carbon dioxide.

The following TABLE 3 provides one embodiment of a sequence of steps that may be executed by the pathogen deactivation vessel 955.

TABLE 3

| Sequ. # | Sequence/Action per single system cycle and then repeat in a continuous succession of cycles | Seconds |
| --- | --- | --- |
| 1 | PDV Evacuation [50%] by retracting pistons—aided by external blower (if needed) | 16 |
| 2 | Load 2,000 lbs boneless beef = to <50% PDV volume [exclude any atmospheric oxygen] | 75 |
| 3 | Pressurize PDV with vapor/gas 500 pisa to 900 psia | 15 |
| 4 | Close gas valves; open liquid valves, pressure to 700 psia to 900 psia | 10 |
| 5 | Fill with liquid carbon dioxide @ <900 psi PDV pressure (from reverse side of piston) by retracting piston (additional from remote source via piston rod) | 30 |
| 6 | Rotate PDV Thru' 190° from perpendicular in both directions [additional agitation by activating pistons stroke—2 ways × 24"] and rotating impellor | 85 |
| 7 | Increase PDV pressure to 1,500 psi and <120 F. | 5 |
| 8 | Continue rotation of PDV Thru' 190° from perpendicular in both directions [agitation by activating pistons stroke—2 ways × 24"] plus impellor | 85 |
| 9 | Decrease PDV pressure to 900 psi and <85 F. | 5 |
| 10 | Continue rotation of PDV thru' 190° from perpendicular in both directions [agitation by activating pistons stroke—2 ways × 24"] plus impellor | 85 |
| 11 | Increase PDV pressure to 1,500 psi and <120 F. | 5 |
| 12 | Continue rotation of PDV Thru' 190° from perpendicular in both directions [agitation by activating pistons stroke—2 ways × 24"] plus impellor | 85 |
| 13 | Decrease PDV pressure to 900 psi and <85 F. | 5 |
| 14 | Continue rotation of PDV thru 190° from perpendicular in both directions [agitation by activating pistons stroke—2 ways × 24"] plus impellor | 85 |
| 15 | Compress beef between pistons to remove a pre-determined quantity of carbon dioxide vapor and/or fluid from beef and transfer via an upper port (open valves to LP storage PDVs) | 70 |
| 16 | Chill beef by sudden internal PDV pressure drop of a measured quantity of liquid carbon dioxide (by retracting pistons to lower pressure) and then open valve to external accumulation vessels - may be strapped to PDV) | 75 |
| 17 | Close//open valves as required | 15 |
| 18 | Reduce PDV Pressure to ambient (T = 32 F. to 36 F.) [could be combined with 21] | 45 |
| 19 | Unload beef from PDV (via lower 14" D port) | 75 |
| 20 | Open/close valves | 10 |
| 21 | Return pistons to 45% PDV volume between pistons [L-carbon dioxide behind pistons] | 15 |
| CPH | 4.02        3600 | 896.00 |

TABLE 4 below shows the deactivation levels using the pathogen deactivation vessel for various pressures and times.

| | | | Exposure Time | |
|---|---|---|---|---|
| | Treatment - cpSC-carbon dioxide | | Initial Hi Pressure Exposure | After 4 Days Storage at |
| Rep # | Organism | Hi Pressure PSIG | Min | Initial Reduc. $Log_{10}CFU/$ Gm. | Ambient Total Reduction - $Log_{10}CFU/Gm.$ |
| 1 | Generic E. Coli | 2,400 | 3 | 1.2 | 4.0 |
| 2 | E. Coli 0157:H7 | 2,100 | 3 | 1.8 | 3.5 |
| 3 | Generic E. Coli | 1,800 | 7 | 1.1 | 3.0 |
| 4 | E. Coli 0157:H7 | 1,600 | 7 | 1.9 | 4.1 |
| 5 | E. Coli 0157:H7 | 1,500 | 1 | 1.6 | 3.8 |
| 6 | Generic E. Coli | 1,300 | 5 | 0.9 | 2.9 |
| 7 | E. Coli 0157:H7 | 1,100 | 5 | 0.8 | 2.9 |

TABLE 5 below shows the deactivation levels using the pathogen deactivation vessel for various pressures and times.

| Rep # | Organisms (Cocktail) | Hi Pressure PSIG | Exposure Minutes | Reduction $Log_{10}CFU/Gm.$ |
|---|---|---|---|---|
| | Treatment - controlled phase Super Critical carbon dioxide | | | |
| 1 | Generic E. Coli | 1,100 to 1,300 | 3 | 5.8 |
| | E. Coli 0157:H7 | | | 5.7 |
| | Listeria monocytogenes | | | 4.0 |
| | Salmonella - spp. | | | 5.8 |
| 2 | Generic E. Coli | 1,600 to 1,800 | 3 | 5.8 |
| | E. Coli 0157:H7 | | | 6.4 |
| | Listeria Monocytogenes | | | 4.7 |
| | Salmonella - spp. | | | 6.0 |
| 3 | Generic E. Coli | 2,000 to 2,200 | 3 | 1.9 |
| | E. Coli 0157:H7 | | | 4.4 |
| | Listeria Monocytogenes | | | 5.2 |
| | Salmonella - spp. | | | 6.0 |
| | Treatment - Sub-Critical (Liquid) carbon dioxide | | | |
| 4 | E. Coli 0157:H7 | 700-800 | 3 | 5.5 |
| | Listeria Monocytogenes | | | 2.7 |
| | Salmonella - spp. | | | 5.4 |

As can be appreciated from the description of FIG. 15, the device may be used in a method for deactivating pathogens in meat. The method includes transferring meat to a vessel, wherein the vessel includes an enclosed elongated space fitted with a first and a second piston within the interior of the space at each of two opposing ends, and the pistons include a front and back side; charging the vessel with carbon dioxide; moving the first and second piston in a direction toward each other so as to reduce the volume of the space and increase the pressure within the space to create a super critical carbon dioxide phase in the space containing the meat; holding the super critical pressure of carbon dioxide for a predetermined period of time; after holding the super critical pressure for the predetermined period of time, moving the first and the second pistons away from each other to reduce the pressure in the space to a subcritical pressure of carbon dioxide; holding the subcritical pressure of carbon dioxide for a predetermined period of time; and after holding the subcritical pressure of carbon dioxide, moving the first and second pistons in a direction toward each other so as to reduce the volume of the space while expelling the carbon dioxide from the space in front of the pistons to spaces created at the back of the pistons.

In one embodiment, the front side of the first and the second piston is fitted with an impeller that rotates as the first and second pistons move toward each other.

In one embodiment, the vessel includes a central longitudinal axis, and the vessel is rotated back and forth on the axis while the first and second pistons move toward each other.

In one embodiment, the method may comprise performing a plurality of super critical carbon dioxide phases alternating with subcritical carbon dioxide phases before expelling the carbon dioxide.

In one embodiment, the super critical pressure produced is 1,500 psi or greater.

In one embodiment, the subcritical pressure produced is 900 psi or less.

A different embodiment related to a method for inactivating pathogens present on goods, includes: (a) introducing into an apparatus, pieces of beef, and a fluid comprising water and carbon dioxide; (b) raising a pressure within the apparatus above a critical pressure of carbon dioxide without elevating a temperature within the apparatus above a temperature to damage the beef; and holding the pressure and temperature for a selected period of time; (c) reducing the pressure within the apparatus, and increasing a density of the fluid to suspend and separate the pieces of beef in a suspension to enable surfaces of the beef to be in contact with low pH fluid to result in death of pathogenic microorganisms on the surfaces of the beef.

In one embodiment, the method may further comprise adjusting the density of the fluid where the beef becomes buoyant to allow spacing apart of beef.

In one embodiment, the method may further include: (d) raising the pressure within the apparatus to increase the temperature at the surface of the goods to above freezing point of water. This method may further include repeating steps (c) and (d) in rapid succession for more than one cycle.

In one embodiment, the method may further include adjusting the pressure of the carbon dioxide and water to form carbonic acid, having a selected temperature and pH, wherein the pH value is lethal to at least one microorganism present with the goods.

In one embodiment, the method may further include adjusting the pressure of the carbon dioxide to form Carbonic Acid having a pH less than 5, wherein due to the low pH the carbonic acid is lethal to at least one microorganism on the goods.

In one embodiment, the method may further include applying ultrasonic energy to separate microorganisms from the goods and mixing the goods within the chamber.

In one embodiment, the method may further include, after reducing the pressure, holding while agitating, raising the pressure and temperature of the carbon dioxide to reach supercritical conditions, and holding the supercritical conditions for a period of time sufficient for the supercritical carbon dioxide to be lethal to pathogens.

In one embodiment, the method may further include, wherein liquid carbon dioxide is in contact with the surfaces of the goods in sufficient quantities to cause freezing of the free water in contact with microorganisms.

In one embodiment, the method may further include further charging the apparatus with carbon dioxide gas/vapor to about 500 psia and then liquid carbon dioxide to about 700 psia and agitating the apparatus to soak goods' surfaces with liquid carbon dioxide at a pressure and liquid density in which beef (not frozen) will become buoyant to allow spacing apart of beef pieces when agitated.

As can be appreciated from the description of FIG. 15, the device may also be used in a method of separating a high vapor pressure fluid from beef, including: (a) in an apparatus comprising a vessel, and a piston disposed within the vessel, wherein a space is provided adjacent to the piston, adding a high vapor pressure fluid with beef in the space; and (b) moving the piston to compress the space to separate the fluid from the beef, wherein the fluid is compressed at a pressure to prevent evaporation and freezing of the beef.

In one embodiment, the method may further include, wherein the apparatus comprises a second piston, wherein the piston are disposed opposite to each other, and the pistons are moved together to compress the space to separate the fluid from the beef.

In one embodiment, the method may further include, wherein the high vapor pressure fluid does not exist as a liquid at 1 atmosphere and 20° C.

In one embodiment, the method may further include, wherein the fluid is carbon dioxide.

In one embodiment, the method may further include, wherein the apparatus further comprises a space behind the piston, wherein the space in front of and behind the piston are in communication, and the fluid is transferred to the space behind the piston during compression.

Another embodiment related to a method for separating human edible goods from a pressurized fluid includes: (a) providing a horizontally disposed tubular vessel having a pair of horizontally opposed pistons, each piston being sealingly mounted within an end of the tubular vessel to provide an enclosed space into which the goods and a pressurized fluid are transferred; (b) after treating the goods to reduce pathogen populations that may be present with the goods, raising the pressure within the tubular vessel to a first fluid pressure value by moving the horizontally opposed pistons together and reducing the space between them to decrease the density of the fluid to a value lower than a density of the goods; (c) opening a first valve in a conduit connecting a pressurized space within an end of a piston accumulator to a port centrally located on the upper side of the first vessel and allowing the relatively lighter fluid to transfer into a second space of the piston accumulator from the first vessel while the piston accumulator increases the volume of the second space and the pistons located in the first tubular vessel reduce the volume of the space containing the goods until the fluid has been transferred into the accumulator leaving a residual quantity of fluid with the goods; and (d) closing the first valve and moving the pistons apart to decrease the fluid pressure within the first vessel to a lower second pressure value and opening a second valve to allow transfer of the fluid into a second vessel at a lower pressure value.

The apparatus of FIG. 15, includes: (a) a housing defining a cylindrical chamber with a first end and an opposite, second end; (b) a first piston and a second piston disposed in a sealing manner at the opposite ends of the chamber so as to provide an enclosed and sealed space between the first and second pistons, wherein the first piston and the second piston are driven towards one another to pressurize contents in said space between the pistons to a first, high pressure and away from one another to depressurize contents within the space to a second, lower pressure; and (c) a mixer disposed within the housing to mix any contents between the pistons.

In one embodiment, the apparatus may further include, wherein the mixer has a piston-like member disposed in the housing, wherein the piston-like member is in a sealing disposition with the inner surface of the chamber.

In one embodiment, the apparatus may further include, wherein the mixer has a piston-like member disposed in the housing, and the piston-like member has an opening for the passage of goods from one end of the chamber towards the other.

In one embodiment, the apparatus may further include an ultrasonic generator that transmits ultrasonic energy to the mixer to separate microorganisms from goods being processed within the chamber.

In one embodiment, the apparatus may further include, wherein the first and the second pistons are driven by the introduction and withdrawal of a liquid compatible with goods edible for human consumption.

In one embodiment, the apparatus may further include, wherein the mixer is configured to rotate and reciprocate in relation to the chamber length.

In one embodiment, the apparatus may further include a first and a second piston disposed at opposite ends of the housing to form a first chamber and a second chamber, wherein the chambers receive a fluid to drive the first piston and the second piston.

In one embodiment, the apparatus may further include a direct communication between a second chamber containing goods to be treated after transfer into the space via a port located on the upper side of, and centered on a perpendicular center-line of the chamber, such that when the first and second pistons are driven away from one another, a vacuum is created and the goods are thusly transferred into the space.

In one embodiment, the apparatus may further include a direct communication between said space and a third chamber into which said treated goods are to be transferred via a port located on the lower side of, and centered on a perpendicular center-line of the first chamber, such that when a vacuum is created within the third chamber and first and second pistons are driven toward one another, the goods are transferred into the space.

The following properties are provided for reference.

The temperature of liquid carbon dioxide at 900 psia is about 74° F.

The density of liquid carbon dioxide at 900 psia is about 45 lbs/cubic foot.

The temperature of fluid carbon dioxide at or equal to or greater than 1072.1 psia is about 87.8° F. (the Critical Temperature).

The density of fluid carbon dioxide at or equal to or greater than 1072.1 psia is about 28.96 lbs/cubic foot; (the Critical Temperature).

The density just below the Critical Point, at say about 84° F. is about 41 lbs/cubic foot; so it can be seen there is a substantial reduction in density at just above The Critical Temperature, when compared to just below The Critical Point.

The density of the food (boneless beef), which comprises lean beef of about 66 lbs/cubic foot and tallow/beef-fat of about 55 lbs/cubic foot and, therefore, an equal quantity of each (50's) averages about 60 lbs/cubic foot to 61 lbs/cubic foot.

When boneless beef, at about 60.5 lbs/cubic foot, is immersed in fluid supercritical carbon dioxide at about 1,100 psia, the buoyancy effect of the supercritical carbon dioxide, at 28.96 lbs/cubic foot (say less than 30 lbs/cubic foot) is minimal when compared to liquid carbon dioxide at say 18° F. and 400 psia, which is about equal to the average density of 50's (i.e., 60.5 lbs/cubic foot).

However, the temperature of liquid carbon dioxide at 60.5 lbs/cubic foot and 400 psia is about 18° F. and beef will freeze at this temperature. It is therefore useful to provide suitable temperature conditions at the surface of the boneless beef as is pressure. A temperature of 18° F. will freeze boneless beef with any bacteria that may be present which could provide conditions in which at least some bacteria would be preserved. These conditions must be avoided and therefore a compromise is required.

It is useful that all pieces of any quantity of boneless beef being treated to remove or kill bacteria, or pathogens that may be present on the beef, are thoroughly soaked and "wetted" with carbon dioxide and to such an extent that the entire surface of each piece including within and under any and all slits, cracks, cuts, flaps or folds, is sufficiently saturated. Most preferably, the treated surface will have absorbed carbon dioxide during the sub-critical treatment.

When the boneless beef is immersed in higher density, fluid carbon dioxide, such that the buoyancy effect of the carbon dioxide is sufficient to cause separation or the improved capacity of the beef pieces to separate, each piece of boneless beef will be more readily exposed to the carbon dioxide in which it is immersed. When the density of the carbon dioxide is greater, thorough soaking of all boneless beef surfaces in the carbon dioxide is more readily provided and carbon dioxide is more readily in contact with the surfaces. Under these conditions, agitation of the combined boneless beef and fluid carbon dioxide can enhance the exposure, hence the process provides for such agitation.

More particularly, in order for the entire surfaces of the boneless beef pieces to be thoroughly soaked in fluid carbon dioxide when immersed in the fluid carbon dioxide, greater buoyancy will more readily and thoroughly facilitate the desired exposure of all surfaces to carbon dioxide and, more particularly, enable the beef surfaces to absorb relatively greater proportions of carbon dioxide (which occurs more readily at lower temperature). By alternating between a lower and higher pressure, carbon dioxide is absorbed at the beef surfaces at the lower temperature, which then becomes a "source" of carbon dioxide, at the surfaces (which is where any bacteria will be present) and provide for the lethal conditions desired when a sudden pressure increase can provide the desired super-critical conditions at the surfaces of the boneless beef.

In consideration of the above, a method is disclosed that provides alternating conditions of exposure to super-critical carbon dioxide conditions (which is lethal to bacteria) with sub-critical conditions, wherein pressure within the autoclave or pathogen deactivation vessel 955 is sequentially and rapidly increased and decreased between about 1,500 psia and about 900 psia, is disclosed.

While illustrative embodiments have been illustrated and described, it will be appreciated that various changes can be made therein without departing from the spirit and scope of the invention.

The invention claimed is:

1. A method for separating fat from lean, comprising:
    (a) transferring a mixture, the mixture comprising lean particles with frozen water, fat particles, and a fluid, through a conduit;
    (b) allowing the frozen water in the lean particles to thaw as the mixture travels through the conduit and increases a density of the lean particles;
    (c) transferring the mixture to a centrifuge and separating the mixture into a first stream of fat particles; a second stream of lean particles with non-frozen water, and a third stream comprising fluid;
    (d) providing a housing defining a cylindrical chamber with a first end and an opposite second end;
    (e) providing a piston in a sealing manner at an end of the chamber so as to provide an enclosed and sealed space between the piston and the end of the cylinder, wherein the piston can be driven towards the opposite end of the cylinder to pressurize contents in the space between the piston and the end of the cylinder; and
    (f) transferring the second stream into the sealed space between the piston and the end of the cylinder.

2. The method of claim 1, wherein the lean particles and the fat particles in the mixture in the conduit prior to thawing of the frozen water have a similar density that prevents the lean particles and the fat particles from accumulating at different elevations.

3. The method of claim 1, further comprising adding carbonic acid solution to the mixture before step (a), wherein the carbonic acid solution has a temperature higher than the freezing point of water to thaw the frozen water.

4. The method of claim 1, wherein the mixture comprises bones, and allowing the bones to separate from the mixture before the thawing of the frozen water.

5. The method of claim 4, wherein the conduit comprises a vertical section and a horizontal section, and the bones are separated at a bend from the vertical section to the horizontal section.

6. The method of claim 1, wherein the conduit comprises a vertical section and a horizontal section, and carbonic acid solution is added in the vertical section.

7. The method of claim 1, further comprising before step (a), crushing beef particles comprising both fat and lean to produce the lean particles and the fat particles in the mixture.

8. The method of claim 7, further comprising, before crushing, chilling the beef particles to a temperature at which the fat can crumble and separate from the lean to produce the fat particles and the lean particles.

9. The method of claim 7, further comprising, before crushing, chilling the beef particles to a temperature at which the fat can crumble and separate from the lean while the lean remains pliable.

10. The method of claim 1, further comprising emulsifying the fat particles into an emulsion comprising fluid and solids.

11. The method of claim 10, further comprising separating the fluid from the emulsion via centrifugation.

12. The method of claim 1, wherein the fluid comprises carbonic acid, and further comprising collecting the fluid with carbonic acid and heating the fluid to produce carbon dioxide gas.

13. A method for separating fat from lean, comprising:
    (a) transferring a mixture, the mixture comprising lean particles with frozen water, fat particles, and a fluid, through a conduit;
    (b) allowing the frozen water in the lean particles to thaw as the mixture travels through the conduit and increases a density of the lean particles;
    (c) transferring the mixture to a centrifuge and separating the mixture into a first stream of fat particles; a second stream of lean particles with non-frozen water, and a third stream comprising fluid;
    (d) transferring the first stream of fat particles through an emulsifier to cut the particles into smaller particles to provide a fourth stream of small particles and oil;

(e) transferring the fourth stream into a centrifuge to separate the oil any remaining lean particles to provide a fifth stream of small lean particles; and
(f) combining the fifth stream and second stream to provide a sixth stream of lean particles.

14. A method for separating solid fat from beef pieces, comprising:
(a) cooling beef pieces comprising fat and lean for a time and at a temperature that results in uneven cooling of surfaces of the fat and lean, wherein the lean is cooled to a temperature to cause freezing of water in the lean, and a surface temperature of the fat is lower than a surface temperature of the lean; and
(b) with a machine, applying pressure to the beef pieces to break the fat from the beef pieces while leaving the lean intact, wherein applying pressure comprises passing the beef pieces between a pair of parallel, adjacent, non-contacting, driven rollers, each roller having alternating recesses and protrusions around the perimeter, wherein the rollers are arranged to position a recess of one roller opposite to a protrusion of the second roller, without the rollers being in contact.

15. The method of claim 14, wherein in step (b) the surface temperature of the fat is lower than the surface temperature of the lean by at least 5° F.

16. The method of claim 14, wherein in step (b), the surface temperature of the lean is 26° F. or more and the surface temperature of the fat is about 5° F. or less and the surface temperature of the fat is lower than the surface temperature of the lean.

17. A method for producing a beef product having a predetermined fat content, comprising:
(a) transferring a mixture comprising a fluid, lean particles, and fat particles, through a conduit to a separating device which divides the mixture into a first lean stream, a second fat stream, and a third stream of fluid;
(b) transferring the first stream of lean particles from the separating device to a first conduit;
(c) transferring the second stream of fat particles from the separating device to a second conduit;
(d) measuring the first stream having the lean particles in the first conduit and determining a content of fat in the first stream;
(e) comparing the content of fat in the first stream with a target fat content; and
further performing (f1) or (f2);
(f1) increasing a mass flow of the second stream through the second conduit to decrease the fat content of the first stream of the mixture in the first conduit; or
(f2) decreasing the mass flow of the second stream through the second conduit to increase the fat content of the first stream of the mixture in the first conduit.

18. The method of claim 17, further comprising measuring the mass flow of the first stream of the mixture and determining a density, and correlating the density to the fat content of the first stream of the mixture.

19. The method of claim 18, further comprising obtaining a plurality of measurements of the massflow of the first stream of the mixture, and obtaining an average of the measurements.

20. The method of claim 17, further comprising reducing the mass flow of the second stream of the mixture flowing through the second conduit and maintaining the mass flow constant until the fat content of the first stream of the mixture reaches a high target value, and then increasing the mass flow of the second stream of the mixture through the second conduit and maintaining the mass flow constant until the fat content of the first stream of the mixture reaches a low target value, wherein the high target value and the low target value are not the same.

21. The method of claim 20, further comprising measuring a fat content of the second stream of the mixture and determining the constant mass flow based on the measured fat content of the second stream of the mixture.

* * * * *